United States Patent
Nava et al.

(10) Patent No.: US 11,518,834 B2
(45) Date of Patent: Dec. 6, 2022

(54) RADICALLY POLYMERIZABLE COMPOSITIONS

(71) Applicant: Polynt Composites USA, Inc., Carpentersville, IL (US)

(72) Inventors: Hildeberto Nava, Cary, NC (US); James Anthony Skrobacki, Garner, NC (US); Samuel T. Freeman, Cary, NC (US)

(73) Assignee: Polynt Composites USA, Inc., Carpentersville, IL (US)

( * ) Notice: Subject to any disclaimer, the term of this patent is extended or adjusted under 35 U.S.C. 154(b) by 23 days.

(21) Appl. No.: 16/730,081

(22) Filed: Dec. 30, 2019

(65) Prior Publication Data

US 2020/0207895 A1    Jul. 2, 2020

Related U.S. Application Data

(60) Provisional application No. 62/787,648, filed on Jan. 2, 2019.

(51) Int. Cl.
| | | |
|---|---|---|
| *C08F 220/30* | (2006.01) | |
| *C08F 220/28* | (2006.01) | |
| *C08K 5/092* | (2006.01) | |
| *C08K 5/1535* | (2006.01) | |
| *C08K 5/18* | (2006.01) | |
| *C08K 5/3432* | (2006.01) | |
| *C08K 5/37* | (2006.01) | |
| *C08K 5/50* | (2006.01) | |
| *C08K 5/524* | (2006.01) | |
| *C08K 5/56* | (2006.01) | |

(52) U.S. Cl.
CPC ...... *C08F 220/301* (2020.02); *C08F 220/283* (2020.02); *C08K 5/092* (2013.01); *C08K 5/1535* (2013.01); *C08K 5/18* (2013.01); *C08K 5/3432* (2013.01); *C08K 5/37* (2013.01); *C08K 5/50* (2013.01); *C08K 5/524* (2013.01); *C08K 5/56* (2013.01)

(58) Field of Classification Search
CPC .................... C08F 222/102; C08F 220/301
See application file for complete search history.

(56) References Cited

U.S. PATENT DOCUMENTS

| | | |
|---|---|---|
| 2,526,718 A | 10/1950 | Wheeler |
| 2,565,897 A | 8/1951 | Wheeler |
| 3,050,511 A | 8/1962 | Szwarc |
| 3,150,118 A | 9/1964 | Clemens |
| 3,169,945 A | 2/1965 | Hostettler et al. |
| 3,179,623 A | 4/1965 | Bowen |
| 3,297,745 A | 1/1967 | Fekete et al. |
| 3,338,876 A | 8/1967 | Kanavel et al. |
| 3,367,992 A | 2/1968 | Bearden |
| 3,427,346 A | 2/1969 | Brotherton et al. |
| 3,470,079 A | 9/1969 | D'Alelio |
| 3,700,643 A | 10/1972 | Smith et al. |
| 3,772,404 A | 11/1973 | Knight et al. |
| 3,804,735 A | 4/1974 | Radlove et al. |
| 3,836,600 A | 9/1974 | Brewbaker et al. |
| 3,883,612 A | 5/1975 | Pratt et al. |
| 3,893,829 A | 7/1975 | Valentino |
| 3,929,929 A | 12/1975 | Kuehn |
| 3,947,422 A | 3/1976 | Tatum et al. |
| 3,948,698 A | 4/1976 | Elrick et al. |
| 3,970,505 A | 7/1976 | Hauser et al. |
| 3,986,922 A | 10/1976 | Parker et al. |
| 4,014,771 A | 3/1977 | Rosenkranz et al. |
| 4,100,229 A | 7/1978 | Schwartz, Jr. |
| 4,119,609 A | 10/1978 | Allen et al. |
| 4,131,602 A | 12/1978 | Hodakowski et al. |
| 4,138,385 A | 2/1979 | Uffner et al. |
| 4,141,883 A | 2/1979 | Soma et al. |
| 4,182,830 A | 1/1980 | Ford, Jr. |
| 4,195,146 A | 3/1980 | Markiewitz et al. |
| 4,213,837 A | 7/1980 | Bristowe et al. |
| 4,311,625 A | 1/1982 | Bellettiere et al. |
| 4,324,717 A | 4/1982 | Layer |
| 4,431,782 A | 2/1984 | Harris et al. |
| 4,569,976 A | 2/1986 | Zimmerman et al. |
| 4,760,111 A | 7/1988 | Ambrose et al. |
| 4,777,209 A | 10/1988 | Hefner, Jr. |

(Continued)

FOREIGN PATENT DOCUMENTS

| | | |
|---|---|---|
| DE | 4032546 | 4/1992 |
| DE | 102011078785 | 1/2013 |

(Continued)

OTHER PUBLICATIONS

Boutevin, et al., "Synthesis of Butyl Acrylate/Methyl Methacrylate Diblock Copolymers by Coupling of Two Telomers," Eur. Polym. J. vol. 30, No. 5, 1994, 5 pp.

(Continued)

*Primary Examiner* — Mark S Kaucher

(74) *Attorney, Agent, or Firm* — Neal, Gerber & Eisenberg LLP

(57) ABSTRACT

Polymerizable compositions comprising a radically polymerizable resin can be polymerized in the absence of a peroxide initiator and other undesirable components. The polymerizable compositions and methods employ a manganese- or iron-containing salt or organic complex and a 1,3-dioxo compound with one or more other components. The polymerizable compositions have better storage stability and reduced gel time-drift.

20 Claims, No Drawings

(56) References Cited

U.S. PATENT DOCUMENTS

| | | | |
|---|---|---|---|
| 4,857,579 | A | 8/1989 | Domeier |
| 4,871,811 | A | 10/1989 | Gaku et al. |
| 5,115,072 | A | 5/1992 | Nava et al. |
| 5,235,010 | A | 8/1993 | Giovando |
| 5,728,872 | A | 3/1998 | Riemenschneider |
| 5,859,267 | A | 1/1999 | Khattar et al. |
| 5,925,409 | A | 7/1999 | Nava |
| 6,200,460 | B1 | 3/2001 | Sutoris et al. |
| 6,552,140 | B1 | 4/2003 | Kneafsey et al. |
| 7,173,074 | B2 | 2/2007 | Mitra et al. |
| 7,498,367 | B2 | 3/2009 | Qian |
| 8,039,559 | B2 | 10/2011 | Jansen et al. |
| 9,068,045 | B2 | 6/2015 | Nava et al. |
| 10,000,602 | B2 | 6/2018 | Nava et al. |
| 2010/0069548 | A1* | 3/2010 | Jansen .................. C08K 5/372  524/302 |
| 2016/0152754 | A1 | 6/2016 | Pfeil |
| 2016/0168286 | A1 | 6/2016 | Pfeil |

FOREIGN PATENT DOCUMENTS

| | | |
|---|---|---|
| EP | 0718386 | 6/1996 |
| EP | 2582744 | 4/2013 |
| EP | 2626383 | 8/2013 |
| GB | 905186 | 9/1962 |
| GB | 1159552 | 7/1969 |
| GB | 1490308 | 11/1977 |
| JP | S5530502 | 8/1980 |
| JP | S5530503 | 8/1980 |
| JP | S5530504 | 8/1980 |
| JP | 03174424 | 7/1991 |
| WO | WO1998039098 | 9/1998 |
| WO | WO2000060045 | 10/2000 |
| WO | WO2001040149 | 6/2001 |
| WO | WO2001040404 | 6/2001 |
| WO | WO2001042313 | 6/2001 |
| WO | WO2002048301 | 6/2002 |
| WO | WO2002077145 | 10/2002 |
| WO | WO2003104379 | 12/2003 |
| WO | WG2008003496 | 1/2008 |
| WO | WO2008003494 | 1/2008 |
| WO | WO2008003497 | 1/2008 |
| WO | WO2008003652 | 1/2008 |
| WO | WO2011157673 | 12/2011 |

OTHER PUBLICATIONS

Chiang, et al., "Preparation and Properties of UV-Curable Poly(dimethylsiloxane) Urethane Acrylate. II. Property-Structure/Molecular Weight Relationships," Journal of Applied Polymer Science, vol. 36, 1988, 19 pp.

Gachter, et al., "Plastics Additives Handbook," Hanser Publishers, 1990, 55 pp.

Garra, et al., "Peroxide-Free and Amine-Free Redox Free Radical Polymerization: Metal Acetylacetonates/Stable Carbonyl Compounds for Highly Efficient Synthesis of Composites," Macromolecules, 51, 2018, 10 pp.

Goethals, "Telechelic Polymers: Synthesis and Applications," CRC Press, Inc., Chapter 8, 1989, 24 pp.

International Search Report and Written Opinion for PCT/US2020/012090 dated Mar. 27, 2020.

Kadish, et al., Volume 17 of "Handbook of Porphyrin Science; With Applications to Chemistry, Physics, and Materials," World Scientific, 2010, 112 pp.

Kadish, et al., Volume 30 of "Handbook of Porphyrin Science; With Applications to Chemistry, Physics, and Materials," World Scientific, 2010, 30 pp.

Kennedy, "Synthesis of Telechelic Polymers by Cationic Techniques and Application of the Products," Macromol. Sci. Chem., A21(8&9), 1984, 7 pp.

Lee, et al., "Handbook of Epoxy Resins," Chapter 2, McGraw-Hill, 1967, 35 pp.

Rimmer, et al., "Preparation of polystyrene-poly(styrene-g-N-isopropylacrylamide) core-shell particles: copolymerization of oligo . . . ," Polymer vol. 37, No. 18, 1996, 5 pp.

Shen, et al., "Highly active rare earth catalysts for the solution polymerization of e-caprolactone," Polymer Bulletin 37, 1996, 8 pp.

Zhang, et al., "Ring-opening polymerization of e-caprolactone in the presence of dicarboxylic acids," Macromol. Chem. Phys. 195, 1994, 7 pp.

Office Action for European Patent Application No. 20705539.3 dated Jul. 21, 2022, 7 pp.

Office Action for Chinese Patent Application No. 202080016952.6 dated Aug. 24, 2022, 19 pp.

\* cited by examiner

RADICALLY POLYMERIZABLE COMPOSITIONS

CROSS-REFERENCE TO RELATED APPLICATIONS

This application claims benefit of the filing date of and right of priority to U.S. Provisional Application No. 62/787,648, filed Jan. 2, 2019, which is incorporated by reference herein.

FIELD OF THE INVENTION

The present disclosure relates to compositions and methods for polymerizing a radically polymerizable composition, wherein the composition is substantially free of a peroxide initiator and/or other undesirable components. The polymerizable compositions and methods employ a manganese- or iron-containing salt or organic complex and a 1,3-dioxo compound with one or more other components.

BACKGROUND

Thermosetting resins used in casting or open and closed mold applications are typically cured by a free radical polymerization process. Examples of such thermosetting resin include unsaturated polyester resins, vinyl ester resins and urethane (meth)acrylates. The backbone of these resins typically contains ethylenically unsaturated groups such as fumarate or (meth)acrylate and are dissolved in a liquid copolymerizable monomer such as styrene, vinyl toluene or various methacrylic esters. The resins in general are liquid under normal conditions, though when treated with a source of free radicals such as an organic peroxide initiator in the presence of a promoter will rapidly crosslink to form a hard thermoset crosslinked network. Such a process is used in the production of, for example, castings, mortars, coatings, adhesives and fiber reinforced articles.

The plastics and composite industries are the heaviest users of organic peroxides. Organic peroxides and mixtures containing an organic peroxide are used as catalysts, curing agents, hardeners or initiators. Organic peroxides and mixtures containing an organic peroxide are often referred to by these terms. The actual naming will depend on the industry and application of the materials.

Organic peroxides are available as solids (usually fine powders), liquids or pastes. Some materials, such as water, odorless mineral spirits, some phthalate esters or other phlegmatizing agents do not react with organic peroxides and are often used to dilute them. The diluted mixtures or formulations are less likely to combust when exposed to heat or physical shock than the undiluted organic peroxide. Dilution makes the unstable peroxides safer to produce, handle, and use.

The main hazards related to organic peroxides are the potential for fire and explosion. Organic peroxides may also be toxic or corrosive. It is the double oxygen (—O—O—) of the "peroxy" group that makes organic peroxides both useful and hazardous. The peroxy group is chemically unstable. Organic peroxides can easily thermally decompose, giving off heat, at a rate that increases as the temperature rises leading to what is known as runaway reactions. Many organic peroxides give off flammable vapors when they decompose. These vapors can easily catch fire. Most undiluted organic peroxides can catch fire easily and burn very rapidly and intensely. This is because they combine both fuel (carbon) and oxygen in the same compound. These reactivity hazards have been reported as one of the main causes for fire and explosion in process industries.

Organic peroxides have a self-accelerating decomposition temperature (SADT). SADT represents the lowest temperature in which that particular organic peroxide formulation in its commercial packaging will undergo self-accelerating decomposition (begin the chemical process that leads to explosion). The SADT value will vary with each organic peroxide formulation and the size and shape of its packaging. Some organic peroxides are dangerously reactive; they can decompose very rapidly or explosively if they are exposed to only slight heat, friction, mechanical shock or contamination with incompatible materials such as amines or metal salts or their organic complexes.

Organic peroxides can also be strong oxidizing agents. Combustible materials contaminated with most organic peroxides can catch fire very easily and burn very intensely (i.e., deflagrate). This means that the burn rate is very fast: it can vary from 1 m/sec to hundreds of meters per second. Also the combustion rate increases as the pressure increases and the combustion (or reaction) zone can travel through air or a gaseous medium at very fast speeds.

Commercially available systems for ambient cure thermosetting resins include accelerators and/or promoters used in conjunction with the initiator (a peroxide). These include, for example, salts of metals chosen from among lithium, calcium, copper, vanadium, zirconium, titanium, nickel, iron, sodium, potassium, magnesium, manganese, barium and cobalt, in combination with one or more compounds of alkyl organic acids, halides, nitrogen containing moieties to form a coordination complexes. The choice of the metal ion and its salts depends upon several parameters, such as activity at ambient temperatures, possible coloring effects, toxicity, and stability in the thermoset product, price, and the like. It should be taken into account that the activity of the metal ion also depends upon the kind of coordinating groups. Because of their good performance at ambient temperature, cobalt-containing accelerators are the most widely used co-promoters. However, a disadvantage of cobalt is that cobalt carboxylates are suspect to high toxicity (carcinogenicity). Hence, there is an increasing demand in the thermosetting resin industry for promoters that can provide an appropriate cure without compromising performance of the resulting products.

Much attention has recently been given to thermosetting systems that can be gelled and cured via free radical polymerization together with a variety of accelerators. More in particular, accelerators that are free of any cobalt salts because cobalt carboxylates are suspect to high toxicity (carcinogenicity).

Among important parameters to desirably remain constant for the useful life of a resin system during a storage period, or its "shelf life," are the gel and curing times of the resin system. Variations in the reaction time for gelling and subsequent curing, of a polyester resin system during storage may be characterized as "gel-time drift." These variations are typically measured as the difference between a gel time after a period of storage and a gel time just after formulation of the resin system. Usually, polyester systems in storage for long periods acquire longer gel or curing times. Some polyester systems, however, may, after long storage periods, exhibit gel times which are shorter than the initial curing time of a freshly manufactured batch. Typical commercially-available polyester systems often have gel-time drifts in the range of minus 50 percent to plus 200 to 300 percent. Such variations frequently cause problems during molding or coating application processes where predictability of gel time is a necessity.

Gel-time drift of a polyester resin system presents a complex problem inasmuch as there may be several interrelated factors responsible, namely, physical parameters of resin formulation, chemical composition of the resin system, promotion package, the presence of contaminants, and shipping, handling and storage conditions. The problem of gel-time drift is particularly acute for the more highly reactive resin systems which may contain chemical promoters for accelerating the rate of gelling or for lowering the temperature of reaction as may be required in a casting operation. It has been found that a promoted polyester system may not only exhibit large variations in gel-time drift, but gel-time drift may vary widely between samples within a single batch of a polyester formulation due to different storage and handling conditions.

Reduction of styrene emissions remains a key issue in open mold processes using styrene-containing materials such as unsaturated polyesters, vinyl esters and other thermosetting resins. One of the largest areas of applications is the open mold process, particularly hand lay-up, spray-up, non-reinforced castings, gelcoats and filament winding. New environmental concerns demand better control on the emissions of organic compounds into the environment. This is prompting industry to find ways to develop technologies that can provide less potential hazards to workers in contact with the thermosetting resins. At the same time, the market demands that the new products should have minimal increase in cost when commercialized and do not compromise reactivity of the resins. Important factors to consider are that all materials should also have good compatibility with all components in the mixtures, viscosities should stay within an acceptable range so that pouring or spraying is not compromised. In addition, wetting of glass or fillers also needs to be maintained and physical properties should be similar or better than the standard materials currently in used.

Several methods have been proposed as possible ways to reduce styrene to minimize monomer emissions during the curing process of unsaturated polyesters or vinyl esters. One common method is the replacement of styrene by another reactive diluent that produces fewer emissions during curing. This approach can lead to systems with slower reactivity, incomplete curing and higher costs. Reducing the amount of styrene or reactive diluent has been used as an attempt to reduce emissions. However, this approach leads to higher viscosities making it more difficult for hand lay-up, rolling or spraying of the resins.

Another approach involves the preparation of low molecular weight polymers. Polymers with lower molecular weight require less styrene or other reactive diluents to yield lower viscosities. Problems associated with lower molecular weight thermosetting systems are that the resulting physical properties of the final products are highly compromised. Overall, these products have inferior performance compared to those of higher molecular weight polymers.

Another common approach used in the reduction of styrene emissions is adding waxes to the thermosetting resins. Waxes limit the elimination of diluent vapors during the curing and also contribute to reduce any oxygen inhibition on the surface of the products, however, problems encountered with this approach is the poor interlaminate bonding.

Oxygen inhibition is a known disadvantage during the process of curing of vinyl containing thermosetting resins due to the oxygen present in the air. The polymerizations of the monomers on the surface of the products are significantly restricted because of the contact with air leading to the formation of a sticky or oily residue. This becomes a problem to produce materials with the right quality since it may be possible that impurities may attach to the surface becoming visible or the product can be unpleasant, tacky, while handling due to the semiliquid residue left behind on the surface. Waxes perhaps have been the most common approach use in the composite industry to minimize or eliminate the surface tackiness. Waxes are partially dissolve or dispersed in the thermosetting resins and while curing, they become incompatible in the mixture migrating to the surface and thus protecting against contact with oxygen in the air. There are some disadvantages using waxes. For example, using polyester resins containing dicyclopentadiene (DCPD), the hydrocarbon nature of the polymer makes it more compatible with the paraffin waxes. Consequently, the wax does not properly migrate to the surface and therefore, the resulting material remains tacky. Waxes are very much dependent on the chemical composition of the thermosetting resin since they have to be incorporated and remain as a fine dispersion in the mixtures. On the other hand, as mentioned above, wax on the surface of a glass reinforced composite may compromised the interlaminar adhesion. Adhesion problems are frequently encountered when a thick composite is prepared in subsequent layers.

In addition to oxygen inhibition, other problems that can contribute to poor surface quality and in general performance of the composite are the poor curing or insufficient crosslinking of the thermosetting resin. The curing behavior of a vinyl containing thermosetting resin is important to establish appropriate processing to ensure satisfactory quality and field performance of the composite product.

The cure behavior of vinyl containing thermosetting resins is characterized by a complex mechanism involving copolymerization of the of the vinyl moieties in the polymer and the molecules of the vinyl containing diluents induced by the decomposition of an initiator and co-promoters. During the copolymerization heat is given off. The heat of reaction, also known as heat of polymerization, is the change in the temperature of reaction mixture that occurs at a constant pressure. It is a thermodynamic unit of measurement useful for calculating the amount of energy released, or produced, in a reaction. Risks must be assessed during the curing of the resins and/or monomers mixtures since high exotherms, which begins when the heat produced by the reaction exceeds the heat removed, may lead to decomposition products. The surplus heat raises the temperature of the reaction mass, which causes the rate of reaction to increase. This in turn accelerates the rate of heat production. An approximate rule of thumb suggests that reaction rate— and hence the rate of heat generation—doubles with every 10° C. rise in temperature. Thermal runaway can occur because, as the temperature increases, the rate at which heat is removed by the surrounding environment increases linearly but the rate at which heat is produced increase exponentially. Once control of the reaction is lost, temperature can rise rapidly leaving little time for correction. The molds used during fabrication may be at risk from deformation due to violent increase in temperature or rapid gas generation. The elevated temperatures may initiate secondary, more hazardous by-products or decomposition. A release of flammable materials from the process may reach their flash point and could result in a fire or an explosion in the workplace. Hot gases and toxic materials may contaminate the workplace or generate a toxic cloud that may spread off-site.

There can be serious risk of injuries, even death, to plant operators, and the general public and the local environment may be harmed.

The scale on which a curing reaction is carried out can have a significant effect on the likelihood of excessive heat generated. The heat produced increases with the volume of the reaction mixture, whereas the heat removed depends on the surface area of the molds available for heat transfer. As the ratio of mass to surface area, increases, cooling may become inadequate. This has important implications for scale-up of processes from the laboratory to production.

A typical assessment will involve one or more of defining the process and operating conditions at the plant; identify the potential hazards; evaluating the risks arising from the hazards and deciding whether existing precautions are adequate or more should be done; selecting and specifying appropriate safety measures; and implementing and maintaining the selected safety measures. As the process design develops, foreseeable deviations from the normal process, such as equipment failure or operator error, should be considered.

An important parameter during the preparation of composite materials is that during the crosslinking of the reactive components in the thermosetting system, they need to develop an appropriate heat of polymerization. The development of the proper heat of polymerization is very important since the ultimate mechanical properties of the finished product will depend on the correct crosslinking of the mixtures. Systems that only develop low heat of polymerization would be a problem since the resin mixtures may not be completely cured or crosslinked and unreacted material may remain in the product affecting the ultimate physical properties. In some instances, residual monomer will remain within the composite and diffuse off the product and contaminate the environment.

Composite materials made from vinyl containing thermosetting resins are typically cured at low, moderately high temperature or room temperature using a peroxide initiator in combination of cobalt salts either alone or together with tertiary amines. As described above, the disadvantages of these systems are that the peroxides are heat sensitive and cobalt is toxic and cancer suspect agent. Several approaches have been presented to eliminate cobalt as a promoter from resin mixtures such as in U.S. Pat. Nos. 10,000,602; 9,068,045; 8,039,559; WO2008/003497. However, none of those approaches solve the problems characterized by using peroxides in combination with cobalt salts.

Very few reports have been published on polymerizable vinyl thermosetting systems cured without any peroxides or cobalt salts. U.S. Pat. No. 6,552,140 to Kneafsey and Barnes discloses air activatable polymerizable compositions useful to prepare adhesives containing methacrylic monomers, a cobalt salt, a weak acid and a 1,3-dioxo compound. The composition requires air to generate free radicals to crosslink the polymerizable composition and using a metal salt with potential toxicity. Nothing is mention about gel time drift, heat of polymerization or degree of curing in the mixtures prepared.

US Patent App. Pub. 2016/0152754A1 to Pfeil describes compositions having a resin component which contains a radically polymerizable compound, an alpha-halocarboxylic acid ester, coper(I) salt and a nitrogen containing ligand. Typical gel times reported are from 45 seconds to 1.5 hours and exotherm of polymerization of up to 172° C. The compositions require of toxic halogenated intermediates. Nothing is mentioned on any potential gel time drift in the compositions.

US Patent App. Pub. 2016/0168286A1 to Pfeil describes a radically polymerizable composition containing a copper salt and a nitrogen containing ligand. As claimed, a 3 to 5% concentration of the copper salt and the ligand are required to crosslink the monomer mixtures. The large amounts needed make the mixture to darken. Nothing is mentioned with regards to gel time drift and heat of polymerization. Pfeil also mentions in this patent of the compositions in his patent application DE102011078785 A1 containing a peroxide free curing agent 1,3-dicarbonyl compound and a manganese compound used as an accelerator to crosslink resins compositions based on radically curable compounds. He mentions that the system tends not to fully cured sufficiently under certain conditions, leading to reduce performance by the cured mass, particularly for use in plugging mass, and those requiring reliable very high values.

Pfeil US 2016/0168286A1 also mentions at page 1, paragraph [0011] that his compositions in DE102011078785 A1 have the disadvantage that the ratios between the curing agent 1,3-dicarbonyl compound and a manganese compound used as an accelerator must be maintained for each of them so that the binder can completely cure and the required properties of the cured masses can be achieved. Based on Pfeil's own conclusions, it appears that his compositions in '785 do not present a reliable approach to obtain reproducible properties. Much less would be expected to have a stable or minimum gel time drift in those compositions. Additionally, nothing is mentioned on the heat of polymerization or obtaining tack free properties on the resulting cured systems.

P. Garra, et al., published an article in Macromlecules, 2018, 51, 6395-6404; titled "Peroxide-free and amine-free redox free radical polymerization: Metal acetylacetonates/ stable carbonyl compounds for highly efficient synthesis of composites". Table 1 on page 6399 shows experiments using manganese and copper salts in combination with various acetylacetonates. Long curing times and low exotherms are reported. No additional information is provided on the gel time drift stability and the reproducibility of the properties obtained on the composite materials prepared. Therefore, it appears that the paper does not resolve the deficiencies of the compositions reported by Pfeil.

It would therefore be desirable to provide compositions that do not require a peroxide, free of cobalt containing salts, having a stable or minimum gel time drift, able to develop an appropriate heat of polymerization that can lead to products with a tack free surface, good curing to yield the required physical properties, and if desired, emit reduced amounts of volatile organic compounds.

SUMMARY OF THE INVENTION

In view of the issues described above, there is a need in the art to address one or more of the problems noted. Specifically, it would be advantageous to reduce or minimize the gel time drift and obtain compositions with high reactivity so that can undergo crosslinking at room temperature or mild elevated temperatures, affording products with a tack free surface and excellent physical properties. This would be particularly advantageous in a number of applications such as, for example, sheet molding compound (SMC) resins, castings resins, adhesives, pultrusion resins, corrosion resistant resins, flame retardant resins, low or zero styrene content resins, filament winding, hand lay-up, resin transfer molding, prepregs, gelcoats and coating resins.

The present invention provides polymerizable compositions comprising a radically polymerizable component, a manganese- or iron-containing salt or organic complex, a 1,3-dioxo compound, and one or more other components as described below. The polymerizable compositions may be curable and/or thermosetting compositions may be employed in the applications above.

The present compositions and methods are remarkable and distinct from prior compositions in their avoidance of certain commonly used initiators or catalysts. In some embodiments, the present compositions and methods are substantially free of peroxides, such as organic peroxides. In some embodiments, the present compositions and methods are substantially free of cobalt-containing salts or complexes. In some embodiments, the present compositions and methods are substantially free of copper-containing salts or complexes. In some embodiments, the present compositions and methods are substantially free of an initiator other than a 1,3-dioxo compound.

In some embodiments, the present compositions and methods have a heat of polymerization from 100 to 950 KJ/Kg, as measured using differential scanning calorimetry. In some embodiments, the heat of polymerization is preferably from 150 to 850 KJ/Kg, and more preferably from 150 to 750 KJ/Kg. The amount of heat generated will depend on the composition of the reactive components as well as the various additives that may be part of the polymerizable composition.

Defined Terminology

It is to be understood that the terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a", "an" and "the" include both singular and plural referents, unless the context clearly dictates otherwise. Thus, for example, "a component" includes one component and plural components.

As used in the specification and appended claims, and in addition to their ordinary meanings, the terms "substantial" or "substantially" mean to within acceptable limits or degree. For example, "substantially free of a component" means that one skilled in the art considers the composition to be free of significant amounts of that component.

As used in the specification and the appended claims and in addition to its ordinary meaning, the term "approximately" means to within an acceptable limit or amount to one having ordinary skill in the art. For example, "approximately the same" means that one of ordinary skill in the art considers the items being compared to be the same.

The term "about" as used herein when referring to a measurable value such as but not limited to, for example, a number of carbon atoms, a period of time, a temperature or a number of days and the like, is meant to encompass variations of ±20%, ±10%, ±5%, ±1%, ±0.5%, or even ±0.1% of the specified amount.

Relative terms, such as "above," "below," "top," "bottom," "upper" and "lower" may be used to describe the various elements' relationships to one another, as illustrated in the accompanying drawings. These relative terms are intended to encompass different orientations of the coatings and/or articles in addition to the orientation described. For example, if the article were inverted, an element described as "above" another element, for example, will now be "below" that element. Similarly, if the article were rotated by 90°, an element described "above" or "below" another element will now be "adjacent" to the other element; where "adjacent" means either abutting the other element, or having one or more layers, materials, structures, etc., between the elements.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, the term "accelerator" or "promoter" includes any and all combinations and may refer to metal complexes, metal salts, amines or quaternary ammonium salts. As used herein, the term "co-accelerator" or "co-promoter" includes any and all combinations and may refer to tertiary amines and/or quaternary ammonium salts.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A "radically polymerizable" component as used herein refers to materials that contain groups that participate in radical polymerization reactions. Examples of radically polymerizable groups are ethylenically unsaturated groups, such as vinyl groups and (meth)acrylate groups. A radically polymerizable component can be a monomer, oligomer, polymer, or other component. In some embodiments, the radically polymerizable component comprises a vinyl-based monomer, such as those characterized by the formula $CHR^1=CR^2R^3$ wherein $R^1$, $R^2$, and $R^3$ each represent a hydrogen atom or an organic group.

"Alkyl" as used herein alone or as part of another group, refers to a straight or branched chain hydrocarbon that can contain from 1, 2, 3, 4, 5, 6 carbon atoms to about 10, 15, 20 or 25 carbon atoms. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, n-decyl, and the like. "Lower alkyl" as used herein, is a subset of alkyl, in some embodiments preferred, and refers to a straight or branched chain hydrocarbon group containing from about 1 to about 4 carbon atoms. Representative examples of lower alkyl include, but are not limited to, methyl, ethyl, n-propyl, iso-propyl, n-butyl, iso-butyl, tert-butyl, and the like. The term "alkyl" or "lower alkyl" is intended to include both substituted and unsubstituted alkyl or lower alkyl unless otherwise indicated and these groups may be substituted with groups selected from halo, alkyl, haloalkyl, alkenyl, alkynyl, cycloalkyl, cycloalkylalkyl, aryl, arylalkyl, heterocyclo, heterocycloalkyl, hydroxyl, alkoxy (thereby creating a polyalkoxy such as polyethylene glycol), alkenyloxy, alkynyloxy, haloalkoxy, cycloalkoxy, cycloalkylalkyloxy, aryloxy, arylalkyloxy, heterocyclooxy, heterocyclolalkyloxy, mercapto, alkyl-S(O)m, haloalkyl-S(O)m, alkenyl-S(O)m, alkynyl-S(O)m, cycloalkyl-S(O)m, cycloalkylalkyl-S(O)m, aryl-S(O)m, arylalkyl-S(O)m, heterocyclo-S(O)m, heterocycloalkyl-S(O)m, amino, carboxy, alkylamino, alkenylamino, alkynylamino, haloalkylamino, cycloalkylamino, cycloalkylalkylamino, arylamino, arylalkylamino, heterocycloamino, heterocycloalkylamino, disubstituted-amino, acylamino, acyloxy, ester, amide, sulfonamide, urea, alkoxyacylamino, aminoacyloxy, nitro or cyano where m=0, 1, 2 or 3.

"Alkenyl" as used herein alone or as part of another group, refers to a straight or branched chain hydrocarbon containing from 1, 2, 3, 4, 5, or 6 carbon atoms to about 10, 15, or 20 carbon atoms (or in lower alkenyl about 1 to about 4 carbon atoms) which include 1 to 4 double bonds in the normal chain. Representative examples of alkenyl include, but are not limited to, vinyl, 2-propenyl, 3-butenyl, 2-butenyl, 4-pentenyl, 3-pentenyl, 2-hexenyl, 3-hexenyl, 2,4-heptadiene, and the like. The term "alkenyl" or "lower alkenyl" is intended to include both substituted and unsubstituted alkenyl or lower alkenyl unless otherwise indicated and these groups may be substituted with groups as described in connection with alkyl and lower alkyl above.

"Alkynyl" as used herein alone or as part of another group, refers to a straight or branched chain hydrocarbon that can contain from 1, 2, 3, 4, 5, 6 carbon atoms to about 10, 15, 20 carbon atoms (or in lower alkynyl 1 to 4 carbon atoms) which include 1 triple bond in the normal chain. Representative examples of alkynyl include, but are not limited to, 2-propynyl, 3-butynyl, 2-butynyl, 4-pentynyl, 3-pentynyl, and the like. The term "alkynyl" or "lower alkynyl" is intended to include both substituted and unsubstituted alkynyl or lower alknynyl unless otherwise indicated and these groups may be substituted with the same groups as set forth in connection with alkyl and lower alkyl above.

"Aryl" as used herein alone or as part of another group, refers to a monocyclic carbocyclic ring system or a bicyclic carbocyclic fused ring system that can have one or more aromatic rings. Representative examples of aryl include, azulenyl, indanyl, indenyl, naphthyl, phenyl, tetrahydronaphthyl, and the like. The term "aryl" is intended to include both substituted and unsubstituted aryl unless otherwise indicated and these groups may be substituted with the same groups as set forth in connection with alkyl and loweralkyl above.

"Arylalkyl" as used herein alone or as part of another group, refers to an aryl group, as defined herein, appended to the parent molecular moiety through an alkyl group, as defined herein. Representative examples of arylalkyl include, but are not limited to, benzyl, 2-phenylethyl, 3-phenylpropyl, 2-naphth-2-ylethyl, and the like.

"Reactive diluent" means liquid or low-viscosity monomers and base resins which dilute other base resins or the resin component, thereby imparting the viscosity necessary for their application, contain functional groups capable of reacting with the base resin or with itself, and, during polymerization (curing), predominantly becomes a component of the cured composite system.

Layers may be directly or indirectly attached to another surface. "Indirect" attachment of one layer to another means that an intermediate layer is between them. For example, a first clear layer may be indirectly attached to a color layer when second clear layer is between the first clear layer and the color layer.

Unless otherwise specified herein, the term "viscosity" refers to the viscosity of a polymer in monomer at 25° C. (77° C.) measured in centipoise (cps) using a Brookfield RV model viscometer. The viscosity under high shear is measured by a cone and plate (CAP) viscometer at a shear rate of 10,0001/s. The term "NVM" refers to non-volatile material dispersed in a volatile substance (e.g., monomer) as measured according to ASTM D1259.

All percentages, amounts and concentrations in this disclosure are by weight unless otherwise indicated.

DETAILED DESCRIPTION

In the following detailed description, for purposes of explanation and not limitation, representative embodiments disclosing specific details are set forth in order to provide a thorough understanding of the present teachings. Descriptions of known systems, devices, materials, methods of operation and methods of manufacture may be omitted so as to avoid obscuring the description of the example embodiments. Nonetheless, systems, devices, materials and methods that are within the purview of one of ordinary skill in the art may be used in accordance with the representative embodiments.

Polymerizable compositions comprising a radically polymerizable component together with one or more other components as described herein have been found to have a stabilized gel time over its shelf life or useful life. In some embodiments, the radically polymerizable composition comprises a manganese- or iron-containing salt or organic complex, a tertiary amine or phosphine, and a nitrogen-containing heterocycle or a thiol compound. In other embodiments, the radically polymerizable composition comprises a 1,3 dioxo compound, a tertiary amine or phosphine, and a nitrogen-containing heterocycle or a thiol compound. In some embodiments, the radically polymerizable composition comprises 1,3 dioxo compound, and a polyhydroxy carboxylic acid or a thiol compound. Various components are included in the polymerizable compositions in amounts sufficient to reduce, suppress or minimize gel-time drift for a desired useable shelf-life of the polymerizable compositions, as compared to an untreated counterpart composition. When curing is desired, the composition is mixed with a 1,3-dioxo compound to initiate the radical polymerization and crosslinking (curing) of the composition.

The manganese or iron-containing salt or complex may be added in several different manners. For example, a metal may be pre-mixed to form a metal salt or metal complex prior to being added to the polymerizable composition. Another option is to add the individual components of the manganese- or iron-containing salt or complex to the polymerizable composition and form the metal salt or complex in situ. The preferred manner will depend on the specific curing process being carried out. Another option approach is to mix first the 1,3-dioxo compound with the radically polymerizable component together with one or more other components such as the polyhydroxy carboxylic acid or the thiol compound to stabilize the gel time drift of the polmerizable component, followed by the addition of the manganese- or iron-containing salt or complex. The mixing may be accomplished by practically any conventional method of mixing.

An advantage of the present compositions and methods is that radically polymerizable compositions are provided which are characterized by a usefully-extended shelf life because of suppression of gel-time drift. Thus a wide variety of compositions may be employed in molding or coating applications where it is required that a gel time be predictable and vary insignificantly from the initial gel time which is characteristic of the resin system just after its manufacture. Radically polymerizable resin systems treated according to the methods of the invention exhibit after-storage gel-time drifts as low as percent of gel-time drifts of untreated counterpart resin systems.

Gel-time drift can be assessed by measuring the gel time of a first portion of a polymerizable composition at an initial time point and the gel time of a second portion of the same composition at one or more subsequent time points, wherein the polymerization conditions and components are otherwise the same. The gel-time drift can be expressed by finding a difference between initial and subsequent gel times and dividing by the initial gel time. Gel-time drift can be calculated as an average gel-time drift, wherein the difference is the average difference between the initial gel time and multiple subsequent gel times, or it can be calculated as a maximum, wherein the difference is the largest difference between the initial gel time and any subsequent gel time. A composition's gel-time drift may be expressed as remaining within a range during a storage period. For example, some embodiments of the present compositions have a gel-time drift of less than 20%, alternatively less than 15%, alternatively less than 10%. The initial gel time is generally measured within 1 or 2 days of the combination of the polymerizable resin with other components. The subsequent gel time is generally measured 15 days, 30 days, 60 days, or another number of days after the initial gel time is measured, so as to provide an assessment of the storage stability of the polymerizable composition over that number of days.

The curing systems can be included in polymerizable compositions to provide thermosetting resin systems with gel times of less than about 60 minutes at temperatures between about 0° C. to about 40° C., alternatively between temperatures of about 5° C. to about 25° C. In some embodiments, the polymerizable composition has a gel time between 10 sec and 60 min, between 30 sec and 60 min, alternatively between 2 min and 60 min, alternatively between 2 min and 25 min. In some embodiments, the polymerizable composition has a time to peak exotherm between 5 min and 60 min, alternatively between 5 min and 30 min. As another aspect, the present invention provides a thermosetting resin system with a gel time drift less than 20% for a shelf-life between about 30 to about 90 days or longer.

Various embodiments of the present compositions provide one or more of the following advantages: The manganese- and iron-containing components are common nontoxic air stable metals, able to form salts and complexes capable to cure the present thermosetting systems. The 1,3-dioxo compounds, compared to peroxides, are thermally stable and do not exhibit sensitivity to decomposition in the presence with oxygen in the air. The metal salts and the 1,3-dioxo compounds do not present hazards in the thermosetting systems or while in storage. The compositions provide predictable systems with a gel time that vary insignificantly from the initial gel time which is characteristic of the resin system just after its manufacture. The curing systems provide excellent performance to obtain products with tack-free surface. The curing systems of the present invention provide an appropriate heat of reaction (polymerization) to obtain the expected physical properties. Using the appropriate vinyl containing thermosetting monomers, low VOC's compositions can be manufactured. Other aspects and advantages will be apparent from the following description and the appended claims.

The present invention is described more fully hereinafter. This invention may, however, be embodied in many different forms and should not be construed as being limited to the embodiments set forth herein. Rather, these embodiments are provided so that this disclosure will be thorough and complete, and will fully convey the scope of the invention to those skilled in the art.

In accordance with some embodiments of the present invention, polymerizable compositions and curing systems are provided which comprise manganese- or iron-containing salts complexes and 1,3-dioxo compounds that have surprisingly been found to provide a solution to one or more of said problems. In some embodiments, the present compositions and methods for the curing of thermosetting resin comprise various combinations of the following components:

(a) a radically polymerizable resin,
(b) a manganese- or iron-containing salt or organic complex,
(c) optionally, a tertiary amine or phosphine,
(d) optionally, a nitrogen containing aromatic heterocycle, or a thiol containing compound,
(e) optionally, a polyhydroxy carboxylic acid,
(f) a 1,3-dioxo compound,
(g) optionally, a transition metal or alkali metal,
wherein the polymerizable composition is substantially free of cobalt, copper, and a peroxide initiator, and the polymerizable composition comprises at least one of:
(1) a combination of (i) a tertiary amine or phosphine, and (ii) a nitrogen-containing aromatic heterocycle or a thiol-containing compound;
(2) a polyhydroxy carboxylic acid; or
(3) a thiol-containing compound;
wherein the polymerizable composition has a gel-time drift less than about 20%, alternatively less than about 15%, for at least 15 days, alternatively for at least 30 days, alternatively for at least 60 days.

In some embodiments, the polymerization compositions and methods comprise the radically polymerizable component (a) combined with the manganese (or iron) salt or complex (b), together with a tertiary amine or phosphine or thiol-containing compound (c) and the nitrogen containing heterocycle (d). To the mixture is then added a 1,3-dioxo compound (f) to start the polymerization and form a crosslinked material.

In some embodiments, the polymerization compositions and methods comprise the radically polymerizable component (a) combined with a polyhydroxy carboxylic acid or a thiol compound, or mixtures thereof (e) and a 1,3-dioxo compound (f). To the polymerization composition is then added the manganese (or iron) salt or complex (b) to start the polymerization and form a crosslinked network.

Alternatively, the component (a) can be mixed with a tertiary amine or phosphine (c), a nitrogen containing aromatic heterocycle or a thiol containing compound (d), and a 1,3-dioxo compound (f), followed by the addition of a manganese or iron containing salt or organic complex (b) to form a crosslinked network. Other combinations of and methods for using components (a)-(g) may be appropriate depending on the chemical nature of component (a) and its composition. One's preferred method for combining the radically polymerizable component with other components will depend on the thermosetting components, inhibitors, any additives being part of the composition, and the final intended applications.

Typically, the gel time of polymerizable compositions may drift after one day to several weeks or months. It is also desirable that the compositions according to the present invention maintain a stable gel time over a specified life time with minimum variation. As another aspect of the invention, there is provided a polymerizaable composition with reduced or minimized drift on gel time over about 30 days, alternatively over about 60 days, or over about 90 days or longer.

In some embodiments, a curing system is provided for curing a polymerizable composition, wherein the curing system comprises a manganese- or iron-containing salt or organic complex and a 1,3-dioxo compound with one or more other components. The curing system may be incorporated into the polymerizable composition all at once, or at different times. For instance, a first portion may be part of the composition for 30 days or more.

In some embodiments, the manganese or iron containing complexes may be from reactions of copper with alkyl organic acids, carboxylates and naphthenates prepared according to U.S. Pat. No. 5,859,267.

In some embodiments, the manganese- or iron-containing complex is:

wherein M is either manganese or iron, R can be H, substituted or unsubstituted linear alkyl, substituted or unsubstituted branched alkyl, substituted or unsubstituted linear alkenyl, substituted or unsubstituted branched alkenyl, substituted or unsubstituted linear alkynyl, substituted or unsubstituted branched alkynyl, substituted or unsubstituted aryl, or substituted or unsubstituted alkylaryl.

In another embodiment, the manganese- or iron-containing complex can be a naphthenate. Naphthenates can be a mixture of various cyclopentyl and cyclohexyl carboxylic acids, or cycloaliphatic carboxylic acids, of molecular weight from about 120 daltons to well over about 700 daltons. Generally, most naphthenic acids have a carbon backbone with about 9 to about 20 carbons. In some embodiments, the naphthenic acids have a carbon backbone of about 10 to about 16 carbons. In some embodiments, naphthenates can be, for example:

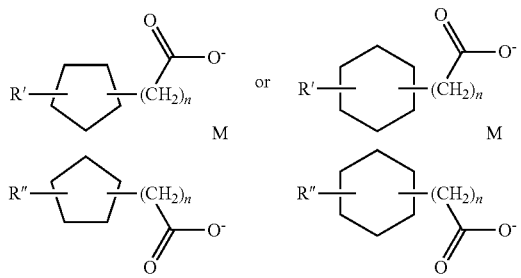

wherein M is either manganese or iron, m and n can be independently an integer of 0 or greater, for example, 0, 1, 2, 3, 4, 5, 6, 10, 15, 20 or greater, and R' and R" can be independently H, substituted or unsubstituted linear alkyl, substituted or unsubstituted branched alkyl, substituted or unsubstituted linear alkenyl, substituted or unsubstituted branched alkenyl, substituted or unsubstituted linear alkynyl, substituted or unsubstituted branched alkynyl, substituted or unsubstituted aryl, or substituted or unsubstituted alkylaryl.

Alternatively, in some embodiments, the manganese- or iron containing complex may be provided as complexes of acetyl acetonates, like those described in U.S. Pat. No. 4,138,385, for example:

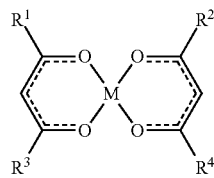

wherein M is either manganese or iron, $R^1$, $R^2$, $R^3$ and $R^4$ each independently can be H, substituted or unsubstituted linear alkyl, substituted or unsubstituted branched alkyl, substituted or unsubstituted linear alkenyl, substituted or unsubstituted branched alkenyl, substituted or unsubstituted linear alkynyl, substituted or unsubstituted branched alkynyl, substituted or unsubstituted aryl, or substituted or unsubstituted alkylaryl.

The manganese- or iron containing complexes may also include salts contained as chlorides, bromides, iodites, nitrates, sulfates, phosphates, oxalates, salicylates, and the like. They may be incorporated alone, in pairs or with one, two or a mixture of the above mentioned metals.

In some embodiments, the manganese- or iron-containing complex added to the resin may be in the range from 0.0001 to about 3.0 percent based on the resin weight. For example, the amount of manganese- or iron containing complex added to the resin may be in the range from 0.0005 to about 1.5 weight percent based on the resin weight. The level of manganese- or iron containing complex added to resin and optionally a transition metal salt essentially free of cobalt may be selected based on the ultimate gel time and curing desired of the thermosetting resin.

In some embodiments, the manganese- or iron-containing complex is an organophosphine metal complex. The organophosphine metal complex can comprise an organophosphine having a structure of Formula P-I:

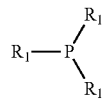

wherein R1 is, independently in each instance, H, hydroxyl, branched or cyclic aliphatic containing C1 to C6; C1-C4 alkoxy; aryl e.g., C6-C20 monocyclic or polycyclic aryl such as phenyl, toluoyl, naphthyl, biphenyl, terphenyl, aryl aromatic containing halogens, amino, silyl; heteroalkyl e.g., C6-C20 monocyclic or polycyclic heteroaryl such as thienyl, furyl, imidazolyl, pyrazolyl, pyridyl, pyrazynyl, pyrimidyl, pyridazinyl, indolyl, quinolyl and isoquinolyl.

In another embodiment, the organophosphine of the manganese- or iron-containing complex has a structure of Formula P-II:

Formula P-II

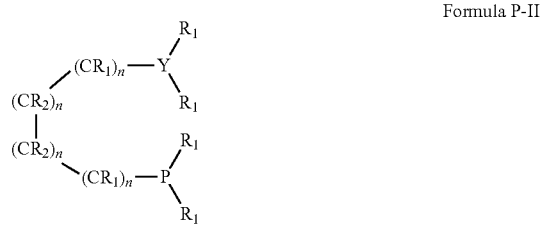

wherein $R^1$ is, independently in each instance, H, hydroxyl, branched or cyclic aliphatic containing C1 to C6, C1-C4 alkoxy; aryl e.g., C6-C20 monocyclic or polycyclic aryl such as phenyl, toluoyl, naphthyl, biphenyl, terphenyl, aryl aromatic containing halogens, amino, silyl; heteroalkyl e.g., C6-C20 monocyclic or polycyclic heteroaryl such as thienyl, furyl, imidazolyl, pyrazolyl, pyridyl, pyrazynyl, pyrimidyl, pyridazinyl, indolyl, quinolyl and isoquinolyl; $R^2$ is, independently in each instance, H, linear, branched or cyclic aliphatic containing C1 to C14, alkyl aromatic, aryl aromatic containing halogens, amino, silyl or alkoxy groups and be interconnected by an aliphatic or an aromatic ring between $R^1$ groups, $R^2$ groups or $R^1$ and $R^2$ groups; n is 0 to 4; and Y is either N or P.

In another embodiment, the organophosphine of the manganese- or iron-containing complex has a structure of Formula P-III:

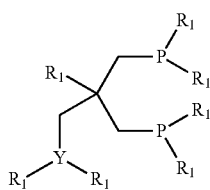

Formula P-III wherein $R^1$ is, independently in each instance, H, hydroxyl, branched or cyclic aliphatic containing C1 to C6, C1-C4 alkoxy; aryl e.g., C6-C20 monocyclic or polycyclic aryl such as phenyl, toluoyl, naphthyl, biphenyl, terphenyl, aryl aromatic containing halogens, amino, silyl; heteroalkyl e.g., C6-C20 monocyclic or polycyclic heteroaryl such as thienyl, furyl, imidazolyl, pyrazolyl, pyridyl, pyrazynyl, pyrimidyl, pyridazinyl, indolyl, quinolyl and isoquinolyl; and Y is N or P.

In another embodiment, the organophosphine of the manganese- or iron-containing complex has a structure of Formula P-IV:

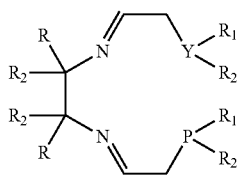

Formula P-IV wherein: R is, independently in each instance, H, linear, branched or cyclic aliphatic containing C1 to C14, alkyl aromatic, aryl aromatic containing halogen, amino or alkoxy groups; $R^1$ is, independently in each instance, H, hydroxyl, branched or cyclic aliphatic containing C1 to C6, C1-C4 alkoxy; aryl e.g., C6-C20 monocyclic or polycyclic aryl such as phenyl, toluoyl, naphthyl, biphenyl, terphenyl, aryl aromatic containing halogens, amino, silyl; heteroalkyl e.g., C6-C20 monocyclic or polycyclic heteroaryl such as thienyl, furyl, imidazolyl, pyrazolyl, pyridyl, pyrazynyl, pyrimidyl, pyridazinyl, indolyl, quinolyl and isoquinolyl; $R^2$ is, independently in each instance, H, linear, branched or cyclic aliphatic containing C1 to C14, alkyl aromatic, aryl aromatic containing halogen, silyl, amino or alkoxy grow ups and be interconnected by an aliphatic or an aromatic ring; and Y is either N or P.

Examples of organophosphine metal complexes include, but are not limited, to those containing the following as ligands within the complex: (2,4)-Bis(di-tert-butylphosphino)pentane, 1,4-Bis(di-tertbutylphosphino)butane, 1,2-Bis(di-tert-butylphosphino) ethane, Bis(di-tert-butylphosphino)methane, Bis(di-tert-butylphosphino)pentane, 1,3-Bis(ditertbutylphosphino) propane, 1,2-Bis(dicyclohexylphosphino)ethane, 1,3-Bis(dicyclohexylphosphino)propane, 1,4-Bis(dimethylphosphino)butane, 1,2-Bis(dimethylphosphino)ethane, 1,3-Bis(dimethylphosphino)propane, Bis(dimethylamino) methylphosphine, di-tertbutylmethylphosphine, di-tert-butylneopentylphosphine, di-tert-butylphenylphosphine, dicyclohexylnorbornylphosphine, dripropylphosphine, triisopropylphosphine, tri-tert-butylphosphine, triisobutylphosphine, tricyclohexylphosphine, tris(2-furyl)phosphine, tris(3-methoxypropyl) phosphine, tris(1-naphthyl)phosphine, trimethylphosphine, triethylphosphine, diethylphenylphosphine, triphenylphosphine, ortho-phenylene bis(diphenylphosphine), ortho-phenylene bis(dimethylphosphine), ortho-phenylene bis(diethylphosphine), ortho-phenylene bis(ethylphenylphosphine), tris(diphenylphosphinoethyl)phosphine, tris(diethylphosphinoethyl) phosphine, tris(dimethylphosphinoethyl)phosphine, tris(ethylpheny lphosphinoethyl)phosphine, (2-methoxyphenyl) methylphenylphosphine, 1-Bromo-2-diphenylphosphinobenzene, dimethyl(phenyl)phosphine, cyclohexyldiphenylphosphine, cicyclohexylphenylphosphine, Bis(3,5-ditrifluoromethylphenyl)phenylphosphine, di-tert-butyl (4-dimethylaminophenyl)phosphine, (4-dimethylaminophenyl) diphenylphosphine, Bis(2-(bis(diethylamido)phosphino) phenyl)ether, Bis(2-diphenylphosphinoethyl) phenylphosphine, 2,6-Bis(diphenylphosphinomethyl) pyridine, 2,6-Bis[bis(3,5-dimethylphenyl)phosphinomethyl] pyridine, 2-(diphenylphosphino)pyridine, Bis(2-diphenylphosphinophenyl) ether, diphenylphosphinostyrene, ethyldiphenylphosphine, methyldiphenylphosphine, 2,2'-Bis(diphenylphosphino)-1,1'-binaphthyl, (2,3)-Bi s(diphenylphosphino)butane, (2,5)-Bis(diphenylphosphino)hexane, 1,2-Bis(diphenylphosphino) propane, (1,2)-Bis[(2-methoxyphenyl) phenylphosphino] ethane, 2,2'-Bis[bis(3,5-dimethylphenyl) phosphino]-1,1'-binaphthyl, 1,4-Bis[bis(3,5-dimethylphenyl) phosphino] butane, 1,2-Bis[bis(3,5-dimethylphenyl)phosphino] ethane, Bis[bis(3,5-dimethylphenyl)phosphino] methane, 1,5-Bis[bis(3,5-dimethylphenyl)phosphino]pentane, 1,3-Bis[bis(3,5-dimethylphenyl)phosphino]propane, 2,2'-Bis[bis(3,5-ditrifluoromethylphenyl)phosphino]-1,1'-binaphthyl, 2,2'-Bis(di-p-tolylphosphino)-1,1 '-binaphthyl, (1,2)-Bis[(2-methoxyphenyl)phenylphosphino]ethane, 1,3-Bis[bis(0-methoxyphenyl)phosphino]propane, 1 A-Bis[bis(3,5-ditrifluoromethylphellyl)phosphino]butane, 1,2-Bis[bis(3,5-ditrifluoromethylphenyl)phosphino] ethane, Bis[bis(3,5-ditrifluoromethylphenyl)phosphino]methane, 1,3-Bis[bis(3,5-ditrifluoromethylpheny l)phosphino] propane, Bis[bis(3,5-25 ditrifluoromethylphenyl)phosphino] methane, 1,2-Bis(ditert-butylphosphino)benzene, 2,2'-Bis(ditertbutylphosphino) biphenyl, 1,2-Bis(ditertbutylphosphinomethyl)benzene, 1,3-Bis(ditertbutylphosphinomethyl)benzene, 1,2-Bis (dicyclohexylphosphino)benzene, 2,2'-Bis(dicyclohexylphosphino)-1,1'-binaphthyl, 2,2'-Bis(dicyclohexylphosphino)biphenyl, 1,2-Bis(diphenylphosphino)benzene, 2,2'-Bis(diphenylphosphino)-1,1'-binaphthyl, 2,2'-Bis (diphenylphosphino)-1,1'-biphenyl,1,4-is (diphenylphosphino)butane, 1,2-Bis(diphenylphospltino) ethane, Bis(2-diphenylphospltino)ethyl ether, Bis(2- diphenylphosphinoethyl)phenylphosphine, 1,6-Bis (diphenylphospltino)hexane, Bis(diphenylphosphino) methane, 1,5-Bis(diphenylphosphino)pentane, Bis(2-diphenylphosphinophenyl)ether, 1,3-Bis (diphenylphosphino)propane, 2,2'-Bis[bis(3,5-dimethylphenyl)phosphino]-1,1'-binaphthyl, 2,2'-Bis[bis(3, 5-ditrifluoromethylphenyl)phosphino]-1,1'-binaphthyl, 2,2'Bis[bis(4-methylphenyl)phosphino]-5,5',6,6',7,7',8,8'-octahydro-1,1'-binaphthyl, (1R,2R)-Bis[(2-methoxyphenyl) phenylphosphino] ethane, 1,1'-Bis[bis(diethylamino) phosphino]ferrocene, 1,1'-Bis(di-tert-butylphosphino)ferrocene, 1,1'-Bis(dicyclohexylphosphino)ferrocene, 2-tert-Butyl-imino-2-diethylamino-1,3-dimethyl-perhydro-1,3,2-diaza-phosphorine, tert-Butylimino-tri(pyrrolidino)phosphorane, hexaethylphosphorous triamide, hexaisopropylphosphorus triamide, Tris(4-morpholino) phosphine, and the like, and combinations thereof. In some embodiments, the organo-phosphine metal complex containing compound added to the resin may be in the range from 0.0001 to about 3.0 percent based on the resin weight. In one embodiment, the amount of organophosphine metal complex containing compound added to the resin may be in the range from 0.001 to about 1.0 weight percent based on the resin weight. In another embodiment, the amount of organophosphine metal complex containing compound added to the resin may be in the range from 0.001 to about 0.5 weight percent by weight based on the resin weight. The level of organophosphine metal complex containing compound added to resin and the optional transition metal salt essentially free of cobalt may depend on the ultimate gel time and curing desired of the thermosetting resin. In other embodiments, the thermosetting resin may also include a tertiary amine and optionally a quaternary ammonium salt used as co-promoters to cure the resin systems.

In some embodiments, the radically polymerizable composition comprises at least one metal complex selected from manganese (Mn) or iron (Fe) containing complexes comprising a monodentate, bidentate, tridentate, tetradentate, pentadentate or hexadentate nitrogen donor ligand.

In some embodiments, the at least one metal complex is a Mn or Fe complex of a bidentate, tridentate, tetradentate, pentadentate or hexadentate nitrogen donor ligand. For instance, the iron ion can be selected from Fe(II) and Fe(III) and the manganese ion can be selected from Mn(II), Mn(III) and Mn (IV). In some embodiments, the ligand L is present in one or more of the forms [MnLCl$_2$], [FeLCl$_2$]; [FeLCl]Cl; [FeL(H$_2$O)](PF$_6$)$_2$:[FeL]Cl$_2$, [FeLCl]PF$_6$ and [FeL(H20)] (BF4)2. Preferably the ligand L is present in one or more of the form [MnLCl$_2$], [FeLCl$_2$]; [FeLCl]Cl; [FeL]Cl$_2$ and [FeL(H2O)](BF$_4$)$_2$.

As used herein the term "nitrogen-donor ligand" or "ligand" or "L" is an organic structure or molecule which will support coordinating nitrogen atoms. In the present invention, said at least one nitrogen-donor ligand is selected from the group comprising mono dentate, bidentate, tridentate, tetradentate, pentadentate and hexadentate nitrogen donor ligands. For suitable non-limiting examples of mono dentate, bidentate, tridentate, tetradentate, pentadentate and hexadentate nitrogen donor ligands reference is made to U.S. Pat. Nos. 2,526,718, 2,565,897, 4,311,625, WO 2008/003652 and DE 4032546, the entirety of each of which are hereby incorporated by reference.

In some embodiments, the present compositions comprise one or more promoters that are iron- or manganese-containing complexes of tridentate, tetradentate, pentadentate or hexadentate nitrogen donor ligands, N-heterocyclic compounds or N-heteroaromatic compounds.

In some embodiments, said at least one nitrogen donor ligand is selected from the group comprising ligands of Formula N-I, N-II, N-IV, N-V, N-VI, N-VII, and/or from ligands comprising N-heterocyclic compounds or N-hetero aromatics:

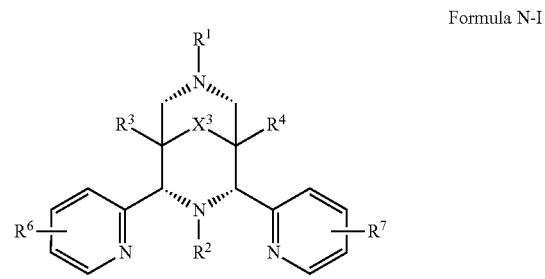

Formula N-I

Formula N-II

Formula N-III

Formula N-IV

Formula N-V

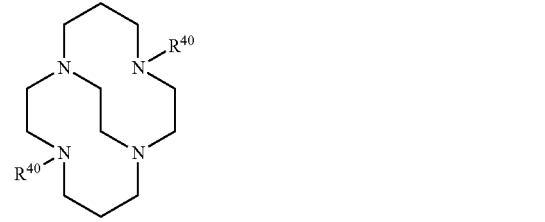

Formula N-VI

Formula N-VII

In some embodiments, the manganese- or iron-containing complex has a ligand of Formula N-I, which generally belong to the bispidon class, and which are preferably in the form of manganese metal complex,

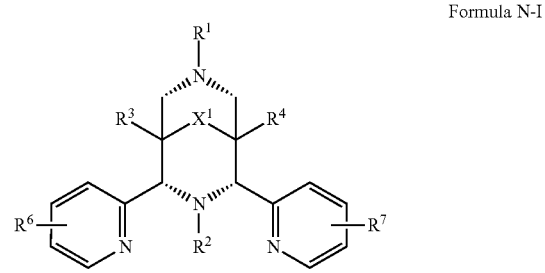

Formula N-I wherein $R^1$ and $R^2$ are independently selected from the group consisting of $C_{1-24}$ alkyl, $C_{6-10}$ aryl, heteroaryl, heteroaryl $C_{1-6}$ alkyl, and $-CH_2-CH_2-N(CH_3)_2$, wherein heteroaryl is selected from the group consisting of pyridyl, pyrazinyl, pyrazolyl, pyrrolyl, imidazolyl, benzimidazolyl, pyrimidinyl, triazolyl and thiazolyl;

$R^3$ and $R^4$ are independently selected from the group consisting of $-H$, $C_{1-8}$ alkyl, $C_{1-8}$alkyl-O—$C_{1-8}$ alkyl, $C_{1-8}$alkyl-O—$C_{6-10}$aryl, $C_{6-10}$aryl, $C_{1-8}$-hydroxyalkyl, and $-(CH_2)_mC(O)OR^5$;

$R^5$ is selected from $-H$ or $C_{1-4}$alkyl, m is an integer selected from 0 to 4;

each $R^6$ and $R^7$ are independently selected from the group consisting of $-H$, $-F$, $-Cl$, $-Br$, $-OH$, $C_{1-4}$alkoxy, $-NH-C(O)-H$, $-NH-C(O)-C_{1-4}$alkyl, $-NH_2$, $-NH-C_{1-4}$alkyl, and $C_{1-4}$alkyl;

$X^1$ is selected from $-C(O)-$ or $-[C(R^8)_2]_n$ wherein n is an integer selected from 0 to 3, and each $R^8$ is independently selected from the group consisting of $-H$, $-OH$, $C_{1-4}$ alkoxy and $C_{1-4}$alkyl.

In some embodiments, $R^3$ and $R^4$ are selected from $-C(O)O-CH_3$, $-C(O)-O-CH_2-CH_3$, $-C(O)-O-CH_2-C_6H_5$ and $CH_2OH$. In some embodiments, the heteroatom capable of coordinating to a transition metal is pyridine-2-ylmethyl optionally substituted by $C_{1-4}$alkyl. In some embodiments, $X^1$ is C=O, and/or $R^1$ and $R^2$ are $CH_3$, $C_2H_5$, $C_3H_7$, benzyl, $C_4H_9$, $C_{12}H_{25}$, and $C_{18}H_{37}$, $CH_2$-pyridyl, or pyridin-2-yl. An exemplary class of bispidon is one in which at least one of $R^1$ or $R^2$ is pyridin-2-yl methyl or benzyl, preferably pyridin-2-yl methyl. In some embodiments, $R^1$ is pyridin-2-yl methyl and $R^2$ is methyl.

A preferred bispidon is dimethyl 2,4-di-(2-pyridyl)-3-methyl-7-(pyridin-2-yl methyl)-3,7-diaza-bicyclo[3.3.1] nonan-9-one-1,5-dicarboxylate (N2py3$_0$-Cl) and the manganese complex thereof. FeN2py30-Cl which can be prepared as described in WO 02/48301. Other preferred bispidons are one in which instead of having a methyl group at the 3 position have longer alkyl chains, namely isobutyl, (n-hexyl) $C_6$, (n-octyl) $C_8$, (n-dodecyl) $C_{12}$, (n-tetradecyl) $C_{14}$, (n-octadecyl) $C_{18}$, which were prepared in an analogous manner. Preferred tetradentate bispidons are also described in WO00/60045 and preferred pentadentate bispidons are described in WO02/48301 and WO031104379 the entirety of each of which are hereby incorporated by reference.

In some embodiments, the metal complex has a ligand of Formula N-II, which may also be referred to as "N4py type ligand", and which are preferably in the form of manganese metal complex,

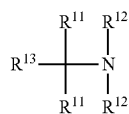

Formula N-II wherein $R^{11}$ and $R^{12}$ are each independently a group of formula $-R^{14}$-$R^{15}$;

$R^{13}$ is selected from the group consisting of $-H$, $-R^{14}-R^5$, and an optionally substituted group selected from the group consisting of $C_{1-6}$alkyl, $C_{6-10}$aryl and $C_{6-10}$ aryl-$C_{1-6}$ alkyl;

each $R^{14}$ is independently selected from a single covalent bond or an optionally substituted group selected from the group consisting of $C_{1-6}$alkylene, $C_{2-6}$ alkenylene, $C_{1-6}$alkyleneoxy, amino$C_{1-6}$alkylene, $C_{2-6}$alkylene ether, carboxylic ester and carboxylic amide; and each $R^{15}$ is independently selected from an optionally N-substituted amino alkyl group or an optionally substituted heteroaryl group selected from the group consisting of pyridyl, pyrazinyl, pyrazolyl, pyrrolyl, imidazolyl, benzimidazolyl, pyrimidinyl, triazolyl and thiazolyl.

In some embodiments $R^{11}$ represents pyridin-2-yl or $R^{12}$ represents pyridin-2-yl-methyl. Preferably $R^{12}$ or $R^{11}$ represents 2-amino-ethyl, 2-(N-(m)ethyl)amino-ethyl or 2-(N,N-di(methyl)amino-ethyl. If substituted, $R^{15}$ can represent 3-methylpyridin-2-yl. $R^{13}$ can represent hydrogen, benzyl or methyl.

In some embodiments, the preferred ligands are N4Py (i.e. N,N-bis(pyridin-2-yl-methyl)-bis(pyridin-2-yl) methylamine) as described in WO95/34628 and MeN4py (i.e. N,N-bis(pyridin-2-yl-methyl-1,1-bis(pyridin-2-yl)-1-aminoethane, as described in EP0909809 the entirety of each of which are hereby incorporated by reference.

In some embodiments, the metal complex comprises a ligand of Formula N-III, which may also be referred to as the TACN-Nx. Such ligands possess the basic 1,4,7-triazacyclononane structure but have one or more pendent nitrogen groups that complex with the metal to provide a tetradentate, pentadentate or hexadentate ligand.

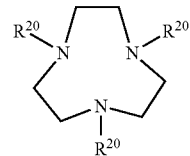

Formula N-III wherein each $R^{20}$ is independently selected from the group consisting of $C_{1-6}$alkyl, $C_{3-8}$cycloalkyl, heterocycloalkyl, heteroaryl, $C_{6-10}$aryl and $C_{6-10}$aryl-$C_{1-6}$alkyl, optionally substituted with a substituent selected from the group consisting of $-OH$, $C_{1-6}$alkoxy, phenoxy, carboxylate, carboxamide, carboxylic ester, sulfonate, amine, $C_{1-6}$alkylamine and $N^+(R^{21})_3$; each $R^{21}$ is selected from $C_{1-6}$alkyl, $C_{2-6}$alkenyl, $C_{6-10}$aryl-$C_{2-6}$ alkenyl, $C_{1-6}$alkyloxy, $C_{2-6}$alkenyloxy, amino$C_{1-6}$alkyl, amino$C_{2-6}$alkenyl, $C_{1-6}$alkyl ether, $C_{2-6}$alkenyl ether, and $-CX^2_2-R^{22}$;

each $X^2$ is independently selected from $-H$ or $C_{1-3}$alkyl and wherein each $R^{22}$ is independently selected from an optionally substituted heteroaryl group selected from the group consisting of pyridyl, pyrazinyl, pyrazolyl, pyrrolyl, imidazolyl, benzimidazolyl, pyrimidinyl, triazolyl and thiazolyl; and at least one of $R^{21}$ is $-CX^2-R^{22}$.

In some embodiments, $R^{22}$ is selected from optionally substituted pyridin-2-yl, imidazol-4-yl, pyrazol-1-yl, quinolin-2-yl groups. For instance, $R^{22}$ can be a pyridin-2-yl or a quinolin-2-yl. In some embodiments, the basic 1,4,7-triazacyclononane structure has two pendent nitrogen groups that complex with the transition metal (TACN-N2).

In some embodiments, the metal complex comprises a ligand of Formula N-IV, which may be referred to as cyclam and cross bridged ligands, and which are preferably in the form of a manganese metal complex;

Formula N-IV wherein each $X^3$ is independently selected from

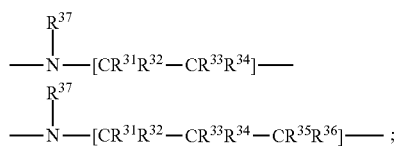

wherein p is 4; each $R^{37}$ is independently selected from the group consisting of —H, $C_{1-6}$alkyl, —CH$_2$CH$_2$OH, pyridin-2-ylmethyl and —CH$_2$C(O)OH; and each $R^{31}$, $R^{32}$, $R^{33}$, $R^{34}$, $R^{35}$ and $R^{36}$ are independently selected from: —$C_{1-4}$alkyl and $C_{1-4}$-hydroxyalkyl:

In some embodiments, a cyclam ligand is selected from 1,4,8,11-tetraazacyclotetradecane (cyclam), 1,4,8,11-tetramethyl-1,4,8,11-tetraazacyclotetradecane(Me4cyclam), 1,4,7,10-tetraazacyclododecane (cyclam), 1,4,7,10-tetramethyl-1,4,7,10-tetraazacyclododecane (Me4 cyclam), and 1,4,7,10-tetrakis(pyridine-2-ylmethyl)-1,4,7,10-tetraazacyclododecane (Py4cyclan). With Py4 cyclam the iron complex is preferred.

A preferred cross-bridged ligand is preferably of Formula N-V:

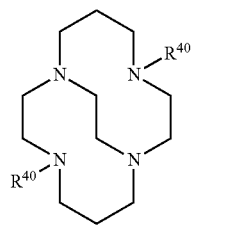

Formula N-V wherein each $R^{40}$ is independently selected from —H or a optionally substituted group selected from the group consisting of $C_{1-20}$alkyl, $C_{1-6}$alkyl, $C_{6-10}$aryl, $C_{2-6}$ alkenyl or $C_{2-6}$-alkynyl; and all nitrogen atoms in the macropolycyclic rings are coordinated with the transition metal. In some embodiments, $R^{40}$ is methyl, which is the ligand 5,12-dimethyl-1,5,8, 12-tetraaza-bicyclo[6.6.2]hexadecane of which the complex [Mn(Bcyclam)Cl2] may be synthesized as described in WO 98/39098 the entirety of which is hereby incorporated by reference. Other suitable crossed bridged ligands are also described in WO98/39098 the entirety of which is hereby incorporated by reference.

In some embodiments, the metal complex comprises a ligand of Formula N-VI, which may also be referred to as "trispicen-type." The trispicens are preferably in the form of an manganese metal complex, $(R^{50})_nN$—$X^4$—$N(R^{50})_2$, 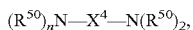 Formula N-VI wherein $X^4$ is selected from —CH$_2$CH$_2$—, —CH$_2$CH$_2$CH$_2$—, —CH$_2$C(OH)HCH$_2$—;
each $R^{50}$ is independently selected from the group consisting of —H, $C_{1-6}$alkyl, $C_{3-8}$ cycloalkyl, heterocycloalkyl, heteroaryl, $C_{6-10}$aryl and $C_{6-10}$aryl-$C_{1-6}$alkyl, optionally substituted with a substituent selected from —OH, $C_{1-6}$alkoxy, phenoxy, carboxylate, carboxamide, carboxylic ester, sulfonate, aniline, $C_{1-6}$alkylamine and —N$^+$(R$^{51}$)$_3$;

wherein each $R^{51}$ is selected from —H, $C_{1-6}$alkyl, $C_{2-6}$alkenyl, $C_{6-10}$aryl, $C_{1-6}$alkyl, $C_{6-10}$aryl, $C_{2-6}$alkenyl, $C_{1-6}$alkyloxy, $C_{2-6}$alkenyloxy, amino$C_{1-6}$alkyl, amino$C_{2-6}$ alkenyl, $C_{1-6}$alkyl ether, $C_{2-6}$alkenyl ether, and —C($X^5$)$_2$—$R^{52}$;

each $X^5$ is independently selected from —H or $C_{1-3}$alkyl and wherein each $R^{52}$ is independently selected from an optionally substituted heteroaryl group selected from the group consisting of pyridyl, pyrazinyl, pyrazolyl, pyrrolyl, imidazolyl, benzimidazolyl, pyrimidinyl, triazolyl and thiazolyl; and at least two of $R^{50}$ are —C($X^5$)$_2$—$R^{52}$. The heteroatom donor group is preferably pyridinyl optionally substituted by —$C_{0-4}$ alkyl. Other preferred heteroatom donor groups are imidazol-2-yl, 1-methyl-imidazol-2-yl, 4-methyl-imidazol-2-yl, imidazol-4-yl, 2-methyl-imidazol-4-yl, l-methyl-imidazol-4-yl, benzimidazol-2-yl and l-methyl-benzimidazol-2-yl. Preferably three of $R^{50}$ are C($X^5$)$_2$—$R^{52}$.

The following are preferred trispicens: N-methyltris(pyridin-2-ylmethyl)ethylene-1,2-diamine; N-octyl-tris(pyridin-2-ylmethyl)ethylene-1,2-diamine; N-octadecyl-tris(pyridin-2-ylmethyl)ethylene-1,2-diamine; N-methyl-N,N',N'-tris(3-methyl-pyridin-2-ylmethyl) ethylene-1,2-diamine; N-ethyl-N,N',N'-tris(3-methyl-pyridin-2-ylmethyl)ethylene-1,2-diamine; N-methyl-N,N',N'-tris(5-methyl-pyridin-2-ylmethyl)ethylene-1,2-diamine; N-ethyl-N,N',N'-tris(5-methyl-pyridin-2-ylmethyl)ethylene-1,2-diamine; N-benzyl-N,N',N'-tris(3-methyl-pyridin-2-yl methyl)ethylene-1,2-diamine; N-benzyl-N,N',N'-tris(5-methyl-pyridin-2-yl methyl)ethylene-1,2-diamine; N-butyl-N,N',N'-tris(pyridin-2-ylmethyl)ethylene-1,2-diamine; N-octyl-N,N',N'tris(pyridin-2-ylmethyl)ethylene-1,2-diamine; N-dodecyl-N,N',N'-tris(pyridin-2-ylmethyl)ethylene-1,2-diamine; N-octadecyl-N,N',N'-tris(pyridin-2-ylmethyl) ethylene-1,2-diamine; N-Methyl-N,N',N'-Tris(imidazole-2-ylmethyl)-ethylenediamine; N-ethyl-N,N',N'-Tris(imidazol-2-ylmethyl)ethylenediamine; N,N'-dimethyl-N,N'-bis(imidazol-2-ylmethyl)-ethylenediamine; N-(1-propan-2-ol)-N,N',N'-Tris(imidazol-2-ylmethyl)-ethylenediamine; N-(1-propan-2-ol)N,N',N'-Tris(1-methyl-imidazol-2-ylmethyl) ethylenediamine; N,N-diethyl-N',N'',N'''-Tris(5-methylimidazol-4-ylmethyl)-diethylenetriamine; N-(3-propan-lol)-N,N',N'-Tris(1-methyl-imidazol-2-ylmethyl) ethylenediamine; N-hexyl-N,N',N'-Tris(imidazol-2-ylmethyl)-ethylenediamine; N-methyl-N,N',N'-tris(benzimidazol-2-ylmethyl)-ethylenediamine; and, N-(3-propan-1-ol)methyl-N,N',N'-tris(benzimidazol-2-yl methyl) ethylenedianline. Other suitable trispicens are described in WO 02/077145.

Other suitable nitrogen donor ligands for the manganese- and iron-containing complexes are ligands of Formula N-VII:

N(R$^{60}$)  Formula N-VII wherein each $R^{60}$ is independently selected from the group consisting of —H, $C_{1-6}$ alkyl, $C_{6-10}$ aryl, $C_{1-6}$alkyl-$C_{6-10}$aryl and $C_{2-6}$alkenyl.

In some embodiments, bispidon and TACN-Nx ligands are used.

Non-limiting examples of preferred nitrogen donor ligands are selected from the group comprising of the compounds of Formulas N-Ia, N-XIb, N-XIII, N-XIV, N-XV:

Formula N-Ia

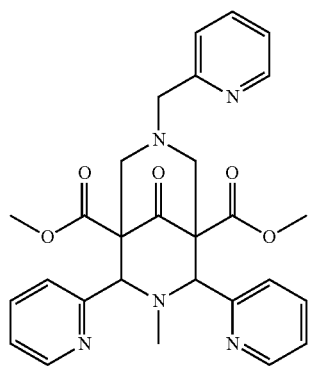

Formula N-Ib

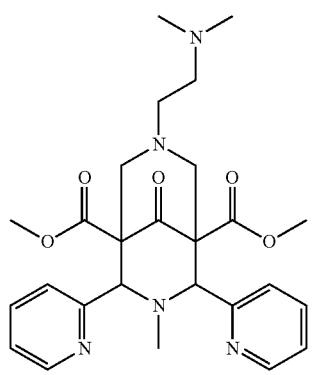

Formula N-XIII

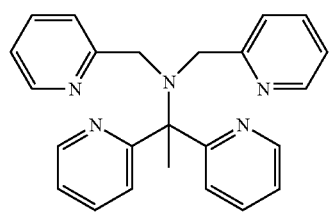

Formula N-XIV

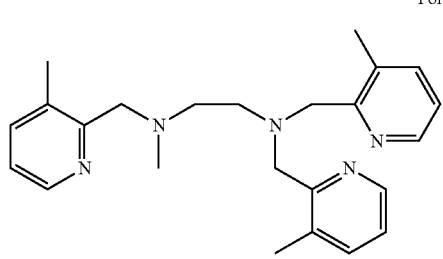

Formula N-XV

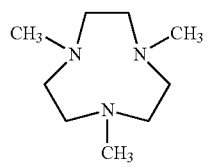

In some embodiments, the metal complex is of Formula N-XX:

Formula N-XX

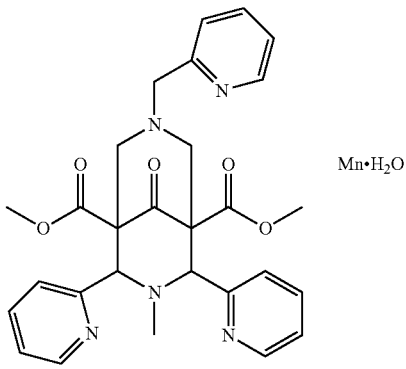

In some embodiments, the metal complex is of Formula N-XXI:

Formula N-XXI

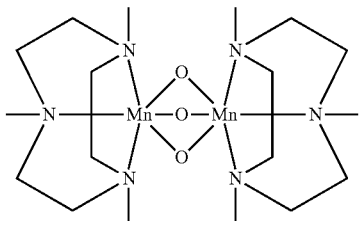

The complex of Formula N-XXI is the active ingredient of Drycoat.

In some embodiments, the ligands of the manganese- or iron-containing complex are selected from porphyrin ligands. A porphyrin is a compound containing four nitrogen heterocycles arranged in a cyclic structure. For example, in some embodiments, the porphyrin ligands of interest have the structure of Formula Y-I:

Formula Y-I

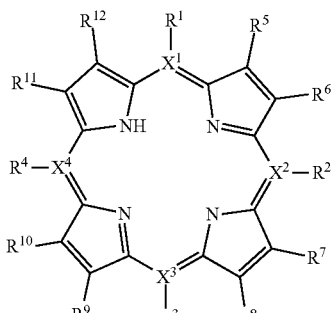

wherein $X^1$, $X^2$, $X^3$, and $X^4$ are independently selected from C and N;
$R^1$-$R^{12}$ are independently selected from hydrogen, halo, $C_1$-$C_{24}$ alkyl, $C_2$-$C_{24}$ alkenyl, $C_2$-$C_{24}$ alkynyl, $C_5$-$C_{20}$ aryl, $C_6$-$C_{24}$ alkaryl, $C_6$-$C_{24}$ aralkyl, hydroxyl, $C_1$-$C_{24}$ alkoxy, $C_2$-$C_{24}$ alkenyloxy, $C_2$-$C_{24}$ alkynyloxy, $C_5$-$C_{20}$ aryloxy, acyloxy, acyl, $C_2$-$C_{24}$ alkoxycarbonyl, $C_6$-$C_{20}$ aryloxycarbonyl, $C_2$-$C_{24}$ alkylcarbonyl, $C_6$-$C_{20}$ arylcarbonyl, halocarbonyl, formyl, thioformyl, $C_2$-$C_{24}$ alkylcarbonato, $C_6$-$C_{20}$ arylcarbonato, carboxy, carboxylato, earbamoyl, thiocarbamoyl, carbamato, carbamido, cyano, isocyano, cyanato, isocyanato, isothiocyanato, amino, $C_2$-$C_{24}$ alkylamido, $C_6$-$C_{20}$ arylamido, imino, alkylimino, arylimino, nitro, nitroso, sulfhydryl, $C_1$-$C_{24}$ alkylsulfanyl, $C_5$-$C_{20}$ arylsulfanyl, sulfo, sulfino, sulfonyl, phosphino, phosphono, and O-phosphono, provided that when $X^1$, $X^2$, $X^3$, or $X^4$ is N, then the corresponding R group ($R^1$, $R^2$, $R^3$, or $R^4$, respectively) is not present. Any such groups may be unsubstituted or substituted and may contain one or more heteroatoms as appropriate (i.e., as the chemical nature of the group allows for such substitution or heteroatoms). Furthermore, any two adjacent groups selected from R1_R12 may be taken together to form a cycle, wherein such cycle may be aliphatic, aromatic, heteroatom-containing, and/or substituted as appropriate.

For example, in some embodiments, $X^1$, $X^2$, $X^3$, and $X^4$ are N, and $R^1$, $R^2$, $R^3$, and $R^4$ are not present. In some embodiments, $R^1$, $X^2$, $X^3$, and $X^4$ are C, and $R^2$, $R^3$, and $R^4$ are present. In some embodiments, one or more of $X^1$, $X^2$, $X^3$, and $X^4$ are C, and one or more of $X^1$, $X^2$, $X^3$, and $X^4$ are N.

For example, $R^1$-$R^{12}$ are independently selected from: hydrogen; halo, including F, CI, Br, and I; substituted or unsubstituted $C_1$-$C_{24}$ alkyl, $C_2$-$C_{24}$ alkenyl, $C_2$-$C_{24}$ alkynyl, $C_5$-$C_{20}$ aryl, $C_6$-$C_{24}$ alkaryl, and $C_6$-$C_{24}$ aralkyl; substituted or unsubstituted heteroatom-containing $C^1$-$C^{24}$ alkyl, $C^2$-$C^{24}$ alkenyl, $C^2$-$C^{24}$ lkynyl, $C_5$-$C_{20}$ aryl, $C_6$-$C_{24}$ alkaryl, and $C_6$-$C_{24}$ aralkyl; hydroxyl; substituted or unsubstituted $C_1$-$C_{24}$ alkoxy, $C_2$-$C_{24}$ alkenyloxy, $C_2$-$C_{24}$ alkynyloxy, $C_5$-$C_{20}$ aryloxy, and acyloxy; acyl, $C_2$-$C_{24}$ alkoxycarbonyl, $C_6$-$C_{20}$ aryloxycarbonyl, $C_2$-$C_{24}$ alkylcarbonyl, $C_6$-$C_{20}$ arylcarbonyl, halocarbonyl, formyl, and thioformyl; $C_2$-$C_{24}$ alkylcarbonato and $C_6$-$C_{20}$ arylcarbonato; carboxy and carboxylato (including $C_2$-$C_{24}$ alkylcarboxylato and $C_6$-$C_{20}$ arylcarboxylato); carbamoyl (including mono-($C_1$-$C_{24}$ alkyl)-substituted carbamoyl, di-($C_1$-$C_{24}$ alkyl)-substituted carbamoyl, monosubstituted arylcarbamoyl, and mixed alkyl/aryl substituted carbamoyl) and thiocarbamoyl; carbamato (including mono-($C_1$-$C_{24}$ alkyl)-substituted carbamato, di-($C_1$-$C_{24}$ alkyl)-substituted carbamato, monosubstituted arylcarbamato, and mixed alkyl/aryl substituted carbamato); carbamido, cyano, isocyano, cyanato, isocyanato, and isothiocyanato; amino (including mono- and di-($C_1$-$C_{24}$ alkyl)-substituted amino, mono- and di-($C_5$-$C_{20}$ aryl)-substituted amino, and mixed alkyl/aryl substituted amino); alkylamido and $C_6$-$C_{20}$ arylamido; imino, alkylimino, and arylimino; nitro; nitroso; sulfhydryl (including $C_1$-$C_{24}$ alkylsulfanyl, and $C_5$-$C_{20}$ arylsulfanyl); sulfo (including $C_1$-$C_{24}$ alkylsulfonato, and $C_5$-$C_{20}$ arylsulfonato); sulfino (including $C_1$-$C_{24}$ alkylsulfinyl, and sulfinyl); arylsulfinyl); sulfonyl (including $C_1$-$C_{24}$ alkylsulfonyl, and $C_5$-$C_{20}$ arylsulfonyl); phosphino (including mono-, di-, and tri-($C_1$-$C_{24}$ alkyl)substituted phosphinato, mono-, di-, and tri-($C_5$-$C_{20}$ aryl)-substituted phosphinato, mixed alkyl/aryl substituted phosphinato, and phosphine oxides); and phosphono (including mono- and di-($C_1$-$C_{24}$ alkyl)-substituted phosphonato, mono- and di-($C_5$-$C_{20}$ aryl)-substituted phosphonato, mixed alkyl/aryl substituted phosphonato, and O-phosphonato).

$R^1$-$R^{12}$ may be selected from enols, ketones, esters, aldehydes, anhydrides, acyl halides, ethers, epoxies, phosphonics, phosphates, phospinites, phosphate esters, imides, azides, azoes, nitrates, nitriles, carbimides, aziridines, hydrozylamines, ketoximes, aldoximes, nitrate esters, enamines, azoles, imidazols, pyrroles, indoles, purines, pyrimidines, piperidines, pyridazines, pyridyl and derivatives, linear, cyclic and aromatic, oxyhalides, sulfides, thioethers, thioesters, sulfonates, sulfinyls, thiocyanates, disulfides, sulfones, thioamides, sulfoxides, isothyocyanates, sulfonamides, sulfonyl halides, thioureates, and thiophosphate esters.

In some embodiments, $R^1$, $R^2$, $R^3$, and $R^4$ are the same. For example, in some embodiments, $R^1$, $R^2$, $R^3$, and $R^4$ are the same and are selected from hydrogen, substituted or unsubstituted alkyl, substituted or unsubstituted heteroatom-containing $C_1$-$C_{24}$ alkyl, substituted or unsubstituted $C_5$-$C_{20}$ aryl, and substituted or unsubstituted $C_5$-$C_{20}$ heteroaryl. For example, $R^1$, $R^2$, $R^3$, and $R^4$ are the same and are selected from hydrogen. phenyl, and methoxyphenyl.

In some embodiments, $R^5$, $R^6$, $R^7$, $R^8$, $R^9$, $R^{10}$, $R^{11}$ and $R^{12}$ are the same. For example, in some embodiments, $R^5$, $R^6$, $R^7$, $R^8$, $R^9$, $R^{10}$, $R^{11}$, and $R^{12}$ are the same and are hydrogen.

In some embodiments, $R^1$, $R^2$, $R^3$, and $R^4$ are the same and are a first group, $R^5$, $R^6$, $R^7$, $R^8$, $R^9$, $R^{10}$, $R^{11}$, and $R^{12}$ are the same and are a second group, and the first groups are different groups.

In some embodiments, $X^1$, $X^2$, $X^3$, and $X^4$ are the same. In other embodiments, $X^1$, $X^2$, $X^3$, and $X^4$ are not the same. In some embodiments, the ligands of interest have the structure of Formula Y-II:

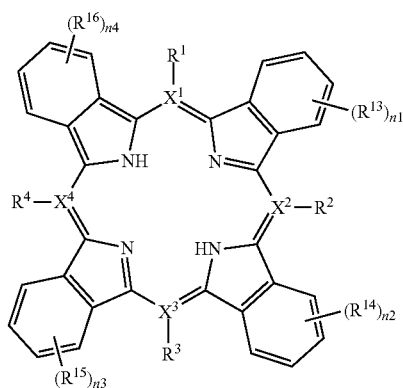

Formula Y-II wherein $X^1$, $X^2$, $X^4$, $R^1$, $R^2$, $R^3$, and $R^4$ are as defined in Formula Y-I above; n1, n2, n3, and n4 are independently selected from the integers 0, 1, 2, 3, and 4; and each $R^{13}$, $R^{14}$, $R^{15}$, and $R^{16}$ is independently selected from the groups defined above for $R^1$-$R^{12}$ in formula (1). For example, in some embodiments, n1, n2, n3, and n4 are each 0.

In some embodiments, pairs of substituents selected from $R^{13}$, $R^{14}$, $R^{15}$, and $R^{16}$ may be taken together to form further cycles, wherein such cycles are aliphatic, aromatic, heteroatom-containing, and/or substituted.

For example, in some embodiments, the ligand of the siccative is phthalocyanine, tetrabenzoporphyrin, tetraazaporphyrin, or porphyrin.

Accordingly, in some embodiments, the present compositions comprise one or more accelerators having the structure of Formula Y-Ia or Y-IIa:

Formula Y-Ia

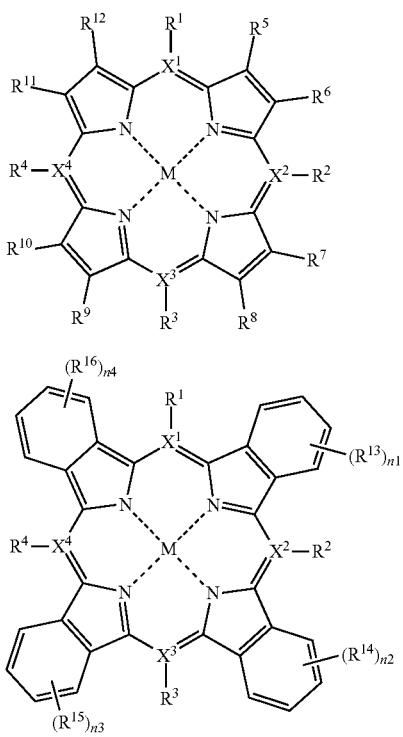

Formula Y-IIa wherein M is selected from Fe, and Mn; and n1-n4, $X^1$-$X^4$, and $R^1$-$R^{16}$ are as described above in Formula Y-I and Formula Y-II. It will be appreciated that the dashed lines and double bonds shown in the formulae herein are drawn in certain orientations but are not intended to imply a definite or fixed location of such bonds. In other words, resonance structures of the formulae drawn herein are intended to be within the scope of the invention.

Ligands of interest include tetraarylporphyrins, diarylporphyrins, tetraalkylporphyrins, dialkylporphyrins, and mixed aryl/alkyl porphyrins, as well as porphyrins containing alkenyl substituents, alkynyl substituents. heteroatom-containing substituents (e.g., heteroaryl, etc.), functionalized substituents (e.g., alkyl substituted with a carboxyl group, etc.), and the like. Specific ligands of interest include, but are not limited to: phthalocyanine; tetrabenzoporphyrin; tetraazaporphyrin; tetratolylporphyrin; porphyrin; porphyrazine; 5,10,15,20-tetrakisphenylporphyrin; 5,10,15,20-tetrakis(4'-methoxyphenyl)porphyrin; 5-azaprotoporphyrin dimethylester; bis-porphyrin; coproporphyrin III; coproporphyrin III tetramethylester; deuteroporphyrin; deuteroporphyrin IX dimethyl ester; diformyldeuteroporphyrin IX dimethyl ester, dodecaphenylporphyrin; hematoporphyrin; hematoporphyrin IX; hematoporphyrin monomer; hematoporphyrin dimer; hematoporphyrin derivative; hematoporphyrin IX dimethylester; hematoporphyrin IX dimethylester; mesoporphyrin dimethylester; mesoporphyrin IX dimethylester; monoformyl-monovinyl-deuteroporphyrin IX dimethylester; monohydroxyethylvinyl deuteroporphyrin; 5,10,15,20-tetra(o-hydroxyphenyl)porphyrin; 5,10,15,20-tetra(m-hydroxyphenyl)porphyrin; 5,10,15,20-tetrakis-(m-hydroxyphenyl)porphyrin; 5,10, 15,20-tetra(p-hydroxyphenyl) porphyrin; 5,10,15,20-tetrakis-(3-methoxyphenyl)porphyrin; 5,10,15,20-tetrakis-(3,4-dimethoxyphenyl)porphyrin; 5,10,15,20-tetrakis(3 sdimethoxyphenyl)porphyrin; 5,10,15,20-tetrakis-(3,4,5-trimethoxyphenyl)porphyrin; 2,3,7,8,12,13,17,18-octaethyl-5,10,15,20-tetraphenylporphyrin; Photofrin; porphyrin c; protoporphyrin; protoporphyrin IX; protoporphyrin dimethylester; protoporphyrin IX dimethyl ester; protoporphyrin propylaminoethylformamide iodide; protoporphyrin, N-dimethylaminopropylfonnamide; protoporphyrin propylaminopropylformamide iodide; protoporphyrin butylformamide; protoporphyrin N,N-dimethyl aminoformamide; protoporphyrin formamide; sapphyrin 13,12,13,22-tetraethyl-2,7,18,23 tetramethyl sapphyrin-8,17-dipropanol; sapphyrin 2,3,12,13,22-tetraethyl-2,7,15,23 tetramethyl sapphyrin-8-monoglycoside; sapphyrin 3; meso-tetra-(4-N-carboxyphenyl)-porphine; tetra-(3-methoxyphenyl)-porphine; tetra-(3-methoxy-2,4-difluorophenyl)-porphine; 5,10,15,20-tetrakis (4-N-methylpyridyl)porphine; mesotetra-(4-N-methylpyridyl)porphine tetrachloride; meso-tetra(4-N-methylpyridyl)porphine; meso-tetra-(3-N-methylpyridyl)-porphine; meso-tetra-(2-N-methylpyridyl) porphine; tetra(4-N,N,N-trimethylanifinium)porphine; mesotetra-(4-N,N,N-trimethylamino-phenyl)porphinetetrachloride; tetranaphthaloporphyrin; 5,10,15,20-tetraphenylporphyrin; tetraphenylporphyrin; meso-tetra-(4-N-sulfonatophenyl)-porphine; tetraphenylporphine tetrasulfonate; meso-tetra-(4-sulfonatophenyl)porphine; tetra-(4-sulfonatophenyl) porphine; tetraphenylporphyrin sulfonate; mesotetra-(4-sulfonatophenyl)porphine; tetrakis-(4-sulfonatophenyl) porphyrin; meso-tetra(4-sulfonatophenyl)porphine; meso-(4-sulfonatophenyl)porphine; meso-tetra-(4-sulfonatophenyl)porphine; tetrakis(4-sulfonatophenyl)porphyrin; meso-tetra-(4-N-trimethylanilinium)-porphine; uroporphyrin; uroporphyrin I; uroporphyrin IX; and uroporphyrin III. In some embodiments, naturally derived porphyrins are suitable, such as the porphyrin ligands found in heme or chlorophyll. Additional specific ligands and methods for their preparation can be found in the relevant literature, such as Kadish et al., *Handbook of Porphyrin Science: With Applications to Chemistry, Physics, and Materials* (World Scientific, 2010), the contents of which are incorporated by reference.

The present compositions and methods comprise a 1,3-dioxo compound. It is contemplated that the 1,3-dioxo compound functions as an initiator for polymerization of the radically polymerizable component. The 1,3-dioxo compound may be selected from compounds having the following Formulas D-I to D-VI:

Formula D-I

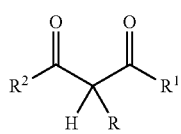

Formula D-II

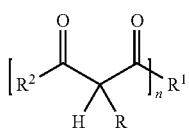

Formula D-III

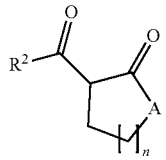

-continued

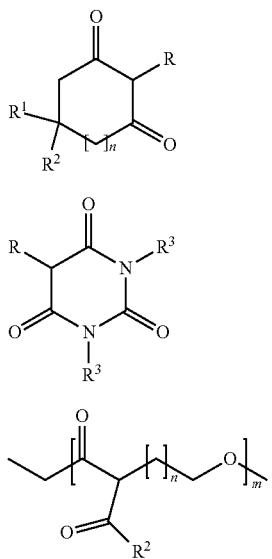

Formula D-IV

Formula D-V

Formula D-VI wherein A is O or S, n is an integer of 1 to 6, and m is a repeat unit from 2 to 20, R is a H, a straight chain or branched, $C_1$-$C_{20}$ alkyl, $C_6$-$C_{20}$ aryl, alkylaryl, arylalkyl, $R^1$, $R^2$ is a H, a straight chain or branched, $C_1$-$C_{20}$ alkyl, $C_6$-$C_{20}$ aryl, alkylaryl, arylalkyl, part of a polymer chain, $OR^3$, $NR^3R^4$; $R^1$, $R^2$, $R^3$, and $R^4$ each individually may represent a $C_1$-$C_{20}$ alkyl, $C_6$-$C_{20}$ aryl, alkylaryl or arylalkyl group, that each optionally may contain one or more heteroatoms and/or substituents; or a ring may be present between $R^1$ and/or $R^2$, and/or between $R^1$ and $R^3$, and/or between $R^1$ and $R^4$; or $R^3$ and/or $R^4$ may be part of a polymer chain, may be attached to a polymer chain or may contain a polymerizable group. Preferably, $R^1$ and/or $R^2$ are/is $C_1$-$C_{20}$ alkyl and/or $C_1$-$C_{20}$ aryl. More preferably, $R^1$ and/or $R^2$ are/is a methyl group. In some embodiments, the 1,3-dioxo compound is acetylacetonate. The 1,3-dioxo compound may be a polymer or a polymerizable monomer or oligomer. In some embodiments, the amount of the 1,3-dioxo compound is from 0.05 to 5% by weight, calculated on the total weight of the polymerizable composition. The amount of the 1,3-dioxo compound is from 0.1 to 2 parts per 100 parts of the radically polymerizable resin.

In some embodiments, the 1,3-dioxo compound is selected from compounds of Formula D-II. In some embodiments, the 1,3-dioxo compound is selected from acetoacetates with optional mono or poly-ethoxylated and propoxylated diols, triols, and polyols, such as for example ethylene glycol monoacetoacetate, ethylene glycol diacetoacetate, 1,2-propandiol monoacetoacetate, 1,2-propandiol diacetoacetate, 1,3-propandiol monoacetoacetate, 1,3-propandiol diacetoacetate, 1,4-butandiol monoacetoacetate, 1,4-butandiol diacetoacetate, 1,6-hexandiol monoacetoacetate, 1,6-hexandiol diacetoacetate, neopentyl glycol monoacetoacetate, neopentyl glycol diacetoacetate, trimethylol propane monoacetoacetate, trimethylol propane diacetoacetate, or trimethylol propane triacetoacetate, glycerin monoacetoacetate, glycerin diacetoacetate, glycerin triacetoacetate, pentaerythritol diacetoacetate, pentaerythritol monoacetoerythritol, pentaerythritol biacetoacetate, pentaerythritol triacetoacetate, pentaerythritol tetraacetoacetate, dipentaerythritolmonoacetoacetate, dipentaerythritol diacetoacetate, dipentaerythritol triacetoacetate, dipentaerythritol tertaacetoacetate, dipentaerythritol pentaacetoacetate, or dipentaerythritol hexaacetoacetate and the like.

In some embodiments, the 1,3-dioxo compounds may include monofunctional or polyfunctional. Examples include but are not limited to methyl acetoacetate, ethyl acetoacetate, t-butyl acetoacetate, 2-ethylhexyl acetoacetate, lauryl acetoacetate, acetoacetanilide, pentanedione, acetyl acetone, 2-(aceto-acetoxy)ethyl methacrylate, benzylacetoacetate, α-acetyl-γ-butyrolactone, 2-acetyl cyclopentanone, 2-acetyl caprolactone, cyclohexane dimethanol diacetoacetate, diethyl malonate, dimethyl malonate, diacetoacetate of ethoxylated or propoxylated bisphenol A, 3-methyl-2,4-pentanedione, 2,2-dimethyl-1,3-dioxane-4,6-dione, glycerin triacetoacetate, polycaprolantone triacetoacetate, 2-acetyl-polybutyrolactone, 2-acetyl-polycaprolactone and the like. The 1,3-dioxo compounds can be used alone or as a mixture of two or more. The 1,3-dioxo compounds can be selected based on the desired reactivity of system, compatibility of the mixture, color after curing, physical properties, and cost of the raw materials.

In some embodiments, the present compositions and methods comprise one or more various tertiary amines that can be used as accelerators and gel time drift stabilizers. For example, the tertiary amines can be selected from N,N-dimethylaniline, N,N-diethylaniline, N,N-dimethyl-toluidine, N,N-diethyltoluidine, N,N-bis(2-hydroxy-ethyl)-p-toluidine, ethoxylated p-toluidines, N,N-bis-(2-hydroxyethyl)-p-toluidine, and others, and mixtures thereof. Toluidine derivatives are considered particularly preferred activators, more particularly N,N-dialkyltoluidines and alkoxylated p-toluidines. The tertiary amines can be used alone or mixtures of two or more.

In some embodiments, the present compositions and methods comprise one or more various heterocyclic amines that can be used as accelerators and gel time drift stabilizers. For example, the heterocyclic amines can be selected from compounds of Formulas H-I, H-II, or H-III:

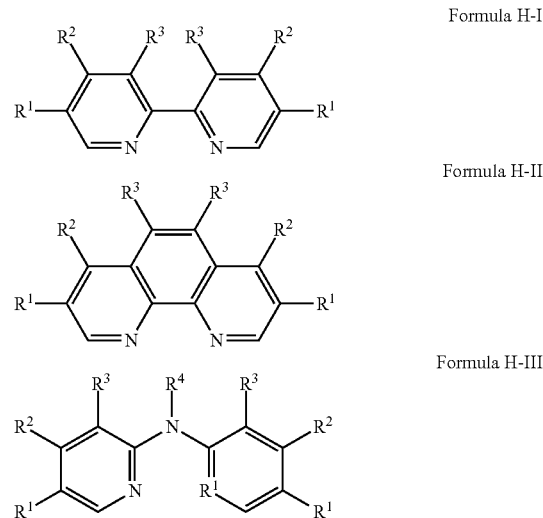

Formula H-I

Formula H-II

Formula H-III wherein $R^1$, $R^2$, and $R^3$ is a H, a halogen, a straight chain or branched, $C_1$-$C_{20}$ alkyl, $C_6$-$C_{20}$ aryl, alkylaryl, arylalkyl, part of a polymer chain, $OR^4$, $NR^4R^4$; and $R^4$ is a H, a straight chain or branched, $C_1$-$C_{20}$ alkyl, $C_6$-$C_{20}$ aryl, alkylaryl, arylalkyl. Examples include 2,2'-bypyridine and 1,10-phenanthroline. The heterocyclic amines may be included in the polymerizable compositions in amounts from 0.0005 to 1.0 parts per 100 parts of radically polymerizable component, calculated based on the weight of the polymerizable component, for example in an amount from 0.001 to 2.0 parts per 100 parts of polymerizable component.

In some embodiments, additives that are also used to control the gel time drift include polyhydroxy carboxylic acid, such as tartaric acid or ascorbic acid (Vitamin C). The acid intermediates to control the gel time drift may be added in an amount of 0.0005 to 2.0 parts per 100 parts of polymerizable component, calculated on the total weight of the polymerizable composition, alternatively in an amount from 0.001 to 0.5 parts per 100 parts polymerizable component.

In some embodiments, the present compositions and methods comprise one or more of thiol (mercaptan) compounds. While the present disclosure is not to be bound by theory, it is contemplated that thiol compounds function in the present compositions and methods as accelerators and/or gel time drift stabilizers. The thiol compounds can be monofunctional or bifunctional. Nonlimiting examples of thiol compounds include the following: mercaptobenzothiazole (MBT), ethanethiol, propyl mercaptan, butanethiol, pentanethiol, 1-hexanethiol, octanethiol, 1-heptanethiol, 1-nonathiol, allyl mercaptan, furfuryl mercaptan, 2-mercaptoethanol, decanethiol, 1-undecanethiol, n-dodecylmercaptan, 1-hexadecanethiol, n-octadecylmercaptan, d-limonene dimercaptan, methyl-3-mercaptopropionate, 2-mercapto ethyl palmitate, dibutyl mercaptosuccinate, ferrous mercaptobenzothiazolate, cyclohexanethiol, thiophenol, tolyl mercaptan, phenethyl mercaptan, bromobemzyl mercaptan, and cupric mercaptobenzothiazolate. Among the suitable polythiol compounds are mercaptoacetate and mercaptopropionate esters of low molecular weight polyols having 2 to 8, preferably 2 to 4 hydroxyl groups and an equivalent weight of up to about 75, in which some or all of the hydroxyl groups are esterified with the mercaptoacetate and/or mercaptopropionate. Examples of such low molecular weight polyols include, for example, ethylene glycol, diethylene glycol, triethylene glycol, 1,2-propane diol, 1,3-propane diol, dipropylene glycol, tripropylene glycol, 1,4-butane diol, 1,6-hexane diol, glycerin, trimethylolpropane, trimethylolethane, erythritol, pentaerythritol, sorbitol, sucrose and the like. Other suitable polythiol compounds include alkylene dithiols such as 1,2-ethane dithiol, 1,2-propane dithiol, 1,3-propanedithiol, 1,4-butane dithiol, 1,6-hexane dithiol and the like, trithiols such as 1,2,3-trimercaptopropane, 1,2,3-tri(mercaptomethyl)propane, 1,2,3-tri(mercaptoethyl)ethane, (2,3-di((2-mercaptoethyl)thio)-1-propanethiol, and the like. Yet another useful polythiol compound is a mercapto-substituted fatty acid having at least 2 mercapto substituents on the fatty acid chains, and the like. Other examples of polyfunctional thiol are described for example in U.S. Pat. No. 9,290,462; the disclosure of which are incorporated herein by reference in their entirety. Mixtures of the above may be used.

Thioureas may also be incorporated into the present compositions and methods, such 1,3-Di-o-tolyl-2-thiourea, 1,3-Di-p-tolyl-2-thiourea, 1,3-Di-tert-butyl-2-thiourea, 1,3-Diallyl-2-thiourea, 1,3-Dibenzyl-2-thiourea, 1-(3-Pyridyl)-2-thiourea, 1-butyl-2-thiourea, 1-butyl-3-phenyl-2-thiourea, acetylthiourea, tetramethylthiourea, thiourea, N-ethylthiourea, N,N'-dibutylthiourea, N,N'-diethylthiourea, N,N'-dimethylthiourea, N,N'-diphenylthiourea, N,N'-diphenylthiourea, N-phenylthiourea. Examples of thioureas are described for example in U.S. Pat. Nos. 3,338,876; 3,970,505; 4,569, 976; 7,173,074; 7,498,367; the disclosures of which are incorporated herein by reference in their entirety. Mixtures of the above may be used.

In some embodiments, an important parameter during the preparation of composite materials is that during the crosslinking of the reactive components in the thermosetting system, an appropriate heat of polymerization should develop. Accordingly, in some embodiments, the present compositions and methods have a heat of polymerization during curing that is less than 950 KJ/Kg, alternatively less than 925 KJ/Kg, alternatively less than 900 KJ/Kg, alternatively less than 875 KJ/Kg, alternatively less than 850 KJ/Kg, alternatively less than 825 KJ/Kg, alternatively less than 800 KJ/Kg, alternatively less than 775 KJ/Kg, alternatively less than 750 KJ/Kg, alternatively less than 700 KJ/Kg, alternatively less than 650 KJ/Kg, alternatively less than 600 KJ/Kg. In some embodiments, the heat of polymerization is more than 100 KJ/Kg, alternatively more than 125 KJ/Kg, alternatively more than 150 KJ/Kg, alternatively more than 175 KJ/Kg, alternatively more than 200 KJ/Kg. It is expressly contemplated than any of the foregoing maxima and minima can be combined to form a range. The development of the proper heat of polymerization can be selected based on the present disclosure, and is very important since the ultimate mechanical properties of the finished product will depend on the correct crosslinking of the mixtures. The heat of polymerization will vary depending on the actual amount of the vinyl containing compounds and other components in the mixtures.

In some embodiments, during the crosslinking of the reactive components in the thermosetting system, the peak exotherm should be kept below a desired level. Accordingly, in some embodiments, the present compositions and methods have a peak exotherm that is less than 300° C., alternatively less than 280° C., alternatively less than 260° C., alternatively less than 250° C. In some embodiments, the time to peak exotherm is between 5 min and 60 min, alternatively between 5 min and 30 min. In some embodiments, the gel time is between 2 min and 60 min, alternatively between 2 min and 25 min.

Optionally, the present compositions and methods comprise one or more transition metal salts or complexes other than the manganese- or iron-containing salts or complexes may include metals such as lithium, calcium, vanadium, zirconium, titanium, nickel, sodium, copper, potassium, magnesium, and barium. The transition metal salts may be provided as chlorides, bromides, iodites, nitrates, sulfates, phosphates, oxalates, salicylates, alkyl organic acids, other carboxylates, naphthenates, and the like. They may be incorporated alone, in pairs or with one, two or a mixture of the above mentioned metals. The transition metal complexes may have a ligand as described above.

In some embodiments, polymers, copolymer or oligomers containing reactive functional groups of the present invention can form mixtures and undergo crosslinking reactions with other thermosetting resins or in the presence of thermoplastic resins or their mixtures to form composite materials. For the purpose of the invention, unsaturated polyester resins, saturated polyester resins, vinyl ester resins, and urethanes containing vinyl functionality are preferably employed. An unsaturated polyester resin may be formed from conventional methods. Typically, the resin is formed from the reaction between a polyfunctional organic acid or anhydride and a polyhydric alcohol under conditions known in the art. The polyfunctional organic acid or anhydride which may be employed are any of the numerous and known compounds. Suitable polyfunctional acids or anhydrides thereof include, but are not limited to, maleic acid and anhydride, fumaric acid, citraconic acid, itaconic acid, glutaconic acid, phthalic acid and anhydride, isophthalic acid, terephthalic acid, tetrahydrophthalic anhydride, cyclohexane dicarboxylic acid, succinic anhydride, adipic acid, sebacic acid, azelaic acid, malonic acid, alkenyl succinic acids such as n-dodecenyl succinic acid, dodecylsuccinic acid, octadecenyl succinic acid, and anhydrides thereof. Lower alkyl esters of any of the above may also be employed. Mixtures of any of the above are suitable, without limitation intended by this.

Additionally, polybasic acids or anhydrides thereof having not less than three carboxylic acid groups may be employed. Such compounds include 1,2,4-benzenetricarboxylic acid, 1,3,5-benzene tricarboxylic acid, 1,2,4-cyclohexane tricarboxylic acid, 2,5,7-naphthalene tricarboxylic acid, 1,2,4-naphthalene tricarboxylic acid, 1,3,4-butane tricarboxylic acid, 1,2,5-hexane tricarboxylic acid, 1,3-dicarboxyl-2-methyl-2-carboxymethylpropane, tetra(carboxymethyl)methane, 1,2,7,8-octane tetracarboxylic acid, citric acid, and mixtures thereof.

Suitable polyhydric alcohols which may be used in forming the unsaturated polyester resins include, but are not limited to, ethylene glycol, diethylene glycol, propylene glycol, dipropylene glycol, 1,3-butanediol, 1.4-butanediol, 1,3-hexanediol, neopentyl glycol, 2-methyl-1,3-pentanediol, 1,3-butylene glycol, 1,6-hexanediol, hydrogenated bisphenol A, cyclohexane dimethanol, 1,4-cyclohexanol, ethylene oxide adducts of bisphenols, propylene oxide adducts of bisphenols, sorbitol, 1,2,3,6-hexatetrol, 1,4-sorbitan, pentaerythritol, dipentaerythritol, tripentaerythritol, sucrose, 1,2,4-butanetriol, 1,2,5-pentanetriol, glycerol, 2-methylpropanetriol, 2-methyl-1,2,4-butanetriol, trimethylol ethane, trimethylol propane, and 1,3,5-trihydroxyethyl benzene. Mixtures of any of the above alcohols may be used.

DCPD resins used in the present compositions and methods are known to those skilled in the art. These resins are typically DCPD polyester resins and derivatives which may be made according to various accepted procedures. As an example, these resins may be made by reacting DCPD, ethylenically unsaturated dicarboxylic acids, and compounds having two groups wherein each contains a reactive hydrogen atom that is reactive with carboxylic acid groups. DCPD resins made from DCPD, maleic anhydride, maleic acid, fumaric acid, orthophthalic acid, phthalic anhydride, isophthalic acid, terephthalic acid, adipic acid, water, and a glycol such as, but not limited to, ethylene glycol, propylene glycol, diethylene glycol, neopentyl glycol, dipropylene glycol, and poly-tetramethylene glycol, are particularly preferred for the purposes of the invention. The DCPD resin may also include nadic acid ester segments that may be prepared in-situ from the reaction of pentadiene and maleic anhydride or added in its anhydride form during the preparation of the polyester. Examples on the preparation of DCPD unsaturated polyester resins can be found in U.S. Pat. Nos. 3,883,612 and 3,986,922.

The DCPD resin may be used in various amounts in the laminating resin composition of the invention. Preferably, the laminating resin composition comprises from about 10 to about 80 weight percent of DCPD resin, and more preferably from about 20 to about 40 weight percent. Preferably, the DCPD resin has a number average molecular weight ranging from about 450 to about 1500, and more preferably from about 500 to about 1000. Additionally, the DCPD resin preferably has an ethylenically unsaturated monomer content of below 35 percent at an application viscosity of 200 to 800 cps.

The vinyl ester resins employed in the present compositions and methods include the reaction product of an unsaturated monocarboxylic acid or anhydride with an epoxy resin. Exemplary acids and anhydrides include (meth)acrylic acid or anhydride, α-phenylacrylic acid, α-chloroacrylic acid, crotonic acid, mono-methyl and mono-ethyl esters of maleic acid or fumaric acid, vinyl acetic acid, sorbic acid, cinnamic acid, and the like, along with mixtures thereof. Epoxy resins which may be employed are known and include virtually any reaction product of a polyfunctional halohydrin, such as epichlorohydrin, with a phenol or polyhydric phenol. Suitable phenols or polyhydric phenols include, for example, resorcinol, tetraphenol ethane, and various bisphenols such as Bisphenol A, 4,4'-dihydroxydiphenyl sulfone, 4,4'-dihydroxybiphenyl, 4,4'-dihydroxydiphenyl methane, 2,2'-dihydoxydiphenyloxide, and the like. Novolac epoxy resins may also be used. Mixtures of any of the above may be used. Additionally, the vinyl ester resins may have pendant carboxyl groups formed from the reaction of esters and anhydrides and the hydroxyl groups of the vinyl ester backbone.

Other components in the resin may include epoxy acrylate oligomers known to those who are skilled in the art. As an example, the term "epoxy acrylates oligomer" may be defined for the purposes of the invention as a reaction product of acrylic acid and/or methacrylic acid with an epoxy resin. Examples of processes involving the making of epoxy acrylates can be found in U.S. Pat. No. 3,179,623, the disclosure of which is incorporated herein by reference in its entirety. Epoxy resins that may be employed are known and include virtually any reaction product of a polyfunctional halohydrin, such as, but not limited to, epichlorohydrin, with a phenol or polyhydric phenol. Examples of phenols or polyhydric phenols include, but are not limited to, resorcinol, tetraphenol ethane, and various bisphenols such as Bisphenol-A, 4,4'-dihydroxy biphenyl, 4, 4'-dihydroxydiphenylmethane, 2,2'-dihydroxydiphenyloxide, phenol or cresol formaldehyde condensates and the like. Mixtures of any of the above can be used. The preferred epoxy resins employed in forming the epoxy acrylates are those derived from bisphenol A, bisphenol F, especially preferred are their liquid condensates with epichlorohydrin having a molecular weight preferably in the range of from about 300 to about 800. The preferred epoxy acrylates that are employed of Formula E-I:

Formula E-I

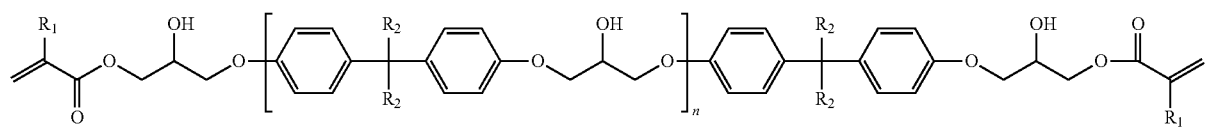

where $R_1$ and $R_2$ is H or $CH_3$ and n ranges from 1 to 3, more preferably from 1 to 2.

Other examples of epoxy acrylate oligomers that may be used include comparatively low viscosity epoxy acrylates. As an example, these materials can be obtained by reaction of epichlorohydrin with the diglycidyl ether of an aliphatic diol or polyol.

Polyacrylates are also useful in the present compositions for the preparation of the molding compositions. A urethane poly(acrylate) of Formula A-I may be used as part of the mixtures:

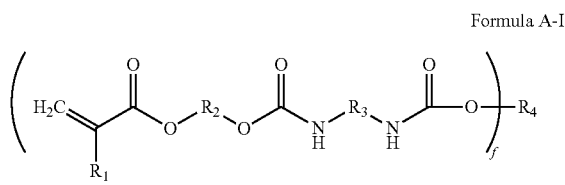

Formula A-I wherein $R_1$ is hydrogen or methyl; $R_2$ is a linear or branched divalent alkylene or oxyalkylene radical having from 2 to 5 carbon atoms; $R_3$ is a divalent radical remaining after reaction of a substituted or unsubstituted diisocyanate; $R_4$ is the hydroxyl free residue of an organic polyhydric alcohol which contained hydroxyl groups bonded to different atoms; and f has an average value of from 2 to 4. The compounds are typically the reaction products of polyols in which the hydroxyl groups are first reacted with a diisocyanate using one equivalent of diisocyanate per hydroxyl group, and the free isocyanate groups are the reacted with a hydroxyalkyl ester of acrylic or methacrylic acid.

The polyhydric alcohol suitable for preparing the urethane poly(acrylate) typically contains at least two carbon atoms and may contain from 2 to 4, inclusive, hydroxyl groups. Polyols based on the polycaprolactone ester of a polyhydric alcohol such as described in, for example U.S. Pat. No. 3,169,945 is included. Unsaturated polyols may also be used such as those described in U.S. Pat. Nos. 3,929,929 and 4,182,830.

Diisocyanates suitable for preparing the urethane poly(acrylate) are well known in the art and include aromatic, aliphatic, and cycloaliphatic diisocyanates. Such isocyanates may be extended with small amounts of glycols to lower their melting point and provide a liquid isocyanate. The hydroxyalkyl esters suitable for final reaction with the polyisocyanate formed from the polyol and diisocyanate are exemplified by hydroxylacrylate, hydroxypropyl acrylate, hydroxyethyl methacrylate, and hydroxypropyl methacrylate. Any acrylate or methacrylate ester or amide containing an isocyanate reactive group may be used herein, however.

Urethane poly(acrylates) such as the above are described in for example, U.S. Pat. Nos. 3,700,643; 4,131,602; 4,213,837; 3,772,404 and 4,777,209.

In some embodiments, the present compositions comprise urethane poly(acrylate) of Formula C-I:

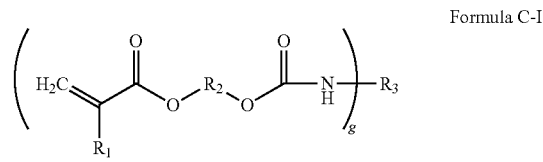

Formula C-I where $R_1$ is hydrogen or methyl; $R_2$ is a linear or branched alkylene or oxyalkylene radical having from 2 to about 6 carbon atoms; $R_3$ is the polyvalent residue remaining after the reaction of a substituted or unsubstituted polyisocyanate; and g has an average value of from about 2 to 4. These compounds are typically the reaction products of a polyisocyanate with a hydroxyalkyl ester per isocyanate group.

Polyisocyanates suitable for preparing the urethane poly(acrylates) are well known in the art and include aromatic, aliphatic and cycloaliphatic polyisocyanates. Some diisocyanates may be extended with small amounts of glycol to lower their melting point and provide a liquid isocyanate. Urethanes poly(acrylates) such as the above are described in, for example U.S. Pat. No. 3,297,745 and British Patent No. 1,159,552.

In some embodiments, the present compositions comprise a half-ester or half-amide characterized by Formula C-II:

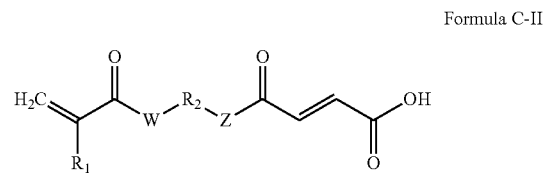

Formula C-II wherein $R_1$ is hydrogen or methyl, and $R_2$ is an aliphatic or aromatic radical containing from 2 to about 20 carbon atoms, optionally containing —O— or

and W and Z are independently —O— or

and $R_3$ is hydrogen or low alkyl. Such compounds are typically the half-ester or half-amide product formed by the reaction of a hydroxyl, amino, or alkylamino containing ester or amide derivatives of acrylic or methacrylic acid with maleic anhydride, maleic acid, or fumaric acid. These are described in, for example, U.S. Pat. Nos. 3,150,118 and 3,367,992.

In some embodiments, the present compositions comprise an unsaturated isocyanurate characterized by Formula C-III:

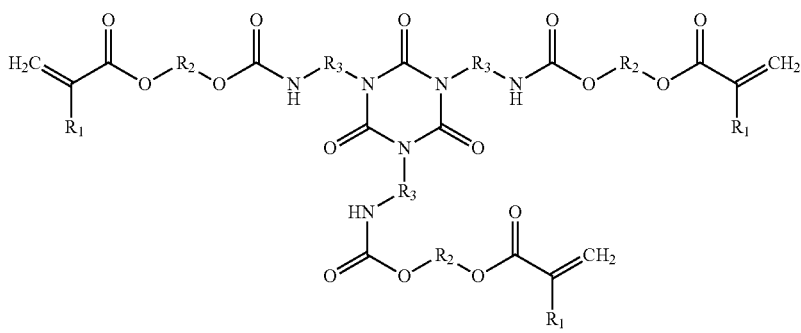

Formula C-III wherein $R_1$ is a hydrogen or methyl, $R_2$ is a linear or branched alkylene or oxyalkylene radical having from 2 to 6 carbon atoms, and $R_3$ is a divalent radical remaining after reaction of a substituted or unsubstituted diisocyanate. Such products are typically produced by the reaction of a diisocyanate reacted with one equivalent of a hydroxyalkyl ester of acrylic or methacrylic acid followed by the trimerization reaction of the remaining free isocyanate.

It is understood that during the formation of the isocyanurate, a diisocyanate may participate in the formation of two isocyanurate rings thereby forming crosslinked structures in which the isocyanurate rings may be linked by the diisocyanate used. Polyisocyanates might also be used to increase this type of crosslink formation.

Diisocyanates suitable for preparing the urethane poly (acrylate) are well known in the art and include aromatic, aliphatic, and cycloaliphatic diisocyanates. Such isocyanates may be extended with small amounts of glycols to lower their melting point and provide a liquid isocyanate.

The hydroxyalkyl esters suitable for final reaction with the polyisocyanate formed from the polyol and diisocyanate are exemplified by hydroxylacrylate, hydroxypropyl acrylate, hydroxyethyl methacrylate, and hydroxypropyl methacrylate. Any acrylate or methacrylate ester or amide containing an isocyanate reactive group may be used herein, however. Other alcohols containing one hydroxyl group may also be used. The monoalcohols may be monomeric or polymeric.

Such unsaturated isocyanurates are described in, for example, U.S. Pat. No. 4,195,146.

In some embodiments, the present compositions comprise poly(amide-esters) as characterized by Formula C-IV:

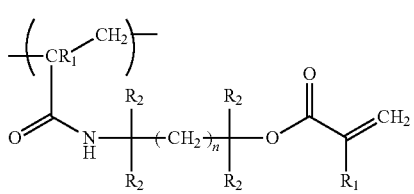

Formula C-IV wherein $R_1$ is independently hydrogen or methyl, $R_2$ is independently hydrogen or lower alkyl, and h is 0 or 1. These compounds are typically the reaction product of a vinyl addition prepolymer having a plurality of pendant oxazoline or 5,6-dihydro-4H-1,3-oxazine groups with acrylic or methacrylic acid. Such poly(amide-esters) are described in, for example, British Pat. No. 1,490,308.

In some embodiments, the present compositions comprise a poly(acrylamide) or poly(acrylate-acrylamide) characterized by Formula C-V:

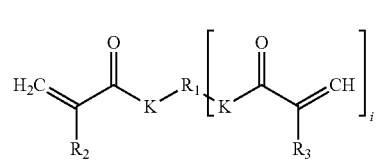

Formula C-V wherein $R_1$ is the polyvalent residue of an organic polyhydric amine or polyhydric aminoalcohol which contained primary or secondary amino groups bonded to different carbon atoms or, in the case of an aminoalcohol, amine and alcohol groups bonded to different carbon atoms; $R_2$ and $R_3$ are independently hydrogen or methyl; K is independently —O— or

where $R_4$ is hydrogen or lower alkyl; and i is 1 to 3.

The polyhydric amines suitable for preparing the poly (acrylamide) contains at least two carbon atoms and may contain 2 to 4, inclusive, amine or alcohol groups, with the proviso that at least one group is a primary or a secondary amine. These include alkane aminoalcohols and aromatic containing aminoalcohols. Also included are polyhydric aminoalcohols containing ether, amino, amide, and ester groups in the organic residue.

Examples of the above compounds are described, in for example, Japanese publications Nos. JP80030502, JP80030503, and JP800330504 and U.S. Pat. No. 3,470,079 and British Patent No. 905,186.

It is understood by those skilled in the art that the thermosetable organic materials described, supra, are only representative of those which may be used in the practice of this invention.

Saturated polyesters, polyethers, and polyurethanes that may also be used in the present compositions include, for example, those described in U.S. Pat. Nos. 4,871,811, 3,427, 346 and 4,760,111. The saturated polyester resins and polyurethanes are particularly useful in hand lay-up, spray up, sheet molding compounding, hot melt adhesives and pressure sensitive adhesives applications. Appropriate saturated polyester resins include, but are not limited to, crystalline and amorphous resins. The resins may be formed by any suitable technique. For example, the saturated polyester resin may be formed by the polycondensation of an aromatic or aliphatic di- or polycarboxylic acid and an aliphatic or alicyclic di- or polyol or its prepolymer. Optionally, either the polyols may be added in an excess to obtain hydroxyl end groups or the dicarboxylic monomers may be added in an excess to obtain carboxylic end groups. Suitable polyurethane resins may be formed by the reaction of diols or polyols as those described in U.S. Pat. No. 4,760,111 and diisocyanates. The diols are added in an excess to obtain hydroxyl terminal groups at the chain ends of the polyurethane. The saturated polyesters and polyurethanes may also contain other various components such as, for example, an ethylene-vinyl acetate copolymer, an ethylene-ethyl acrylate copolymer, and the like.

Thermoplastic polymeric materials which reduce shrinkage during molding can also be included in the present compositions. These thermoplastic materials can be used to produce molded articles having surfaces of improve smoothness. The thermoplastic resin is added into the unsaturated polyester composition according to the invention in order to suppress shrinkage at the time of curing. The thermoplastic resin is provided in a liquid form and is prepared in such a manner that 30 to 45 percent by weight of the thermoplastic resin is dissolved in 55 to 70 percent by weight of polymerizable resin having some polymerizable double bond in one molecule. Examples of the thermoplastic resin may include styrene-base polymers, polyethylene, polyvinyl acetate base polymer, polyvinyl chloride polymers, polyethyl methacrylate, polymethyl methacrylate or copolymers, ABS copolymers, Hydrogenated ABS, polycaprolactone, polyurethanes, butadiene styrene copolymer, and saturated polyester resins. Additional examples of thermoplastics are copolymers of: vinyl chloride and vinyl acetate; vinyl acetate and acrylic acid or methacrylic acid; styrene and acrylonitrile; styrene acrylic acid and allyl acrylates or methacrylates; methyl methacrylate and alkyl ester of acrylic acid; methyl methacrylate and styrene; methyl methacrylate and acrylamide. In some embodiments, 5 to 50 percent by weight of the liquid thermoplastic resin is mixed; preferably 10 to 30 percent by weight of the liquid thermoplastic resin is mixed.

Low profile agents (LPA) are composed primarily of thermoplastic polymeric materials. LPAs may be included in the present compositions. These thermoplastic intermediates present some problems remaining compatible with almost all types of thermosetting resin systems. The incompatibility between the polymeric materials introduces processing difficulties due to the poor homogeneity between the resins. Problems encountered due to phase separation in the resin mixture include, scumming, poor color uniformity, low surface smoothness and low gloss. It is therefore important to incorporate components that the will help on stabilizing the resin mixture to obtain homogeneous systems that will not separate after their preparation. For this purpose, a variety of stabilizers can be used in the present invention which includes block copolymers from polystyrene-polyethylene oxide as those described in U.S. Pat. Nos. 3,836,600 and 3,947,422. Block copolymer stabilizers made from styrene and a half ester of maleic anhydride containing polyethylene oxide as described in U.S. Pat. No. 3,947,422. Also useful stabilizers are saturated polyesters prepared from hexanediol, adipic acid and polyethylene oxide available from BYK Chemie under code number W-972. Other type of stabilizers may also include addition type polymers prepared from vinyl acetate block copolymer and a saturated polyester as described in Japanese Unexamined Patent Application No. Hei 3-174424.

Fatty acids may be used in the preparation of polyesters without restriction and used in the present compositions. Prepolymerized fatty acids or their fatty acid esters prepared according to known processes are usually used. A polybasic polymerized fatty acid prepared by polymerizing a higher fatty acid or higher fatty acid ester is preferable because it can provide better adhesiveness, flexibility, water resistant and heat resistance with improved properties. The fatty acid may be any of saturated and unsaturated fatty acids, and the number of carbons may be from 8 to 30, preferably 12 to 24, and further preferably 16 to 20 such as methyl, ethyl, propyl, butyl, amyl and cyclohexyl esters and the like.

Preferable polymerized fatty acids include polymerized products of unsaturated higher fatty acids such as oleic acid, linoleic acid, resinoleic acid, eleacostearic acid and the like. Polymerized products of tall oil fatty acid, beef tallow fatty acid and the like, can be also used. Hydrogenated polymerized fatty esters or oils can also be used. Portions of the dibasic carboxylic acid (herein after referred to as "dimer acid") and three or higher basic carboxylic acid in the polymerized fatty acid is not limited, and the proportions may be selected appropriately according to the ultimate properties expected. Trimer acids or higher carboxylic acids may also be used.

The polymerization of the fatty acid esters is not particularly limited. Alkyl esters of the above mentioned polymerized fatty acids are usually used as the polymerized fatty acid esters. As said alkyl esters such as methyl ester, ethyl ester, propyl ester, isopropyl ester, butyl ester, amyl ester, hexyl ester and the like and higher alkyl esters such as octyl ester, decyl ester, dodecyl ester, pentadecyl ester, octadecyl ester and the like can be used, among which preferable are lower alkyl esters and more preferable are methyl ester, ethyl ester and butyl ester.

These polymerized fatty acids and polymerized fatty acid esters can be used either alone or in combinations of two or more. The proportion of the sum of the polymerized fatty acids and the polymerized fatty acid esters in the total polybasic carboxylic acid is not particularly limited and may be used in different rations ranging from 3 to 40% by weight of the resin composition.

Also compounds that may be included in the present compositions are a wide variety of epoxy compounds. Typically, the epoxy compounds are epoxy resins which are also referred as polyepoxides. Polyepoxides useful herein can be monomeric (i.e. the diglycidyl ether of bisphenol A), advanced higher molecular weight resins, or unsaturated monoepoxides (i.e., glycidyl acrylates, glycidyl methacrylates, allyl glycidyl ether, etc.) polymerized to homopolymers or copolymers. Most desirable, the epoxy compounds contain, on the average, at least one pendant or terminal 1,2-epoxy group (i.e., vicinal epoxy group per molecule).

Examples of the useful polyepoxides include the polyglicidyl ethers of both polyhydric alcohols and polyhydric phenols, polyglycidyl amines, polyglycidyl amides, polyglycidyl imides, polyglycidyl hydantoins, polyglycidyl thioethers, polyglycidyl fatty acids, or drying oils, epoxidized polyolefins, epoxidized di-unsaturated acid esters, epoxidized unsaturated polyesters, and mixtures thereof. Numerous epoxides prepared from polyhydric phenols include those which are disclosed, for example, in U.S. Pat. No. 4,431,782. Polyepoxides can be prepared from mono-, di- and trihydric phenols, and can include the novolac resins. The polyepoxides can include epoxidized cycloolefins; as well as polymeric polyepoxides which are polymers or copolymers of glycidyl acrylates, glycidyl methacrylate and allylglycidyl ether. Suitable polyepoxides are disclosed in U.S. Pat. Nos. 3,804,735; 3,893,829; 3,948,698; 4,014,771 and 4,119,609; and Lee and Naville, Handbook of Epoxy Resins, Chapter 2, McGraw Hill, N.Y. (1967).

While the invention is applicable to a variety of polyepoxides, generally preferred polyepoxides are glycidyl polyethers of polyhydric alcohols or polyhydric phenols having weights per epoxide of 150 to 2,000. These polyepoxides are usually made by reacting at least two moles of an epihalohydrin or glycerol dihalohydrin with one mole of the polyhydric alcohol or polyhydric phenol, and sufficient amount of a caustic alkali to combine with the halogen of the halohydrin. The products are characterized by the presence of more than one epoxide group, i.e., a 1,2-epoxy equivalency greater than one.

The compositions may also include a monoepoxide, such as butyl glycidyl ether, phenyl glycidyl ether, or cresyl glycidyl ether, as a reactive diluent. Such reactive diluents are commonly added to polyepoxide formulations to reduce the working viscosity thereof, and to give better wetting to the formulation.

A vinyl monomer may also be included as a diluent with the vinyl esters, urethanes, unsaturated and saturated resins. Suitable monomers may include those such as, styrene and styrene derivatives such as alpha-methyl styrene, p-methyl styrene, divinyl benzene, divinyl toluene, ethyl styrene, vinyl toluene, tert-butyl styrene, monochloro styrene, dichloro styrene, vinyl benzyl chloride, fluorostyrene, and alkoxystyrenes (e.g., paramethoxy styrene). Other monomers which may be used include, 2-vinyl pyridine, 6-vinyl pyridine, 2-vinyl pyrrole, 2-vinyl pyrrole, 5-vinyl pyrrole, 2-vinyl oxazole, 5-vinyl oxazole, 2-vinyl thiazole, 5-vinyl thiazole, 2-vinyl imidazole, 5-vinyl imidazole, 3-vinyl pyrazole, 5-vinyl pyrazole, 3-vinyl pyridazine, 6-vinyl pyridazine, 3-vinyl isoxozole, 3-vinyl isothiazole, 2-vinyl pyrimidine, 4-vinyl pyrimidine, 6-vinyl pyrimidine, any vinyl pyrazine. Classes of other vinyl monomers also include, but are not limited to, (meth)acrylates, vinyl aromatic monomers, vinyl halides and vinyl esters of carboxylic acids. Other monomers which may be used include, for example, diallyl phthalate, hexyl acrylate, octyl acrylate, octyl methacrylate, diallyl itaconate, diallyl maleate, hydroxyethyl acrylate, hydroxyethyl methacrylate, hydroxypropyl acrylate and hydroxypropyl methacrylate. Mixtures of the above may also be employed.

As is used herein and in the claims, "(meth)acrylate" and similar terms refer to both (meth)acrylates and acrylates. Any suitable mono or polyfunctional acrylate may be used in the resin composition, for example, methyl (meth)acrylate, ethyl (meth)acrylate, propyl (meth)acrylate, hexyl (meth)acrylate, octyl (meth)acrylate, cyclohexanol (meth)acrylate, phenoxyethyl (meth)acrylate, ethylene glycol dimethacrylate, butanediol dimethacrylate, hexanediol dimethacrylate, ethoxylated trimethylol propane triacrylate, trimethylolpropane tri(meth)acrylate, trimethylolpropane triacrylate, trimethylolmethane tetramethacrylate, pentaerythritol tetramethacrylate, dipentaerythritol tetramethacrylate, dipentaerythritol pentamethacrylate, dipentaerythritol hexamethacrylate, ethoxylated polyhydric phenol diacrylates and dimethacrylates containing from 1 to 30 ethylene oxide units per OH group in the phenol, propoxylated polyhydric phenol diacrylates and dimethacrylates containing from 1 to 30 propylene oxide groups per OH groups in the phenol. Examples of some useful di- and polyhydric phenols include catechol; resorcinol; hydroquinone; 4,4'-biphenol; 4,4'-ispropylidenebis(o-cresol); 4,4'-isopropylidenebis(2-phenyl phenol); alkylidenediphenols such as bisphenol A; pyrogallol; phloroglucidol; naphthalene diols; phenol/formaldehyde resins; resorcinol/formaldehyde resins; and phenol/resorcinol/formaldehyde resins. Mixtures of the above di- and polyacrylates may also be employed. Other examples include but are not limited to oxyranyl (meth)acrylates like 2,3-epoxybutyl (meth)acrylate, 3,4-epoxybutyl (meth)acrylate, 10,11 epoxyundecyl (meth)acrylate, 2,3-epoxycyclohexyl (meth)acrylate, glycidyl (meth)acrylate, hydroxyalkyl (meth) acrylates like 3-hydroxypropyl (meth)acrylate, 2-hydroxyethyl (meth)acrylate, 2,5-dimethyl-1,6-hexanediol (meth)acrylate, 1,10-decanediol (meth)acrylate, aminoalkyl (meth)acrylates like N-(3-dimethylaminopentyl (meth)acrylate, 3-dibutylaminohexadecyl (meth)acrylate; (meth)acrylic acid, nitriles of (meth)acrylic acid and other nitrogen containing (meth)acrylates like N-((meth)acryloyloxyethyl)diisobutylketimine, N-((meth)acryloylethoxyethyl)dihexadecylketimine, (meth)acryloylamidoacetonitrile, 2-(meth)acryloxyethylmethylcyanamide, cyanoethyl (meth)acrylate, aryl (meth)acrylates like benzyl (meth)acrylate or phenyl (meth)acrylate, where the acryl residue in each case can be unsubstitute or substituted up to four times; carbonyl-containing (meth)acrylates like 2-carboxyethyl (meth)acrylate, carboxymethyl (meth)acrylate, oxazolidinylethyl (meth)acrylate, N-((meth)acryloyloxy) formamide, acetonyl (meth)acrylate, N-(meth)acryloylmorpholine, N-(meth)acryloyl-2-pyrrolidinone, N-(2-(meth)acryloxyoxyethyl)-2-pyrrolidinone, N-(3-(meth)acryloyloxypropyl)-2-pyrrolidinone, N-(2-(meth)ylacryloyloxypentadecenyl)-2-pyrrolidinone, N-(3-(meth)acryloyloxyheptadecenyl)-2-pyrrolidinone; (meth)acrylates of ether alcohols like tetrahydrofurfuryl (meth)acrylate, vinyloxyethoxyethyl (meth)acrylate, methoxyethoxyethyl (meth)acrylate, 1-butoxypropyl (meth)acrylate, 1-methyl-(2-vinyloxy)ethyl (meth)acrylate, cyclohexyloxymethyl (meth)acrylate, methoxymethoxyethyl (meth)acrylate, bezyloxymethyl (meth)acrylate, furfuryl (meth)acrylate, 2-butoxyethyl (meth)acrylate, 2-ethoxyethoxymethyl (meth)acrylate, 2-ethoxyethyl (meth)acrylate, allyloxymethyl (meth)acrylate, 1-ethoxybutyl (meth)acrylate, ethoxymethyl(meth)acrylate; (meth)acrylates of halogenated alcohols, like 2,3-dibromopropyl (meth)acrylate, 4-bromophenyl (meth)acrylate1,3-dichloro-2-propyl (meth)acrylate, 2-bromoethyl (meth)acrylate, 2-iodoethyl (meth)acrylate, chloromethyl (meth)acrylate; phosphorus-, boron-, and/or silicon-containing (meth)acrylates like 2-(dimethylphosphato)propyl (meth)acrylate, 2-(ethylphosphito)propyl (meth)acrylate, dimethylphosphinoethyl (meth)acrylate, dimethylphosphinomethyl (meth)acrylate, dimethylphosphonoethyl (meth)acrylate, dimethy(meth)acryloyl phosphonate, dipropyl (meth)acryloyl phosphate, 2-(dibutylphosphono)ethyl methacrylate, 2,3-butelene(meth)acryloylethyl borate, methyldiethoxy(meth)acryloylethoxysilane, diethylphospahtoethyl (meth)acrylate; sulfur containing (meth)acrylates like ethylsulfinylethyl (meth)acrylate, 4-thiocyanatobutyl (meth)acrylate, ethylsulfonylethyl (meth)acrylate, thiocyanathomethyl (meth)acrylate, methylsulfonylmethyl (meth)acrylate, bis((meth)acryloyloxyethyl) sulfide.

The vinyl monomers and polyfunctional acrylates used with the vinyl esters, unsaturated polyesters, saturated polyesters, and polyurethanes may be used in varying amounts, preferably from about 10 to 50 based on the weight of the components which may be dissolved therein and more preferably from about 20 to 40 weight percent.

Additives may also include inhibitors added to the resin mix to stop or delay any crosslinking chain reaction that might be started by the possible formation of free radicals. Because free radicals can be formed at the carbon-carbon double bonds through several different mechanisms, such as interactions between molecules with heat and light, the possibility of the formation of free radicals is quite high. Should this occur there is a good possibility that the resin could crosslink during its storage. Therefore, the right amount of inhibitor in the system is useful to minimize stability problems. Suitable inhibitors may include but are not limited to, hydroquinone (HQ), tolu-hydroquinone (THQ), bisphenol A (BPA), naphthoquinone (NQ), p-benzoquinone (p-BQ), butylated hydroxy toluene (BHT), Hydroquinone monomethyl ether (HQMME), monotertiary butyl hydroquinone (MTBHQ), ditertiary Butyl hydroquinone (DTBHQ), tertiary butyl catechol (TBC), and other substituted and un-substituted phenols and mixtures of the above. Nitroxide initiators can also be used as inhibitors in the present invention.

Other polymerization inhibitors may include stable hindered nitroxyl compounds such as N,N-di-tert-butylnitroxide; N,N-di-tert-amylnitroxide; N-tert-butyl-2-methyl-1-phenyl-propylnitroxide; N-tert-butyl-1-diethyl phosphono-2,2-dimethyl propyl nitroxide; 2,2,6,6-tetramethyl-piperidinyloxy; 4-amino-2,2,6,6-tetramethyl-piperidinyloxy; 4-hydroxy-2,2,6,6-tetramethyl-piperidinyloxy; 4-oxo-2,2,6,6-tetramethyl-piperidinyloxy; 4-dimethylamino-2,2,6,6-tetramethyl-piperidinyloxy; 4-ethanoyloxy-2,2,6,6-tetramethyl-piperidinyloxy; 2,2,5,5-tetramethylpyrrolidinyloxy; 3-amino-2,2,5,5-tetramethylpyrrolidinyloxy; 2,2,4,4-tetramethyl-1-oxa-3-azacyclopentyl-3-oxy; 2,2,4,4-tetramethyl-1-oxa-3-pyrrolinyl-1-oxy-3-carboxylic acid; 2,2,3,3,5,5,6,6-octamethyl-1,4-diazacyclohexyl-1,4-dioxy; 4-bromo-2,2,6,6-tetramethyl-piperidinyloxy; 4-chloro-2,2,6,6-tetramethyl-piperidinyloxy; 4-iodo-2,2,6,6-tetramethyl-piperidinyloxy; 4-fluoro-2,2,6,6-tetramethyl-piperidinyloxy; 4-cyano-2,2,6,6-tetramethyl-piperidinyloxy; 4-carboxy-2,2,6,6-tetramethyl-piperidinyloxy; 4-carbomethoxy-2,2,6,6-tetramethyl-1-piperidinyloxy; 4-carbethoxy-2,2,6,6-tetramethyl-piperidinyloxy; 4-cyano-4-hydroxy-2,2,6,6-tetramethyl-piperidinyloxy; 4-methyl-2,2,6,6-tetramethyl-1-piperidinyloxy; 4-carbethoxy-4-hydroxy-2,2,6,6-tetramethyl-piperidinyloxy; 4-hydroxy-4-(1-hydroxypropyl)-2,2,6, 6-tetramethy 1-piperidinyloxy; 4-methyl-2,2,6,6-tetranlcthyl-1,2,5,6-tetrahydropyridinyloxyl, and the like. Additional useful stable hindered nitroxyl inhibitors are described on patent publications WO 01/40404 A1, WO01/40149 A2, WO 01/42313 A1, U.S. Pat. Nos. 4,141,883, 6,200,460, 5,728,872, incorporated here in their entirety.

According to some embodiments of the present invention, various amounts of inhibitors may be employed. Preferably, the inhibitors ranges from about 0.001 to about 0.5 percent based on the weight of the reactants, and more preferably from about 0.04 to about 0.1 percent by weight.

Suitable non-fibrous fillers are inert, particulate additives being essentially a means of reducing the cost of the final product while often reducing some of the physical properties of the polymerized cured compound. Fillers used in the invention include calcium carbonate of various form and origins, silica of various forms and origins, silicates, silicon dioxides of various forms and origins, clays of various forms and origins, feldspar, kaolin, flax, zirconia, calcium sulfates, micas, talcs, wood in various forms, glass (milled, platelets, spheres, micro-balloons), plastics (milled, platelets, spheres, micro-balloons), recycled polymer composite particles, metals in various forms, metallic oxides or hydroxides (except those that alter shelf life or viscosity), metal hydrides or metal hydrates, carbon particles or granules, alumina, alumina powder, aramid, bronze, carbon black, carbon fiber, cellulose, alpha cellulose, coal (powder), cotton, fibrous glass, graphite, jute, molybdenum, nylon, orlon, rayon, silica amorphous, sisal fibers, fluorocarbons and wood flour.

The fibrous materials may be incorporated into the resin in accordance with techniques which are known in the art. Addition of fiber(s) provides a means for strengthening or stiffening the polymerized cured composition forming the substrate. The types often used are: Inorganic crystals or polymers, e.g., glass fiber, quartz fibers, silica fibers, fibrous ceramics, e.g., alumina-silica (refractory ceramic fibers); boron fibers, silicon carbide, silicon carbide whiskers or monofilament, metal oxide fibers, including alumina-boric-silica, alumina-chromia-silica, zirconia-silica, and others. Organic polymer fibers, e.g., carbon fiber, fibrous graphite, acetates, acrylics (including acrylonitrile), aliphatic polyamides (e.g. nylon), aromatic polyamides, olefins (e.g., polypropylenes, polyesters, ultrahigh molecular weight polyethylenes), polyurethanes (e.g., Spandex), alpha-cellulose, cellulose, regenerated cellulose (e.g., rayon), jutes, sisal, vinyl chlorides, vinylidenes, flax, and thermoplastic fibers; metal fibers, e.g., aluminum, boron, bronze, chromium, nickel, stainless steel, titanium or their alloys; and "whiskers", single, inorganic crystals. Preferably, the filler is added in amount between 0 to 80% by weight and more preferably in an amount of 20 to 60% by weight based on the resin composition.

Flame retardant compounds may also be included in the present invention such as those described in numerous publications and patents known to those skilled in the art. Useful in formulating flame retardant compositions are, for example, brominated flame retardants compounds. Preferred brominated flame retardant compounds include, for example, 1,3,5-tris(2,4,6-tribromophenoxy)triazine, brominated polystyrene, brominated cyclodecane, brominated Bisphenol-A diglycidyl ether, alkyl or aryl or mixed aromatic-aliphatic phosphate esters such as Triphenyl, tricresyl phosphate, diphenyl-(2-ethyl hexyl)phosphate, tris(2-chlorosiopropyl)phosphate, trithylphosphate, tri-n-butyl phosphate, tri-isobutyl phosphate, di-n-butyl phosphate, tris(allyphenylphosphate), tris(2-methoxy-4-allylphosphate), tris (2-propylphenyl)phosphate, tri(4-vinylphenyl)phosphate, bis(diphenylphosphate ester)s of bisphenols such as Bisphenol-A, resorcinol or hydroquinone, resorcinol bis(2,6-dixylenyl phosphate), bis(diphenylphosphoramide)s, phosphonates such as dimethymethyl phosphonate, dimethylpropyl phosphonate, phosphites such as dimethyl phosphite, diethyl phosphite, trimethyl phosphite, triethyl phosphite, melamine polyphosphate, melamine cyanurate, metal phosphites, inorganic metal phosphites, red phosphorus, ammonium polyphosphate, and the like and mixtures thereof.

Optionally a thickening agent is added if the compositions are used for Bulk Molding Compounding, Sheer Molding compounding, in the range of 0.05 to 10 percent, preferably in the range of 0.2 to 5 percent by weight of the chemical thickener, based on the weight of the molding compound. The thickening agent is added to facilitate increasing the viscosity of the compounding mixture. Examples include CaO, Ca(OH)2, MgO or Mg(OH)2. Any suitable chemical thickener contemplated by one skill in the molding compound art may be used. The thickening agent(s) coordinate with carboxyl groups present in the polymer of the present invention or to any other polymer added therewith from those described above.

Other thickening agents that may also be included are isocyanates. These materials react with hydroxyl groups that may be present in the polymers of this invention or in other polymer added therewith from those described above. Polyisocyanates employed in the present invention are aromatic, aliphatic and cycloaliphatic polyisocyanates having 2 or more isocyanate groups per molecule and having an isocyanate equivalent weight of less than 300. Preferably the isocyanates are essentially free from ethylenic unsaturation and have no other substituents capable of reacting with the unsaturated polyester. Polyfunctional isocyanates which are used in the above reactions are well known to the skilled artisan. For the purposes of the invention, diisocyantes include aliphatic, cycloaliphatic, araliphatic, aromatic and heterocyclic diisocyantes of the type described, for example, by W. Siefken in Justus Liebigs Annalen der Chemie, 562, pages 75 to 136, (1949) for example, those corresponding to the following formula:

OCN—R—(NCO)$_n$ wherein n is equal to 1 to 3 and R represents a difunctional aliphatic, cycloaliphatic, aromatic, or araliphatic radical having from about 4 to 25 carbon atoms, preferably 4 to 15 carbon atoms, and free of any group which can react with isocyanate groups. Exemplary diisocyantes include, but are not limited to, toluene diisocyanate; 1,4-tetramethylene diisocyanate; 1,4-hexamethylene diisocyanate; 1,6-hexamethylene diisocyanate; 1,12-dodecane diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethyl cyclohexane; 2,4-hexahydrotolylene diisocyanate; 2,6-hexahydrotolylene diisocyanate; 2,6-hexahydro-1,3-phenylene diisocyanate; 2,6-hexahydro-1,4-phenylene diisocyanate; per-hydro-2,4'-diphenyl methane diisocyanate; per-hydro-4,4'-diphenyl methane diisocyanate; 1,3-phenylene diisocyanate; 1,4-phenylene diisocyanate; 2,4-tolylene diisocyanate, 2,6-toluene diisocyanates; biphenyl methane-2,4'-diisocyanate; biphenyl methane-4,4'-diisocyanate; naphthalene-1,5-diisocyanate; 1,3-xylylene diisocyanate; 1,4-xylylene diisocyanate; 4,4'-methylene-bis(cyclohexyl isocyanate); 4,4'-isopropyl-bis-(cyclohexyl isocyanate); 1,4-cyclohexyl diisocyanate; 3-isocyanatomethyl-3,5,5-trimethylcyclohexyl isocyanate (IPDI); 1-methyoxy-2,4-phenylene diisocyanate; 1-chloropyhenyl-2,4-diisocyante; p-(1-isocyanatoethyl)-phenyl isocyanate; m-(3-isocyanatobutyl)-phenyl isocyanate; and 4-(2-isocyanate-cyclohexyl-methyl)-phenyl isocyanate. Mixtures of any of the above may be employed. When deemed appropriate, a diisocyanate may be employed which contains other functional groups such as amino functionality.

The preferred polyfunctional isocyanate additive of the present molding compositions may consist of a dual-functional additive prepared by the one step-addition reaction between one equivalent weight of a diol or triol of molecular weight from 60 to 3000 and an excess of the polyfunctional isocyanate. The polyfunctional isocyanate excess is added in a quantity sufficient to allow unreacted polyfunctional isocyanate remain free in the mixture after the reaction with the diol or triol in an amount of 0.01 to 50 percent by weight of the total mixture and most preferable in an amount of 1 to 30 percent by weight of the mixture. In the reaction involving the diol or triol with the polyfunctional isocyanate, it is preferred to employ a catalyst. A number of catalysts know to the skill artisan may be used for this purpose. Suitable catalysts are described in U.S. Pat. Nos. 5,925,409 and 4,857,579, the disclosures of which are hereby incorporated by reference. Examples of the polyhydric alcohol having at least 2 hydroxyl groups in the molecule and a hydroxyl value of 35 to 1,100 mgKOH/g include ethylene glycol, propylene glycol, diethylene glycol, triethylene glycol, 1,5-pentane diol, 1,6-hexane diol, polyethylene glycol and polypropylene having a molecular weight of 200 to 3000, polytetramethylene glycol having a molecular weight of 200 to 3000, etc.

The present compositions and methods may employ a carbodiimide, preferably a carbodiimide intermediate containing from about 1 to about 1000 repeating units. Polycarbodiimides are preferably utilized. The carbodiimides depending on the amount added are used to react with the resin or components having active hydrogens. For example to lower the acid number of the unsaturated polyester resin or to increase the viscosities of the resins to form a gel like material. Exemplary carbodiimides are described in U.S. Pat. No. 5,115,072 to Nava et al., the disclosure of which is incorporated herein by reference in its entirety.

In general, the carbodiimides preferably are polycarbodiimides that include aliphatic, cycloaliphatic, or aromatic polycarbodiimides. The polycarbodiimides can be prepared by a number of reaction schemes known to those skilled in the art. For example, the polycarbodiimides may be synthesized by reacting an isocyanate-containing intermediate and a diisocyanate under suitable reaction conditions. The isocyanate containing intermediate may be formed by the reaction between a component, typically a monomer containing active hydrogens, and a diisocyanate. Included are also polycarbodiimides prepared by the polymerization of isocyanates to form a polycarbodiimide, which subsequently react with a component containing active hydrogens.

In some embodiments, the carbodiimide intermediate is represented by the formula selected from the group consisting of:

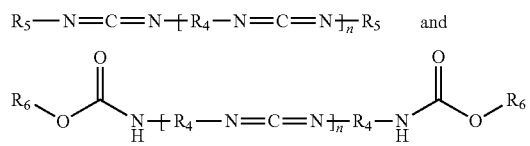

wherein R4 and R5 are independently selected from the group consisting of alkyl, aryl, and a compound containing at least one radical; R6 may be a monomeric unit or a polymeric unit having from 1 to 1000 repeating units; and n ranges from 0 to 100.

The carbodiimide is preferably used in a percentage ranging from about 0.10 to about 50% by weight based on the weight of reactants, and more preferably from about 1 to about 20 percent by weight.

The term "additive" is understood to mean any product which is used to modify the properties of the polymer. For example in the preparation of blends the used of toughening agents to increase the mechanical properties of the resulting cured material, addition of UV stabilizers to prevent degradation by UV radiation.

Additives include phenolic type antioxidants as those described in pages 1 to 104 in "Plastic additives", by R. Gachter and Müller, Hanser Publishers, 1990. Include also are Mannich type antioxidants, specially phenols and naphthols, suitable for the purpose herein include hindered aromatic alcohols, such as hindered phenols and naphthols, for example, those described in U.S. Pat. No. 4,324,717, the disclosure of which is incorporated herein by reference in its entirety.

Additional additives known by the skilled artisan may be employed in the resin composition of the present invention including, for example, paraffins, lubricants, flow agents, air release agents, flow agents, wetting agents, UV stabilizers, radiation curing initiators (i.e., UV curing initiators) and shrink-reducing additives. Various percentages of these additives can be used in the resin compositions.

Internal release agents are preferably added to the molding composition according to the invention. Aliphatic metal slats such as zinc stearate, magnesium stearate, calcium stearate or aluminum stearate can be used as the internal release agent. The amount of internal release agent added is in the range of 0.5 to 5.0 percent by weight, more preferably in the range of from 0.4 to 4.0 percent by weight. Hence, stable release can be made at the time of demolding without occurrence of any crack on the molded product.

Acrylic resins prepared by radical polymerization may be used in the mixtures. The acrylic resin preferably has an acid number ranging from about 1 to 100 mg of KOH/g, more preferably from about 5 to 50 mg of KOH/g, and most preferably from about 10 to 30 mg of KOH/g. The acrylic resin preferably has a hydroxyl number ranging from 5 to 300, more preferably from about 25 to 200, and most preferably from 50 to 150. The acrylic resin has a preferred number average molecular weight, determined by GPC versus polystyrene standards, from about 1000 to about 100,000, and more preferably from about 2000 to about 50,000. The acrylic resin has a polydispersity preferably from about 1.5 to about 30, more preferably from about 2 to 15. The Tg of the acrylic resin, measured by Differential Scanning calorimetry, is preferably from about −30° C. to about 150° C., and more preferably from about −10° C. to about 80° C.

The styrene acrylic resins which are used are preferably formed from about 0.5 to 30 percent by weight of a functional mercaptam which contains carboxyl, hydroxyl, siloxy, or sulfonic acid groups (most preferably from about 1 to 15 percent by weight), and from about 70 to about 99.5 percent by weight of an ethylenically unsaturated monomer (most preferably 85 to 99 percent by weight). Exemplary styrene/acrylic resins are described in Boutevin et al., Eur. Polym. J., 30; No. 5, pp. 615-619, and Rimmer et al., in Polymer, 37; No. 18, pp. 4135-4139. Also included are block copolymers of alkenyl aromatic hydrocarbons and alkylene oxides described in U.S. Pat. Nos. 3,050,511 and 3,836,600.

Various hydroxyl and carboxyl terminated rubbers may be also used as toughening agents. Examples of such materials are presented in U.S. Pat. No. 4,100,229, the disclosure of which is incorporated by reference herein in its entirety; and in J. P. Kennedy, in J. Macromol. Sci. Chem. A21, pp. 929(1984). Such rubbers include, for example, carbonyl-terminated and hydroxyl polydienes. Exemplary carbonyl-terminated polydienes are commercially available from BF Goodrich of Cleveland, Ohio, under the trade name of Hycar™. Exemplary hydroxyl-terminated Polydienes are commercially available from Atochem, Inc., of Malvern, Pa., and Shell Chemical of Houston, Tex.

A number of polysiloxanes may be used as toughening agents. Examples of suitable polysiloxanes include poly (alkylsiloxanes), (e.g., poly(dimethyl siloxane)), which includes compounds which contain silanol, carboxyl, and hydroxyl groups. Examples of polysiloxanes are described in Chiang and Shu, J. Appl. Pol. Sci. 361, pp. 889-1907, (1988).

Various hydroxyl and carboxyl terminated polyesters prepared from lactones (e.g., gamma-butyrolactone, ethacaprolactone), as described in Zhang and Wang, Macromol. Chem. Phys. 195, 2401-2407(1994); In't Velt et al, J. Polym. Sci. Part A, 35, 219-216(1997); Youqing et al, Polym. Bull. 37, 21-28(1996).

Various Telechelic Polymers as those described in "Telechelic Polymers: Synthesis and Applications", Editor: Eric J. Goethals, CRC Press, Inc. 1989, are also included in this invention.

Various polyethoxylated and polypropoxylated hydroxyl terminated polyethers derived from alcohols, phenols (including alkyl phenols), and carboxylic acids can be used as toughening agents. Alcohols which may be used in forming these materials include, but are not limited to, tridecyl alcohol, lauryl alcohol, and mixtures thereof. Commercially suitable polyethoxylated and polypropoxylated oleyl alcohol are sold under the trade name of Rhodasurf™ by Rhone-Poulenc of Cranbury, N.J., along with Trycol™ by Emery Industries of Cincinnati, Ohio. Examples of phenols and alkyl phenols which may be used include, but are not limited to, octyl phenol, nonyl phenol, tristyrylphenol, and mixtures thereof. Commercially suitable tristyrylphenols include, but are not limited to, Igepal™ by Rhone-Poulenc, along with Triton™ by Rohm and Haas of Philadelphia, Pa.

The unsaturated resins are particularly well suited for forming molded articles, including those used in storage tanks, automobile body panels, boat building, tub showers, culture marble, solid surface, polymer concrete, pipes and inner liners for pipeline reconstruction. Other applications include gelcoats and coatings. The unsaturated resins may be used alone or in conjunction with other appropriate materials. When the resins are used with other materials (e.g., fibrous reinforcements and fillers), they are typically used to form reinforced products such as storage tanks, automobile body panels, boat building, tub showers by any known process such as, for example pultrusion, sheet molding compounding (SMC), spray up, hand lay-up, resin transfer molding, vacuum injection molding, resin transfer molding and vacuum assisted resin transfer molding.

Several advantages are provided by the compositions of the present invention. Since the products have a higher amount of carbon-carbon linkages than any typical thermoset resins containing ester or urethane linkages they are less sensitive to thermal and hydrolytic stability. Replacement of these ester linkages by simple but most stable carbon-carbon sigma bond leads to a more stable unsaturated thermoset resins to both hydrolytically, thermal and as well as chemically resistant. A critical problem with thermosetting resins is that their linear shrinkage can be as high as five percent for most common resins. In addition, the resins of this invention have hydroxyl groups that may be reacted with isocyanates or anhydrides and acid groups that may be reacted with other epoxy containing materials. The acid groups may also be used to coordinate with metal salts such magnesium, zinc or calcium oxide. These reactions are important in the preparation of products for SMC applications, pultrusion, adhesives, and open mold among others. The resins of this invention have low shrink properties alone or in combination with other thermoset or thermoplastic resins. Examples to illustrate these advantages are presented below.

Polymers, copolymers or oligomers containing reactive functional groups that can undergo polymerization with other ethylenically unsaturated monomers or polymers are prepared by using styrenic monomers as the primary monomer in combination with a variety of ethylenically unsaturated monomers. For the purpose of this invention, it is preferable that low molecular weight polymers, copolymers and oligomers useful in the present invention are prepared by nitroxide mediated radical polymerization. The polymeric and/or oligomeric intermediates are prepared from ethylenically unsaturated type monomers that are incorporated as the repeating units in the backbone. The ethylenically unsaturated type monomers function both as solvent to carry out the polymerization and as reactive monomers to form the polymeric and/or oligomeric resin products. At least one of the monomers contains a reactive functional group that can further be reacted with other moieties. The functional groups contained in the monomers being reacted include but are not limited to hydroxyl, epoxy, phenol, thiol, amino, and other monomers containing active hydrogens. The preferred functionalities are epoxy, hydroxyl, carboxyl, amino and phenol.

The polystyrene intermediates containing the functional groups can further be reacted with other monomers containing ethylenically unsaturated moieties. For example polystyrene intermediates containing epoxy groups along the backbone, are further reacted with monomers such as acrylic or methacrylic acid. Another example may include the preparation of polystyrene intermediates containing hydroxyl functionality that can further be reacted with an isocyanate acrylate such as 2-isocyanatoethyl methacrylate. Diisocyanates reacted with one equivalent of hydroxyethyl methacrylate may also be used. Another example can include the preparation of polystyrene intermediates containing acid group functionality that can further be reacted with an acrylate or methacrylate containing epoxy functionality.

For the purpose of the present invention, both the polystyrene intermediates containing functional groups and preferably those containing reactive groups can be used to prepared curable compositions. Additionally, the polymeric and/or oligomeric intermediates may be combined with a variety of polymers to form mixtures with a large range of properties depending on the structure and nature of the materials in the mixture.

In some embodiments of the present invention, composite articles may be formed by applying a curable thermosetting composition to a substrate or a reinforcing material, such as by impregnating or coating the substrate or reinforcing material, and curing the curable composition. The properties accomplished from these materials can provide composite systems that can be used in various applications which can include molding, lamination, infusion, pultrusion, encapsulation, coatings, adhesives, prepregs, electrical and electronic components.

EXAMPLES

Nomeclature:
Mn—Hydro-Cure® III—9.0% Manganese
AcBL—α-Acetyl-γ-Butyrolactone
EtAcAc—Ethyl acetyl acetonate
MAcAc—Methyl acetyl acetonate
TAcAc—Tert-butyl acetyl acetonate
DDD—2,2-dimethyl-1,3-dioxane-4,6-dione
NQ—1,4-Naphthoquinone
PBQ—para-benzoquinone
THQ—Toluhydroquinone
Ethanox 4703—2,6-di-tert-butyl-α-dimethyl-amino-p-cresol
Potassium—potassium octoate
DMPT—N,N-dimethyl-p-toluidine
BiPy—2,2'-Bipyridine
DDSH—Dodecyl mercaptane
TaAcid—Tartaric acid
Asc. Acid—Ascorbic acid (Vitamin C)
Sty—Styrene
MMA—Methyl methacrylate
PEMA—Phenoxyethylmethacrylate
CHMA—Cyclohexyl mathacrylate
BuDMA—Butanediol dimethacrylate.
HDDA—Hexanediol diacrylate
NPGDMA—Neopentylglycol dimethacrylate
TMPTA—Trimethylol triacrylate
Polylite 31612-25—is an propylene glycol/maleic anhydride unsaturated polyester.
Polylite HS 35060—is a bisphenol A dimethacrylate intermediate
Polylite HS 35065—is an isophtalic acid type dimethacrylate intermediate
DION 44070-00—is a low molecular weight epoxy bisphenol A vinyl ester.
DION 32774-00—is a novolac epoxy vinyl ester.
DION 9102-70—is a bisphenol A chain extended epoxy vinyl ester.
GT—Gel time in muntes.
TTP—Total time to reach the highest exotherm achieved, in minutes.
EXO—Peak exotherm achieved during the curing process, in ° C.

The amounts listed on the Tables below, for the components incorporated in the mixtures of polymerizable components are given as parts per hundred (pph) or parts per million (ppm) based on 100 parts of reactive mixture. Amounts and concentrations are provided in wt/wt units unless the text or context indicates units of vol/wt. The following examples are provided to illustrate the present invention, and should not be construed as limiting thereof.

Sample Preparation:

To 100 grams of a liquid thermosetting resin was added a predetermined amount of the components claimed in this invention as described below. All components were mixed and a tongue depressor was used to periodically check for gelation of the resin. Once the resin gelled, the time was registered and a thermocouple was inserted into the resin to measure the exotherm generated from the curing reaction. The exotherm was recorded together with the time at the maximum temperature observed. Examples with the various ways to cure the thermosetting systems are presented in Tables below.

Several approaches can be used for preparing and curing the polymerizable compositions. For example, in one approach, a radically polymerizable component (a) is combined with a manganese- or iron-containing salt or complex (b), together with a tertiary amine or phosphine (c) and the nitrogen containing heterocycle or thiol compound (d). This polymerizable composition is stored for a desired period, and when one desires to use the composition as a thermosetting resin, the polymerizable composition is combined with a 1,3-dioxo compound (f) to start the polymerization and form a crosslinked material.

As a second approach, a radically polymerizable component (a) is combined with a polyhydroxy carboxylic acid (such as tartaric acid or ascorbic acid) or a thiol compound (e), and with a 1,3-dioxo compound (f). This polymerizable composition is stored for a desired period, and when one desires to use the composition as a thermosetting resin, a manganese- or iron-containing salt or complex (b) is combined with the polymerizable composition to start the polymerization and form a crosslinked network. Other possible approaches include, but are not limited to, combining (a) with (c), (d) and (f), followed by the addition of (b) to form a crosslinked network. Other combinations of components (a)-(g) may be appropriate depending on the chemical nature of (a) and its composition. In some embodiments, the approach for combining the components of the polymerizable composition will be selected based on the thermosetting components, inhibitors, any additives being part of the composition, and the final intended applications.

To assess mechanical properties (such as heat distortion temperature (HDT) and physical properties) of cured material produced from the polymerizable compositions, clear castings were prepared using the approaches above, and curing was then performed overnight at room temperature, followed the next day with post-curing for 2 hours at 180° F. (82.2° C.) and 2 hours at 250° F. (121.1° C.). The mechanical properties were analyzed at room temperature using an Instron machine, resin tensile strength was measured in accordance with ASTM Standard D-638; flexural strength was measured in accordance with ASTM Standard D-79; barcol hardness was determined in accordance with ASTM Standard D-2583; elongation was measured in accordance with ASTM Standard D-638; heat distortion was measured in accordance with ASTM Standard D-648; and Barcol hardness determined according to ASTM 2583-01 test methods. The results are summarized in the Tables below.

Heat of polymerization was determined using a DSC (differential scanning calorimetry) on a TA Instruments Q2000 system. The instrument was run using about 10 mg of a catalyzed sample in isothermal hold mode at 25° C. until full exotherm of polymerization was observed. The cure exotherms generated due to the heat of polymerization were integrated using either a straight or sigmoidal horizontal baseline. The results for the heat of polymerization are given in Kj/Kg.

Table 1 shows the curing behavior of a 50/50 wt. % mixture of HDDA/PEMA adding various amounts of BiPy, DMPT, Mn and AcBL.

TABLE 1

| | SAMPLE | | | | | |
|---|---|---|---|---|---|---|
| | 1 | 2 | 3 | 4 | 5 | 6 |
| HDDA/PEMA, g | 100 | 100 | 100 | 100 | 100 | 100 |
| BiPy, ppm | 100 | 300 | 200 | 100 | 100 | 100 |
| DMPT, ppm | 200 | 200 | 200 | 200 | 200 | 200 |
| Mn, pph | 0.5 | 0.75 | 0.75 | 0.7 | 0.75 | 0.75 |
| AcBL, pph | 1.5 | 1.5 | 1.5 | 1.2 | 1.2 | 1.5 |
| Gel time, min. | 27.00 | 6.50 | 7.00 | 18.00 | 16.00 | 10.50 |
| TTP, min | 58.40 | 20.50 | 18.75 | 31.50 | 28.50 | 21.75 |
| EXO, ° C. | 171.50 | 196.90 | 205.80 | 193.00 | 195.50 | 195.70 |

Table 2 shows the gel time drift stability of a 50/50 wt. % mixture of HDDA/PEMA adding various amounts of BiPy, DMPT, Mn and AcBL.

TABLE 2

| | SAMPLE, Wt % | | |
|---|---|---|---|
| | 1 | 2 | 3 |
| Mixture, g | 100 | 100 | 100 |
| BiPy, ppm | — | — | 0.01 |
| DMPT, ppm | — | — | 0.02 |
| Mn, pph | 0.75 | — | 0.75 |
| AcBL, pph | — | 1.5 | — |

TABLE 2-continued

| AcBL*, pph | 1.5 | — | 1.5 |
|---|---|---|---|
| Mn*, pph | — | 0.75 | — |
| Day | Gel Time, Min. | | |
| 1 | 11.20 | 31.50 | 5.80 |
| 3 | 6.50 | 28.00 | 5.20 |
| 10 | 6.75 | 25.50 | 5.50 |
| 17 | 7.00 | 20.80 | 4.90 |
| 25 | 8.00 | 22.50 | 5.50 |

AcBL* or Mn*—added to cure the mixtures.

Table 3 shows the gel time drift performance of a 50/50 mixture of HDDA/MMA. The (meth)acrylate mixture was promoted with 1.0% AcBL and 500 ppm of tartaric acid. To run the gel times during the various days, the samples were catalyzed with 0.75% Manganese salt. RTG and TTP are in minutes. Exo (Peak exotherm) is given in ° C.

| HDDA/MMA @ 50/50 MIXTURE | | | |
|---|---|---|---|
| DAY | RTG | TTP | Exo |
| 1 | 8.25 | 20.25 | 273.9 |
| 7 | 8.5 | 19.9 | 270.6 |
| 4 | 8.6 | 20.6 | 270.5 |
| 12 | 8.25 | 19.24 | 272.69 |

Table 4 shows the gel time drift performance of a 50/50 mixture of HDDA/MMA. The (meth)acrylate mixture was promoted with 1.0% AcBL and 250 ppm of ascorbic acid (Vitamin C). To run the gel times during the various days, the samples were catalyzed with 0.75% Manganese salt. RTG and TTP are in minutes. Exo (Peak exotherm) is given in ° C.

| HDDA/MMA @ 50/50 MIXTURE | | | |
|---|---|---|---|
| DAY | RTG | TTP | Exo |
| 1 | 7.2 | 29.48 | 184.31 |
| 2 | 7.8 | 26.46 | 167.96 |
| 12 | 8.1 | 26.92 | 171.07 |

Table 5 shows the curing behavior of HDDA/PEMA adding BiPy, DMPT, Mn and mixtures of AcBL and EtAcAc. Samples were first promoted with BiPy/DMPT together with MN. To determine the gel time, AcBL and EtAcAc were added.

TABLE 5

| | SAMPLE | | | |
|---|---|---|---|---|
| | 1 | 2 | 3 | 4 |
| HDDA/PEMA, g | 100 | 100 | 100 | 100 |
| BiPy, ppm | 1000 | 1000 | 1000 | 1000 |
| DMPT, ppm | 2000 | 2000 | 2000 | 2000 |
| Mn, pph | 0.75 | 0.75 | 0.75 | 0.75 |
| AcBL, pph | 0.5 | 0.25 | 0.1 | 0.1 |
| EtAcAc, pph | 0.5 | 0.5 | 0.5 | — |
| Gel time, min. | <1.0 | 2.80 | 9.50 | 24.50 |
| TTP, min | — | 7.50 | 19.70 | 40.80 |
| EXO, ° C. | — | 297.30 | 272.20 | 234.00 |

Table 6 shows the curing behavior of various (meth) acrylate in the presence and absence of a mercantan (thiol) compound. In the examples, the (meth)acrylate monomers were first mixed with the acetoacetate intermediate and the mercaptan compound, then the manganese-containing salt was added to initiate the polymerization. As can be observed, the thiol compound helps on shortening the gel time without compromising the exotherm of polymerization or obtaining a tack free surface on thin films.

|  | SAMPLE | | | | | | | | | | |
| --- | --- | --- | --- | --- | --- | --- | --- | --- | --- | --- | --- |
|  | 1 | 1a | 2 | 3 | 3a | 4 | 4a | 5 | 5a | 6 | 6a |
| HDDA, g | 100 | 100 | 50 | 50 | 50 | 50 | 50 | 50 | 50 | 50 | 50 |
| PEMA, g | — | — | 50 | 50 | 50 | — | — | — | — | — | — |
| TMPTA, g | — | — | — | — | — | 50 | 50 | — | — | — | — |
| MMA, g | — | — | — | — | — | — | — | 50 | 50 | — | — |
| CHMA, g | — | — | — | — | — | — | — | — | — | 50 | 50 |
| AcBL, pph | 0.5 | 0.5 | 0.5 | 0.5 | 0.5 | 0.5 | 0.5 | 0.5 | 0.5 | 0.5 | 0.5 |
| DDSH, ppm | 200 | — | 200 | 500 | — | 200 | — | 200 | — | 200 | — |
| Mn, pph | 0.5 | 0.5 | 0.5 | 0.5 | 0.5 | 0.5 | 0.5 | 0.5 | 0.5 | 0.5 | 0.5 |
| GT, min | 3.00 | 7.50 | 22.00 | 15.00 | 32.00 | 3.00 | 12.50 | 10.00 | 21.00 | 5.50 | 9.50 |
| TTP, min | 6.80 | 10.75 | 31.00 | 23.25 | 53.00 | 7.00 | 14.80 | 20.80 | 29.50 | 10.80 | 15.00 |
| EXO, ° C. | 275.80 | 288.80 | 167.40 | 164.30 | 286.00 | 288.20 | 289.50 | 141.80 | 263.50 | 200.00 | 223.30 |

Table 7 shows the curing behavior of 32774-00 and mixtures with BDDMA, HDDA or MMA, and adding BiPy, DMPT, Mn and AcBL. The Table also shows the heat of polymerization in joules/gram for samples 1 and 6.

|  | SAMPLE | | | | | |
| --- | --- | --- | --- | --- | --- | --- |
|  | 1 | 2 | 3 | 4 | 5 | 6 |
| 32774-00, g | 100 | 80 | 80 | 92 | 92 | 92 |
| HDDA, g | — | 20 | — | — | — | — |
| MMA, g | — | — | 20 | — | — | — |
| BDDMA, g | — | — | — | 8 | 8 | 8 |
| BiPy, ppm | 200 | 100 | 50 | 100 | 100 | 100 |
| DMPT, ppm | 200 | 200 | 200 | 200 | 200 | 200 |
| Mn, pph | 0.75 | 0.75 | 0.75 | 0.3 | 0.5 | 0.3 |
| AcBL, pph | 1.5 | 1.5 | 1.5 | 1.0 | 1.5 | 2.0 |
| Gel time, min. | 2.80 | 2.50 | 2.50 | 20.00 | 3.50 | 8.50 |
| TTP, min | 9.00 | 8.00 | 7.45 | 28.00 | 9.00 | 16.00 |
| EXO, ° C. | 160.00 | 185.30 | 187.90 | 163.00 | 164.20 | 162.70 |
| Heat of Pol. Kj/Kg | 329.0 | — | — | — | — | 168.80 |

Table 8 shows the curing behavior of 31612-25 and mixed with MMA, and adding BiPy, DMPT, Mn and AcBL.

TABLE 8

|  | SAMPLE | | | |
| --- | --- | --- | --- | --- |
|  | 1 | 2 | 3 | 4 |
| 31612-25, g | 90 | 90 | 100 | 100 |
| BDDMA, g | — | 10 | — | — |
| MMA, g | 10 | — | — | — |
| BiPy, ppm | 500 | 1000 | 1000 | 500 |
| DMPT, ppm | 600 | 1000 | 1000 | 1000 |
| Mn, pph | 1.0 | 1.5 | 1.5 | 1.0 |
| AcBL, pph | 2.0 | 2.0 | 2.0 | 2.0 |
| Gel time, min. | 30.75 | 6.50 | 8.50 | 22.00 |
| TTP, min | 59.50 | 22.40 | 25.80 | 59.75 |
| EXO, ° C. | 208.70 | 221.50 | 216.00 | 195.20 |

Physical Properties:

Table 9 shows the physical properties for castings of vinyl esters DION 9300-00 and DION 9102-70. The two resins were cured with a cobalt salt (Co) and a Mn salt. The resins cured with cobalt were promoted with cobalt, dimethyl aniline and using methyl ethyl ketone peroxide as the radical initiator to provide a 20 minutes room temperature gel time. The resins were cured with manganese were promoted with a Mn salt, BiPy, DMPT and using AcBL as the radical initiator to provide a 20 minutes room temperature gel time.

TABLE 9

|  | SAMPLE | | | |
| --- | --- | --- | --- | --- |
|  | DION 9300-00 | | DION 9102-70 | |
|  | Co | Mn | Co | Mn |
| Barcol hardness | 40 | 37 | 35 | 36 |
| HDT, ° C. | 110 | 106.3 | 104 | 105 |
| Flex. Strength, Psi. | 21,900 | 22,000 | 23,000 | 22,520 |
| Flex. Modulus, Kpsi. | 520 | 542 | 500 | 527 |
| Ten. Strength, Psi. | 10,900 | 13,000 | 11,600 | 12,600 |
| Ten. Modulus, Kpsi. | 510 | 500 | 460 | 478 |
| Elong. at Break, % | 5.2 | 4.9 | 5.2 | 6.2 |

Table 10 shows the physical properties for castings of 31612-25, 32774-00 and HDDA/PEMA. The resins were promoted with a Mn salt, BiPy, DMPT and using AcBL as the radical initiator to provide a 20 minutes room temperature gel time.

TABLE 10

|  | SAMPLE | | |
| --- | --- | --- | --- |
|  | 31612-25 | 32774-00 | HDDA/PEMA |
| Barcol hardness | 38 | 11 | 8 |
| HDT, ° C. | 129 | 51 | 41 |
| Flex. Strength, Psi. | 12,300 | 5,600 | 5,630 |
| Flex. Modulus, Kpsi. | 433 | 161 | 180 |
| Ten. Strength, Psi. | 5,470 | 2,780 | 3,215 |
| Ten. Modulus, Kpsi. | 430 | 126 | 160 |
| Elong. at Break, % | 1.6 | 3.5 | 3.4 |

Table 10B shows the curing behavior of BuDMA using various amounts of para-benzoquinone (PBQ).

TABLE 10B

|  | SAMPLE | | | | |
| --- | --- | --- | --- | --- | --- |
|  | 1 | 2 | 3 | 4 | 5 |
| BuDMA, % | 100 | 100 | 100 | 100 | 100 |
| PBQ, ppm | 0 | 250 | 500 | 750 | 1000 |
| AcBL, % | 1.00 | 1.00 | 1.00 | 1.00 | 1.00 |
| Mn, % | 1.00 | 1.00 | 1.00 | 1.00 | 1.00 |
| GT, min | 1.75 | 2.50 | 3.18 | 3.72 | 4.50 |

TABLE 10B-continued

|  | SAMPLE | | | | |
| --- | --- | --- | --- | --- | --- |
|  | 1 | 2 | 3 | 4 | 5 |
| TTP, min | 6.02 | 7.22 | 7.98 | 7.85 | 9.85 |
| EXO, ° C. | 207.10 | 206.88 | 205.79 | 202.21 | 203.95 |

Table 11 shows the curing behavior of BuDMA using various amounts of 1,4-Naphthoquinone (NQ).

TABLE 11

|  | SAMPLE | | | | |
| --- | --- | --- | --- | --- | --- |
|  | 1 | 2 | 3 | 4 | 5 |
| BuDMA, % | 100 | 100 | 100 | 100 | 100 |
| NQ, ppm | 0 | 250 | 500 | 750 | 1000 |
| AcBL, % | 1.00 | 1.00 | 1.00 | 1.00 | 1.00 |
| Mn, % | 1.00 | 1.00 | 1.00 | 1.00 | 1.00 |
| GT, min | 1.75 | 1.93 | 1.77 | 1.67 | 1.58 |
| TTP, min | 6.02 | 6.17 | 5.07 | 5.88 | 6.05 |
| EXO, ° C. | 207.10 | 199.30 | 192.77 | 192.46 | 193.39 |

Table 12 shows the curing behavior of BuDMA using various amounts of Ethanox 4703 (2,6-di-tert-butyl-alpha-dimethyl-amino-p-cresol).

TABLE 12

|  | SAMPLE | | | | |
| --- | --- | --- | --- | --- | --- |
|  | 1 | 2 | 3 | 4 | 5 |
| BuDMA, % | 100 | 100 | 100 | 100 | 100 |
| Ethanox 4703, ppm | 0 | 250 | 500 | 750 | 1000 |
| AcBL, % | 1.00 | 1.00 | 1.00 | 1.00 | 1.00 |
| Mn, % | 1.00 | 1.00 | 1.00 | 1.00 | 1.00 |
| GT, min | 1.75 | 3.67 | 8.03 | 13.03 | 33.58 |
| TTP, min | 6.02 | 8.25 | 13.53 | 21.15 | 63.07 |
| EXO, ° C. | 207.10 | 204.84 | 201.04 | 186.41 | 111.39 |

Table 13 shows the curing behavior of HDDA using various amounts of Ethanox 4703.

TABLE 13

|  | SAMPLE | | | | |
| --- | --- | --- | --- | --- | --- |
|  | 1 | 2 | 3 | 4 | 5 |
| HDDA, % | 100 | 100 | 100 | 100 | 100 |
| Ethanox 4703, ppm | 0 | 250 | 500 | 750 | 1000 |
| AcBL, % | 1.00 | 1.00 | 1.00 | 1.00 | 1.00 |
| Mn, % | 1.00 | 1.00 | 1.00 | 1.00 | 1.00 |
| GT, min | 1.92 | 5.12 | 15.17 | 40.17 | 122.75 |
| TTP, min | 4.88 | 8.62 | 28.33 | 60.67 | 134.78 |
| EXO, ° C. | 308.52 | 303.59 | 243.65 | 83.80 | 34.44 |

Table 14 shows the curing behavior of HDDA/BuDMA using various amounts of THQ.

TABLE 14

|  | SAMPLE | | |
| --- | --- | --- | --- |
|  | 1 | 2 | 3 |
| HDDA, % | 25 | 25 | 25 |
| BuDMA, % | 75 | 75 | 75 |
| THQ, ppm | 255 | 305 | 350 |
| AcBL, % | 1.00 | 1.00 | 1.00 |
| Mn, % | 1.00 | 1.00 | 1.00 |
| GT, min | 13.67 | 24.67 | 52.67 |
| TTP, min | 19.92 | 33.18 | 84.44 |
| EXO, ° C. | 247.36 | 238.58 | 37.49 |

Table 15 shows the curing behavior of HDDA/BuDMA using various amounts of PBQ.

TABLE 15

|  | SAMPLE | | | |
| --- | --- | --- | --- | --- |
|  | 1 | 2 | 3 | 4 |
| HDDA, % | 25 | 0 | — | — |
| BuDMA, % | 75 | 0 | — | — |
| AcBL, % | 1 | 0 |  |  |
| PBQ (ppm) | 0 | 25 | 50 | 75 |
| Mn, % | 1.00 | 1.00 | 1.00 | 1.00 |
| GT, min | 12.08 | 16.33 | 13.47 | 15.67 |
| TTP, min | 17.23 | 22.05 | 19.33 | 22.33 |
| EXO, ° C. | 246.69 | 243.17 | 247.10 | 244.50 |

Table 16 shows the curing behavior of HDDA/BuDMA using various amounts of Tartaric acid.

TABLE 16

|  | SAMPLE | | | | | | |
| --- | --- | --- | --- | --- | --- | --- | --- |
|  | 1 | 2 | 3 | 4 | 5 | 6 | 7 |
| HDDA, % | 50 | 50 | 50 | 50 | 50 | 50 | 50 |
| BuDMA, % | 50 | 50 | 50 | 50 | 50 | 50 | 50 |
| Tartaric Acid, ppm | 0 | 100 | 200 | 530 | 750 | 1000 | 1000 |
| Mn, % | 0.50 | 0.50 | 0.50 | 0.50 | 0.50 | 0.50 | 1.00 |
| AcBL, % | 1.50 | 1.50 | 1.50 | 1.50 | 1.50 | 1.50 | 1.50 |
| GT, min | 2.07 | 3.25 | 3.83 | 8.50 | 15.42 | 32.50 | 11.23 |
| TTP, min | 6.27 | 7.32 | 8.18 | 13.05 | 19.93 | 38.92 | 15.78 |
| EXO, ° C. | 273.80 | 271.02 | 273.36 | 268.31 | 268.79 | 261.30 | 268.54 |

Table 17 shows the curing behavior of 35060-00/HDDA using various amounts of PBQ, DMPT and a quaternary ammonium salt (alkyl dimethyl benzyl ammonium chloride).

TABLE 17

| | SAMPLE | | | | | |
|---|---|---|---|---|---|---|
| | 1 | 2 | 3 | 4 | 5 | 6 |
| 35060-00, % | 70 | 70 | 70 | 70 | 70 | 70 |
| HDDA, % | 30 | 30 | 30 | 30 | 30 | 30 |
| PBQ, ppm | 100 | — | — | — | — | — |
| DMPT, ppm | — | — | — | — | — | 1000 |
| Quat. Salt, ppm | 200 | 500 | 1000 | 1500 | 1600 | 1600 |
| Mn, % | 1.0 | 1.0 | 1.5 | 1.5 | 1.5 | 1.5 |
| AcBL, % | 1.0 | 1.0 | 1.0 | 1.0 | 1.0 | 1.0 |
| GT, min | >60 | 28 | 12.5 | 9 | 9 | 8.75 |
| TTP, min | — | 39 | 17.5 | 13.5 | 13 | 13 |
| EXO, ° C. | — | 125 | 134 | 132.8 | 139.7 | 131.7 |

Table 18 shows the curing behavior of 35060-00/HDDA using various amounts of tartaric acid, potassium octoate, ethyl acetyl acetonate and acetyl butyrolactone.

TABLE 18

| | SAMPLE | | | |
|---|---|---|---|---|
| | 1 | 2 | 3 | 4 |
| 35060-00, % | 70 | 70 | 70 | 70 |
| HDDA, % | 30 | 30 | 30 | 30 |
| Tartaric Acid, ppm | 200 | 200 | 200 | 200 |
| Potassium, ppm | — | — | 0.5 | 0.3 |
| Mn - % | 1.0 | 1.0 | 1.0 | 1.0 |
| EAcAc - % | 1.0 | 1.0 | 1.0 | 0.5 |
| AcBL - % | — | 0.3 | 0.2 | 1 |
| GT, min | >>120 | 29.5 | 4 | 6.5 |
| TTP, min | — | 35.5 | 9.75 | 13.5 |
| EXO, ° C. | — | 114.1 | 111.8 | 109.7 |

Table 19 shows the curing behavior of 35065-00/BuDMA using various amounts of tartaric acid, potassium octoate, methyl acetyl acetonate and acetyl butyrolactone.

TABLE 19

| | SAMPLE | | |
|---|---|---|---|
| | 1 | 2 | 3 |
| 35065-00, % | 65 | 65 | 65 |
| BuDMA, % | 35 | 35 | 35 |
| Tartaric acid, ppm | 200 | 200 | 200 |
| Potassium, ppm | — | — | 0.5 |
| Mn - % | 1.0 | 1.0 | 1.0 |
| MAcAc - % | 1.0 | 1.0 | 1.0 |
| AcBL - % | — | 0.3 | 0.2 |
| GT, min | >>120 | 10.0 | 2.5 |
| TTP, min | — | 16.5 | 6.5 |
| EXO, ° C. | — | 162.7 | 160.5 |

Table 20 shows the curing behavior of 35065-00/BuDMA using various amounts of tartaric acid, potassium octoate, tert-butyl acetyl acetonate and acetyl butyrolactone.

TABLE 20

| | SAMPLE | | | | |
|---|---|---|---|---|---|
| | 1 | 2 | 3 | 4 | 5 |
| 35065-00, % | 65 | | | | |
| BuDMA, % | 35 | | | | |
| Tartaric acid, ppm | 200 | 200 | 200 | 200 | 200 |
| Pottassium, ppm | — | — | — | — | 0.5 |
| Mn, % | 1.00 | 1.00 | 1.00 | 1.00 | 1.00 |
| TAcAc - % | 1.00 | 1.50 | 2.00 | 1.00 | 1.00 |
| AcBL, % | — | — | — | 0.30 | 0.20 |
| GT, min | >>210 | >>210 | >>210 | 9.5 | 3.0 |
| TTP, min | — | — | — | 15.0 | 8.0 |
| EXO, ° C. | — | — | — | 161.2 | 160.9 |

Table 21 shows the curing behavior of 35060-00/HDDA using various amounts of tartaric acid, potassium octoate, 2,2-dimethyl-1,3-dioxane-4,6-dione (DDD) and acetyl butyrolactone.

TABLE 21

| | SAMPLE | | |
|---|---|---|---|
| | 1 | 2 | 3 |
| 35060-00, % | 70 | 70 | 70 |
| HDDA, % | 30 | 30 | 30 |
| Tartaric Acid, ppm | 100 | 100 | 100 |
| Potassium, ppm | — | — | 0.5 |
| Mn - % | 1.0 | 1.0 | 1.0 |
| DDD - % | 1.0 | 1.0 | 1.0 |
| AcBL - % | — | 0.3 | 0.3 |
| GT, min | >>120 | 17.0 | 6.5 |
| TTP, min | — | 25.9 | 22.0 |
| EXO, ° C. | — | 100.8 | 42.3 |

Table 22 shows the mechanical properties and heat of polymerization of blends of resin 44070 with BuDMA and HDDA.

TABLE 22

| | 44070/BuDMA 40/60 Wt % | 44070/HDDA 40/60 Wt % |
|---|---|---|
| LIQUID PROPERTIES | | |
| Viscosity, cps | 400 | 362.5 |
| MECHANICAL PROPERTIES | | |
| Flex. Strength, Psi | 9,709 | 10,235 |
| Flex Modulus, Kpsi | 400 | 330 |
| Ten. Strength, Psi | 3,277 | 4,634 |
| Ten. Modulus, Kpsi | 247 | 284 |
| Elogation, % | 1.6 | 2.2 |
| HDT, ° C. | 202 | 59 |
| Barcol Harness | 30-35 | 28-30 |
| Heat of Polymerization | 305 | 426 |

Table 23 shows the mechanical properties and heat of polymerization of blends of resin 44070 with HDDA and NPGDMA.

TABLE 23

| | 44070/HDDA 60/40 Wt % | 44070/NPGDMA 50/50 Wt % |
|---|---|---|
| LIQUID PROPERTIES | | |
| Viscosity, cps | 400 | 362.5 |
| MECHANICAL PROPERTIES | | |
| Flex. Strength, Psi | 7,043 | 7,020 |
| Flex Modulus, Kpsi | 190 | 200 |

TABLE 23-continued

|  | 44070/HDDA 60/40 Wt % | 44070/NPGDMA 50/50 Wt % |
| --- | --- | --- |
| Ten. Strength, Psi | 3,710 | 2,769 |
| Ten. Modulus, Kpsi | 168 | 205 |
| Elogation, % | 3.2 | 1.6 |
| Barcol Harness | 28-30 | 20-25 |
| Heat of Polymerization | 285 | 190 |

In view of this disclosure it is noted that the methods and compositions can be implemented in keeping with the present teachings. Further, the various components, materials, structures and parameters are included by way of illustration and example only and not in any limiting sense. In view of this disclosure, the present teachings can be implemented in other applications and components, materials, structures and equipment to implement these applications can be determined, while remaining within the scope of the appended claims.

EXEMPLARY EMBODIMENTS

The following exemplary embodiments are provided to illustrate the present invention, and should not be construed as limiting thereof.

Embodiment 1A

A polymerizable composition comprising: a) a radically polymerizable component; b) a manganese-containing or iron-containing salt or organic complex; c) optionally a tertiary amine or phosphine; d) optionally a nitrogen-containing aromatic heterocycle or a thiol-containing compound; e) optionally a polyhydroxy carboxylic acid; f) a 1,3-dioxo compound; and g) optionally, a transition metal salt other than the manganese or iron containing salt or organic complex, wherein the polymerizable composition is substantially free of one or more of (and preferably, all of) cobalt, copper, and a peroxide initiator, and the polymerizable composition comprises at least one of: (1) a combination of (i) a tertiary amine or phosphine, and (ii) a nitrogen-containing aromatic heterocycle or a thiol-containing compound; (2) a polyhydroxy carboxylic acid; or (3) a thiol-containing compound; wherein the polymerizable composition has a gel-time drift less than about 20%, alternatively less than about 15%, over 30 days, alternatively over 60 days.

Embodiment 1B

A polymerizable composition comprising: a) a radically polymerizable component; b) a manganese-containing or iron-containing salt or organic complex; c) a tertiary amine or phosphine; d) a nitrogen-containing aromatic heterocycle or a thiol-containing compound; f) a 1,3-dioxo compound; and g) optionally, a transition metal salt other than the manganese or iron containing salt or organic complex, wherein the polymerizable composition is substantially free of one or more of cobalt, copper and a peroxide initiator.

Embodiment 1C

A polymerizable composition comprising: a) a radically polymerizable component; b) a manganese-containing or iron-containing salt or organic complex; e) a polyhydroxy carboxylic acid; f) a 1,3-dioxo compound; and g) optionally, a transition metal salt other than the manganese or iron containing salt or organic complex, wherein the polymerizable composition is substantially free of one or more of cobalt, copper and a peroxide initiator.

Embodiment 1D

A polymerizable composition comprising: a) a radically polymerizable component; b) a manganese-containing or iron-containing salt or organic complex; d) a thiol-containing compound; f) a 1,3-dioxo compound; and g) optionally, a transition metal salt other than the manganese or iron containing salt or organic complex, wherein the polymerizable composition is substantially free of one or more of cobalt, copper and a peroxide initiator.

Embodiment 1E

A polymerizable composition comprising: a) a radically polymerizable component; b) a manganese-containing or iron-containing salt or organic complex; c) optionally a tertiary amine or phosphine; d) optionally a nitrogen-containing aromatic heterocycle or a thiol-containing compound; e) optionally a polyhydroxy carboxylic acid; wherein the polymerizable composition has a characteristic gel time when combined with a 1,3-dioxo compound, and the polymerizable composition has gel-time drift less than about 20%, alternatively less than about 15%, over 30 days, alternatively over 60 days.

Embodiment 1F

A polymerizable composition comprising: a) a radically polymerizable component; c) optionally a tertiary amine or phosphine; d) optionally a nitrogen-containing aromatic heterocycle or a thiol-containing compound; e) optionally a polyhydroxy carboxylic acid; f) a 1,3-dioxo compound; wherein the polymerizable composition has a characteristic gel time when combined with a manganese-containing or iron-containing salt or organic complex, and the polymerizable composition has gel-time drift less than about 20%, alternatively less than about 15%, over 30 days, alternatively over 60 days.

Embodiment 2

The polymerizable composition of any of Embodiments 1A to 1F, wherein the manganese- or iron-containing salt or complex is selected from salts and complexes of the following formulas and mixtures thereof: a salt selected from salts of the formula (M)(RCOO-)2, as described above; a naphthenate complex as described above; or an acetyl acetonate complex as described above.

Embodiment 3

The polymerizable composition of any of Embodiments 1A to 1F, wherein the manganese- or iron-containing salt or complex is selected from organophosphine metal complexes comprising an organophosphine having a structure of Formula P-I, P-II, P-III or P-IV, and mixtures thereof, which are describe above.

Embodiment 4

The polymerizable composition of any of Embodiments 1A to 1F, wherein the manganese- or iron-containing salt or complex is selected from complexes comprising nitrogen donor ligands of Formulas N—I, N—II, N—IV, N—V, N-VI, or N-VII, which are describe above.

Embodiment 5

The polymerizable composition of any of Embodiments 1A to 1F, wherein the 1,3-dioxo compound is selected from compounds of Formulas D-I to D-VI and mixtures thereof, as described above.

Embodiment 6

The polymerizable composition of any of Embodiments 1A to 1F, comprising a tertiary amine selected from the group consisting of N,N-dimethylaniline, N,N-diethylaniline, N,N-dimethyl-toluidine, N,N-diethyltoluidine, N,N-bis(2-hydroxy-ethyl)-p-toluidine, ethoxylated p-toluidines, N,N-bis-(2-hydroxyethyl)-p-toluidine, and mixtures thereof.

Embodiment 7

The polymerizable composition of any of Embodiments 1A to 1F, comprising a nitrogen-containing heterocyclic amine selected from the group consisting of compounds of Formulas H—I, H—II, or H-III and mixtures thereof, as described above.

Embodiment 8 polymerizable composition of any of Embodiments 1A to 1F, comprising a polyhydroxy carboxylic acid selected from tartaric acid, ascorbic acid, or mixture thereof.

Embodiment 9

The polymerizable composition of any of Embodiments 1A to 1F, wherein the manganese- or iron-containing salt or organic complex is selected from manganese octoate and manganese naphthenate, the heterocycle is 2,2'-Bipyridine, the tertiary amine is N,N-dimethyl-p-toluidine, and the 1,3-dioxo compound is α-Acetyl-γ-Butyrolactone.

Embodiment 10

A curing system for curing a radically polymerizable component, the curing system comprising: b) a manganese-containing or iron-containing salt or organic complex; c) optionally a tertiary amine or phosphine; d) optionally a nitrogen-containing aromatic heterocycle or a thiol-containing compound; e) optionally a polyhydroxy carboxylic acid; f) a 1,3-dioxo compound; and wherein the curing system is substantially free of one or more of cobalt, copper, and a peroxide initiator, and the curing system comprises at least one of: (1) a combination of (i) a tertiary amine or phosphine, and (ii) a nitrogen-containing aromatic heterocycle or a thiol-containing compound; (2) a polyhydroxy carboxylic acid; or (3) a thiol-containing compound.

Embodiment 11

The curing system of Embodiment 10, wherein the curing system consists essentially of a manganese-containing salt or organic complex, a tertiary amine, and a nitrogen heterocycle. In some embodiments, the curing system also includes an inhibitor.

Embodiment 12

The curing system of Embodiment 10 or 11, wherein the curing system consists essentially of a manganese-containing salt or organic complex, a polyhydroxy carboxylic acid, and a 1,3-dioxo compound. In some embodiments, the curing system also includes an inhibitor.

Embodiment 13

The curing system of any of Embodiments 10 to 12, wherein the curing system consists essentially of a manganese-containing salt or organic complex, a 1,3-dioxo compound, and a thiol-containing compound. In some embodiments, the curing system also includes an inhibitor.

Embodiment 14

A method of curing a polymerizable composition comprising: forming a mixture of: a) a radically polymerizable component; b) a manganese-containing or iron-containing salt or organic complex; c) optionally a tertiary amine or phosphine; d) optionally a nitrogen-containing aromatic heterocycle or a thiol-containing compound; e) optionally a polyhydroxy carboxylic acid; f) a 1,3-dioxo compound; and wherein the polymerizable composition is substantially free of one or more of cobalt, copper and a peroxide initiator, and the polymerizable composition comprises at least one of: (1) a combination of (i) a tertiary amine or phosphine, and (ii) a nitrogen-containing aromatic heterocycle or a thiol-containing compound; (2) a polyhydroxy carboxylic acid; or (3) a thiol-containing compound.

Embodiment 15

The method of Embodiment 14, further comprising: preparing a polymerizable composition comprising: a) a radically polymerizable component; b) a manganese-containing or iron-containing salt or organic complex; c) optionally a tertiary amine or phosphine; d) optionally a nitrogen-containing aromatic heterocycle or a thiol-containing compound; and e) optionally a polyhydroxy carboxylic acid. The method further comprises storing the polymerizable composition over for at least 30 days, alternatively at least 60 days; and thereafter combining the polymerizable composition with a 1,3-dioxo compound.

Embodiment 16

The method of Embodiment 14, further comprising: preparing a polymerizable composition comprising: a) a radically polymerizable component; c) optionally a tertiary amine or phosphine; d) optionally a nitrogen-containing aromatic heterocycle or a thiol-containing compound; e) optionally a polyhydroxy carboxylic acid; and f) a 1,3-dioxo compound. The method further comprises storing the polymerizable composition for at least 30 days, alternatively at least 60 days; and thereafter combining the polymerizable composition with a manganese-containing or iron-containing salt or organic complex.

Embodiment 17

The method of any of Embodiments 14 to 16, wherein the radically polymerizable component is selected from the group consisting of a polyester resin, a vinyl ester resin, a urethane acrylate resin, a vinyl hybrid resin, and combinations thereof.

Embodiment 18

The method of any of Embodiment 15, wherein the radically polymerizable component, the manganese- or iron-containing salt or organic complex, the tertiary amine or phosphine, and the nitrogen-containing aromatic heterocycle or the thiol-containing compound are combined and stored for at least 30 days prior to forming a mixture with the 1,3-dioxo compound.

Embodiment 19

The method of Embodiment 14, wherein the radically polymerizable component, the manganese- or iron-containing salt or organic complex and the polyhydroyxl carboxylic acid or the thiol compound are combined and stored for at least 30 days prior to forming a mixture with the 1,3-dioxo compound.

Embodiment 20

The method of Embodiment 14, wherein the radically polymerizable component and the 1,3-dioxo compound, the tertiary amine or phosphine, and the nitrogen-containing aromatic heterocycle or the thiol-containing compound are combined and stored for at least 30 days prior to forming a mixture with the manganese- or iron-containing salt or organic complex.

Embodiment 21

The method of Embodiment 14, wherein the radically polymerizable component and the 1,3-dioxo compound, and the polyhydroyxl carboxylic acid or the thiol compound are combined and stored for at least 30 days prior to forming a mixture with the manganese- or iron-containing salt or organic complex.

Embodiment 22

The method of any of Embodiments 14 to 21, further comprising applying the mixture as a coating, layer, or casting before or while the polymerizable composition is curing.

Embodiment 23

The method of any of Embodiments 14 to 21, wherein the polymerizable composition is applied as a sheet molding compound (SMC) resin, castings resin, adhesive, pultrusion resin, corrosion resistant resin, flame retardant resin, low or zero styrene content resin, filament winding resin, hand lay-up resin, resin transfer molding resin, prepreg, gelcoat or coating resin.

Embodiment 24

A resin comprising the polymerizable composition any of Embodiments 1A to 1F, wherein the resin is a sheet moulding compound (SMC) resin, resin transfer molding (RTM) resin, castings resin, adhesive resin, pultrusion resin, corrosion resistant resin, flame retardant resin, low or zero styrene content resin, prepreg, gelcoat, or coating resin.

Embodiment 25

The polymerizable composition of any of the foregoing embodiments, wherein the polymerizable composition has a heat of polymerization less than 950 kJ/kg.

Embodiment 26

The polymerizable composition of any of the foregoing embodiments, wherein the polymerizable composition has a peak exotherm less than 300° C.

Embodiment 27

The polymerizable composition of any of the foregoing embodiments, wherein the polymerizable composition has a time to peak exotherm between 5 min and 60 min.

Embodiment 28

The polymerizable composition of any of the foregoing embodiments, wherein the polymerizable composition has a gel time between 10 sec and 60 min.

All patents and publications referred to herein are expressly incorporated by reference. As disclosed herein, a number of ranges of values are provided. It is understood that each intervening value, to the tenth of the unit of the lower limit, unless the context clearly dictates otherwise, between the upper and lower limits of that range is also specifically disclosed.

What is claimed is:
1. A polymerizable composition comprising:
a) a radically polymerizable component;
b) a manganese-containing or iron-containing salt or organic complex;
c) optionally a tertiary amine or phosphine;
d) optionally a nitrogen-containing aromatic heterocycle or a thiol-containing compound;
e) optionally a polyhydroxy carboxylic acid;
f) a 1,3-dioxo compound; and
g) optionally, a transition metal salt other than the manganese or iron containing salt or organic complex,
wherein the polymerizable composition is substantially free of cobalt, copper, and a peroxide initiator, and
the polymerizable composition comprises at least one of:
(1) a combination of (i) a tertiary amine or phosphine, and (ii) a nitrogen-containing aromatic heterocycle; or
(2) a polyhydroxy carboxylic acid;
wherein the polymerizable composition has a gel-time drift less than about 20% over 30 days.

2. The polymerizable composition of claim 1, wherein the manganese- or iron-containing salt or complex is selected from salts and complexes of the following formulas and mixtures thereof:
i) a salt selected from salts of the formula $(M)(RCOO-)_2$, wherein M is either manganese or iron, and each R is independently selected from H, substituted or unsubstituted linear alkyl, substituted or unsubstituted branched alkyl, substituted or unsubstituted linear alkenyl, substituted or unsubstituted branched alkenyl, substituted or unsubstituted linear alkynyl, substituted or unsubstituted branched alkynyl, substituted or unsubstituted aryl, or substituted or unsubstituted alkylaryl;

ii) a naphthenate complex selected from complexes of the formulas:

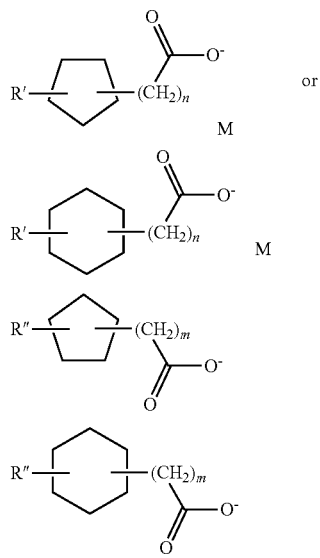

wherein M is either manganese or iron, m and n are independently 0 or greater, and R' and R" are independently selected from H, substituted or unsubstituted linear alkyl, substituted or unsubstituted branched alkyl, substituted or unsubstituted linear alkenyl, substituted or unsubstituted branched alkenyl, substituted or unsubstituted linear alkynyl, substituted or unsubstituted branched alkynyl, substituted or unsubstituted aryl, and substituted or unsubstituted alkylaryl;

iii) an acetyl acetonate complex selected from complexes of the formula:

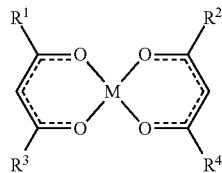

wherein M is either manganese or iron, $R^1$, $R^2$, $R^3$ and $R^4$ are each independently selected from H, substituted or unsubstituted linear alkyl, substituted or unsubstituted branched alkyl, substituted or unsubstituted linear alkenyl, substituted or unsubstituted branched alkenyl, substituted or unsubstituted linear alkynyl, substituted or unsubstituted branched alkynyl, substituted or unsubstituted aryl, and substituted or unsubstituted alkylaryl.

3. The polymerizable composition of claim 1, wherein the manganese- or iron-containing salt or complex is selected from organophosphine metal complexes comprising an organophosphine having a structure of Formula P-I, P-II, P-III or P-IV, and mixtures thereof:

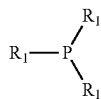

Formula P-I wherein $R_1$ is, independently in each instance, H, hydroxyl, branched or cyclic aliphatic containing C1 to C6; C1-C4 alkoxy; aryl e.g., C6-C20 monocyclic or polycyclic aryl such as phenyl, toluoyl, naphthyl, biphenyl, terphenyl, aryl aromatic containing halogens, amino, silyl; heteroalkyl e.g., C6-C20 monocyclic or polycyclic heteroaryl such as thienyl, furyl, imidazolyl, pyrazolyl, pyridyl, pyrazynyl, pyrimidyl, pyridazinyl, indolyl, quinolyl and isoquinolyl;

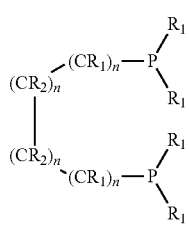

Formula P-II wherein $R_1$ is, independently in each instance, H, hydroxyl, branched or cyclic aliphatic containing C1 to C6, C1-C4 alkoxy; aryl e.g., C6-C20 monocyclic or polycyclic aryl such as phenyl, toluoyl, naphthyl, biphenyl, terphenyl, aryl aromatic containing halogens, amino, silyl; heteroalkyl e.g., C6-C20 monocyclic or polycyclic heteroaryl such as thienyl, furyl, imidazolyl, pyrazolyl, pyridyl, pyrazynyl, pyrimidyl, pyridazinyl, indolyl, quinolyl and isoquinolyl; $R_2$ is, independently in each instance, H, linear, branched or cyclic aliphatic containing C1 to C14, alkyl aromatic, aryl aromatic containing halogens, amino, silyl or alkoxy groups and be interconnected by an aliphatic or an aromatic ring between R1 groups, R2 groups or R1 and R2 groups; n is 0 to 4; and Y is either N or P;

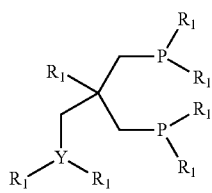

Formula P-III wherein $R_1$ is, independently in each instance, H, hydroxyl, branched or cyclic aliphatic containing C1 to C6, C1-C4 alkoxy; aryl e.g., C6-C20 monocyclic or polycyclic aryl such as phenyl, toluoyl, naphthyl, biphenyl, terphenyl, aryl aromatic containing halogens, amino, silyl; heteroalkyl e.g., C6-C20 monocyclic or polycyclic heteroaryl such as thienyl, furyl, imidazolyl, pyrazolyl, pyridyl, pyrazynyl, pyrimidyl, pyridazinyl, indolyl, quinolyl and isoquinolyl; and Y is N or P;

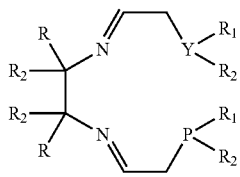

Formula P-IV wherein R is, independently in each instance, H, linear, branched or cyclic aliphatic containing C1 to C14, alkyl aromatic, aryl aromatic containing halogen, amino or alkoxy groups; $R_1$ is, independently in each instance, H, hydroxyl, branched or cyclic aliphatic containing C1 to C6, C1-C4 alkoxy; aryl e.g., C6-C20 monocyclic or polycyclic aryl such as phenyl, toluoyl, naphthyl, biphenyl, terphenyl, aryl aromatic containing halogens, amino, silyl; heteroalkyl e.g., C6-C20 monocyclic or polycyclic heteroaryl such as thienyl, furyl, imidazolyl, pyrazolyl, pyridyl, pyrazynyl, pyrimidyl, pyridazinyl, indolyl, quinolyl and isoquinolyl; $R_2$ is, independently in each instance, H, linear, branched or cyclic aliphatic containing C1 to C14, alkyl aromatic, aryl aromatic containing halogen, silyl, amino or alkoxy groups and be interconnected by an aliphatic or an aromatic ring; and Y is either N or P.

4. The polymerizable composition of claim 1, wherein the manganese- or iron-containing salt or complex is selected from complexes comprising nitrogen donor ligands of Formulas N-I, N-II, N-IV, N-V, N-VI, or N-VII:

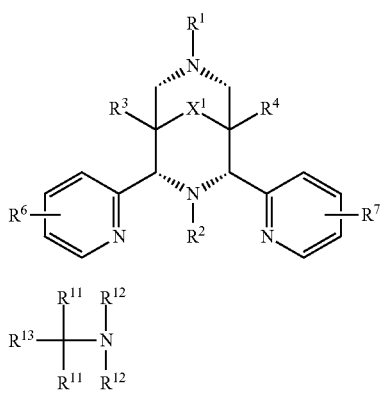

Formula N-I

Formula N-II

Formula N-III

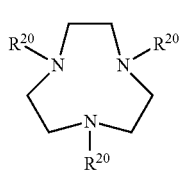

Formula N-IV

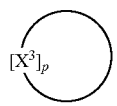

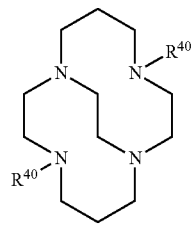

Formula N-V

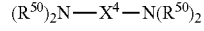

Formula N-VI

Formula N-VII wherein $R^1$ and $R^2$ are independently selected from the group consisting of $C_{1-24}$ alkyl, $C_{6-10}$ aryl, heteroaryl, heteroaryl $C_{1-6}$ alkyl, and —$CH_2$—$CH_2$—$N(CH_3)_2$, wherein heteroaryl is selected from the group consisting of pyridyl, pyrazinyl, pyrazolyl, pyrrolyl, imidazolyl, benzimidazolyl, pyrimidinyl, triazolyl and thiazolyl;

$R^3$ and $R^4$ are independently selected from the group consisting of —H, $C_{1-8}$ alkyl, $C_{1-8}$ alkyl-O-$C_{1-8}$ alkyl, $C_{1-8}$alkyl-O—$C_{6-10}$aryl, $C_{6-10}$aryl, $C_{1-8}$-hydroxyalkyl, and —$(CH_2)_m C(O)OR^5$;

$R^5$ is selected from —H or $C_{1-4}$alkyl, m is an integer selected from 0 to 4;

each $R^6$ and $R^7$ are independently selected from the group consisting of —H, —F, —Cl, —Br, —OH, $C_{1-4}$alkoxy, —NH—C(O)—H, —NH—C(O)—$C_{1-4}$alkyl, —$NH_2$, —NH—$C_{1-4}$alkyl, and $C_{1-4}$alkyl;

$X^1$ is selected from —C(O)— or —$[C(R^8)_2]_n$—, wherein n is an integer selected from 0 to 3, and each $R^8$ is independently selected from the group consisting of —H, —OH, $C_{1-4}$ alkoxy and $C_{1-4}$alkyl.

5. The polymerizable composition of claim 1, wherein the 1,3-dioxo compound is selected from compounds of Formulas D-I to D-VI and mixtures thereof:

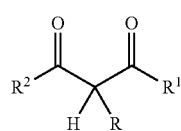

Formula D-I

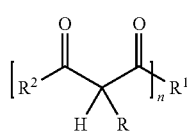

Formula D-II

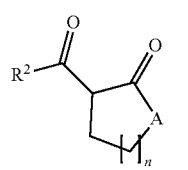

Formula D-III

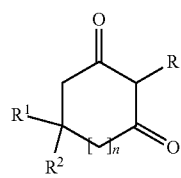

Formula D-IV

-continued

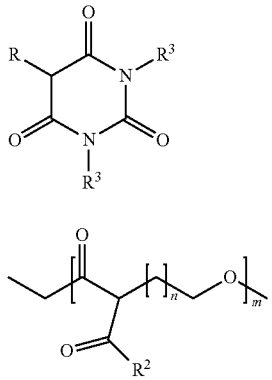

Formula D-V

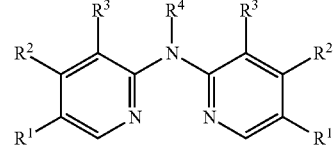

Formula H-III

Formula D-VI wherein $R^2$, and $R^3$ are each independently selected from H, a halogen, a linear or branched, $C_1$-$C_{20}$ alkyl, $C_6$-$C_{20}$ aryl, alkylaryl, arylalkyl, part of a polymer chain, $OR^4$, $NR^4R^4$; and $R^4$ is a H, a straight chain or branched, $C_1$-$C_{20}$ alkyl, $C_6$-$C_{20}$ aryl, alkylaryl, or arylalkyl.

8. The composition of claim 1, comprising a polyhydroxy carboxylic acid selected from tartaric acid, ascorbic acid, or mixture thereof.

9. The polymerizable composition of claim 1, wherein the manganese- or iron-containing salt or organic complex is selected from manganese octoate and manganese naphthenate, the heterocycle is 2,2'-Bipyridine, the tertiary amine is N,N-dimethyl-p-toluidine, and the 1,3-dioxo compound is a-Acetyl-y-Butyrolactone.

wherein A is O or S;

n is an integer of 1 to 6, and m is a repeat unit from 2 to 20;

R is a H, a substituted or unsubstituted linear or branched $C_1$-$C_{20}$ alkyl, $C_6$-$C_{20}$ aryl, alkylaryl, or arylalkyl;

$R^1$ and $R^2$ are independently a H, substituted or unsubstituted linear or branched $C_1$-$C_{20}$ alkyl, $C_6$-$C_{20}$ aryl, alkylaryl, arylalkyl, part of a polymer chain, $OR^3$, or $NR^3R^4$;

$R^1$, $R^2$, $R^3$, and $R^4$ each individually may represent a $C_1$-$C_{20}$ alkyl, $C_6$-$C_{20}$ aryl, alkylaryl or arylalkyl group, that each optionally may contain one or more heteroatoms and/or substituents;

or a ring may be present between $R^1$ and/or $R^2$, and/or between $R^1$ and $R^3$, and/or between $R^1$ and $R^4$; or $R^3$ and/or $R^4$ may be part of a polymer chain, may be attached to a polymer chain or may contain a polymerizable group.

6. The polymerizable composition of claim 1, comprising a tertiary amine selected from the group consisting of N,N-dimethylaniline, N,N-diethylaniline, N,N-dimethyltoluidine, N,N-diethyltoluidine, N,N-bis(2-hydroxy-ethyl)-p-toluidine, ethoxylated p-toluidines, N,N-bis-(2-hydroxyethyl)-p-toluidine, and mixtures thereof.

7. The polymerizable composition of claim 1, comprising a nitrogen-containing heterocyclic amine selected from the group consisting of compounds of Formulas H-I, H-II, or H-III and mixtures thereof:

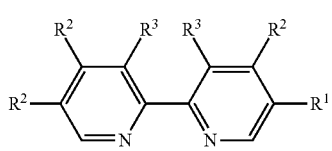

Formula H-I

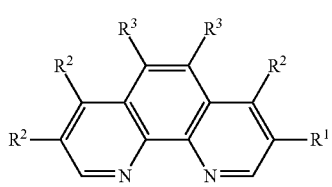

Formula H-II

10. A curing system for curing a radically polymerizable component, the curing system comprising:
  b) a manganese-containing or iron-containing salt or organic complex;
  c) optionally a tertiary amine or phosphine;
  d) optionally a nitrogen-containing aromatic heterocycle or a thiol-containing compound;
  e) optionally a polyhydroxy carboxylic acid;
  f) a 1,3-dioxo compound; and
  wherein the curing system is substantially free of cobalt, copper, and a peroxide initiator, and the curing system comprises at least one of:
    (1) a combination of (i) a tertiary amine or phosphine, and (ii) a nitrogen-containing aromatic heterocycle; or
    (2) a polyhydroxy carboxylic acid.

11. A method of curing a polymerizable composition comprising:
  forming a mixture of:
    a) a radically polymerizable component;
    b) a manganese-containing or iron-containing salt or organic complex;
    c) optionally a tertiary amine or phosphine;
    d) optionally a nitrogen-containing aromatic heterocycle or a thiol-containing compound;
    e) optionally a polyhydroxy carboxylic acid;
    f) a 1,3-dioxo compound; and
    wherein the polymerizable composition is substantially free of cobalt, copper and a peroxide initiator, and the polymerizable composition comprises at least one of:
      (1) a combination of (i) a tertiary amine or phosphine, and (ii) a nitrogen-containing aromatic heterocycle; or
      (2) a polyhydroxy carboxylic acid.

12. The method of claim 11, further comprising:
  preparing a polymerizable composition comprising:
    a) a radically polymerizable component;
    b) a manganese-containing or iron-containing salt or organic complex;

c) optionally a tertiary amine or phosphine;
d) optionally a nitrogen-containing aromatic heterocycle or a thiol-containing compound;
e) optionally a polyhydroxy carboxylic acid;

storing the polymerizable composition over for at least 30 days;

thereafter combining the polymerizable composition with a 1,3-dioxo compound.

13. The method of claim 11, further comprising:
preparing a polymerizable composition comprising:
a) a radically polymerizable component;
c) optionally a tertiary amine or phosphine;
d) optionally a nitrogen-containing aromatic heterocycle or a thiol-containing compound;
e) optionally a polyhydroxy carboxylic acid;
f) a 1,3-dioxo compound;

storing the polymerizable composition for at least 30 days;

thereafter combining the polymerizable composition with a manganese-containing or iron-containing salt or organic complex.

14. The method of claim 11, wherein the polymerizable composition is applied as a sheet molding compound (SMC) resin, castings resin, adhesive, pultrusion resin, corrosion resistant resin, flame retardant resin, low or zero styrene content resin, filament winding resin, hand lay-up resin, resin transfer molding resin, prepreg, gelcoat or coating resin.

15. The method of claim 11, further comprising applying the mixture as a coating, layer, or casting before or while the polymerizable composition is curing.

16. The method of claim 11, wherein the polymerizable composition is applied as a sheet molding compound (SMC) resin, castings resin, adhesive, pultrusion resin, corrosion resistant resin, flame retardant resin, low or zero styrene content resin, filament winding resin, hand lay-up resin, resin transfer molding resin, prepreg, gelcoat or coating resin.

17. The polymerizable composition of claim 1, wherein the polymerizable composition has a heat of polymerization less than 950 kJ/kg.

18. The polymerizable composition of claim 1, wherein the polymerizable composition has a peak exotherm less than 300° C.

19. The polymerizable composition of claim 1, wherein the polymerizable composition has a time to peak exotherm between 5 min and 60 min.

20. The polymerizable composition of claim 1, wherein the polymerizable composition has a gel time between 10 sec and 60 min.

\* \* \* \* \*

UNITED STATES PATENT AND TRADEMARK OFFICE
CERTIFICATE OF CORRECTION

PATENT NO. : 11,518,834 B2
APPLICATION NO. : 16/730081
DATED : December 6, 2022
INVENTOR(S) : Hildeberto Nava et al.

Page 1 of 1

It is certified that error appears in the above-identified patent and that said Letters Patent is hereby corrected as shown below:

In the Specification

Column 30, Line 58, " 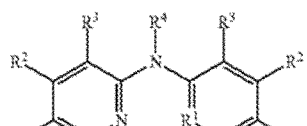 " should be changed to -- 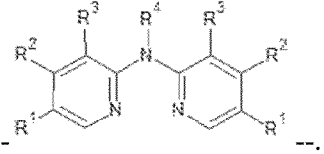 --.

In the Claims

Claim 7, Column 69, Line 57, " 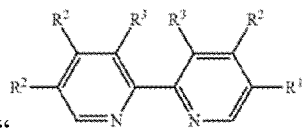 " should be changed to
-- 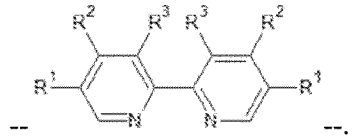 --.

Claim 7, Column 69, Line 64, " 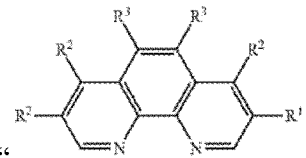 " should be changed to
-- 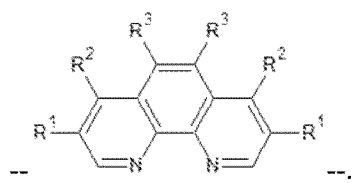 --.

Signed and Sealed this
Nineteenth Day of September, 2023

Katherine Kelly Vidal
*Director of the United States Patent and Trademark Office*